(12) United States Patent
Goto et al.

(10) Patent No.: US 10,686,167 B2
(45) Date of Patent: Jun. 16, 2020

(54) POWER STORAGE DEVICE, BATTERY MANAGEMENT UNIT, AND ELECTRONIC DEVICE

(71) Applicant: SEMICONDUCTOR ENERGY LABORATORY CO., LTD., Atsugi-shi, Kanagawa-ken (JP)

(72) Inventors: Junya Goto, Kanagawa (JP); Ai Nakagawa, Kanagawa (JP); Yuika Sato, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 388 days.

(21) Appl. No.: 15/215,621

(22) Filed: Jul. 21, 2016

(65) Prior Publication Data
US 2017/0033326 A1    Feb. 2, 2017

(30) Foreign Application Priority Data

Jul. 31, 2015    (JP) .................................. 2015-152444

(51) Int. Cl.
*H01M 2/02*    (2006.01)
*H01G 11/80*    (2013.01)
(Continued)

(52) U.S. Cl.
CPC .......... *H01M 2/0275* (2013.01); *H01G 11/78* (2013.01); *H01G 11/80* (2013.01);
(Continued)

(58) Field of Classification Search
CPC ........... H01M 10/0525; H01M 10/425; H01M 2010/4271; H01M 2/0275; H01M 2/0285
See application file for complete search history.

(56) References Cited

U.S. PATENT DOCUMENTS 8,785,030 B2    7/2014  Ueda
10,217,971 B2   2/2019  Takahashi et al.
(Continued)

FOREIGN PATENT DOCUMENTS

JP    2000-173564 A    6/2000
JP    2005-108747 A    4/2005
(Continued)

OTHER PUBLICATIONS

Engineering toolbox (2005), Modulus of Rigidity (Year: 2005).*

*Primary Examiner* — Victoria H Lynch
(74) *Attorney, Agent, or Firm* — Nixon Peabody LLP; Jeffrey L. Costellia

(57) ABSTRACT

A repeatedly bendable power storage device. A highly reliable power storage device. A long-life power storage device. A repeatedly bendable electronic device. A flexible electronic device. The power storage device includes a film, a positive electrode, and a negative electrode. The film includes a plurality of projections. A difference between the maximum height and the minimum height of a surface of the film is greater than or equal to 0.15 mm and less than 0.8 mm. The modulus of rigidity of the film is less than $6.5 \times 10^9$ N. The film includes a metal layer. The thickness of the metal layer is greater than or equal to 5 μm and less than or equal to 200 μm. The positive electrode and the negative electrode are surrounded by the film.

5 Claims, 50 Drawing Sheets

(51) Int. Cl.
*H01G 11/78* (2013.01)
*H01G 11/82* (2013.01)
*H01M 10/42* (2006.01)
*H01M 10/0525* (2010.01)

(52) U.S. Cl.
CPC .......... *H01G 11/82* (2013.01); *H01M 2/0285* (2013.01); *H01M 10/0525* (2013.01); *H01M 10/425* (2013.01); *H01M 2010/4271* (2013.01); *Y02E 60/13* (2013.01); *Y02T 10/7022* (2013.01)

(56) References Cited

U.S. PATENT DOCUMENTS

| | | | |
|---|---|---|---|
| 2012/0064391 A1 | 3/2012 | Fukaya et al. | |
| 2013/0252065 A1* | 9/2013 | Ueda | H01M 10/0585 |
| | | | 429/127 |
| 2014/0203784 A1* | 7/2014 | Yebka | H02J 7/00 |
| | | | 320/136 |
| 2015/0022957 A1 | 1/2015 | Hiroki et al. | |
| 2015/0111088 A1 | 4/2015 | Hiroki et al. | |
| 2015/0261254 A1 | 9/2015 | Hiroki et al. | |
| 2015/0349375 A1 | 12/2015 | Takahashi et al. | |
| 2016/0043359 A1 | 2/2016 | Miyake | |
| 2016/0240824 A1* | 8/2016 | Song | H01M 2/0202 |

FOREIGN PATENT DOCUMENTS

| | | |
|---|---|---|
| JP | 209-016275 A | 1/2009 |
| JP | 2012-064337 A | 3/2012 |
| JP | 2015-038868 | 2/2015 |
| JP | 2015-088409 A | 5/2015 |
| JP | 2015-130332 A | 7/2015 |
| WO | WO 2012/140709 | 10/2012 |

* cited by examiner

FIG. 24A
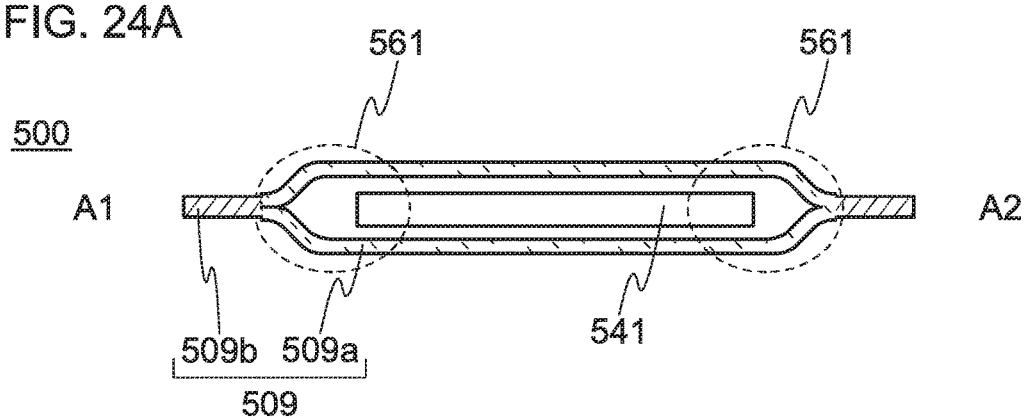
FIG. 24B1
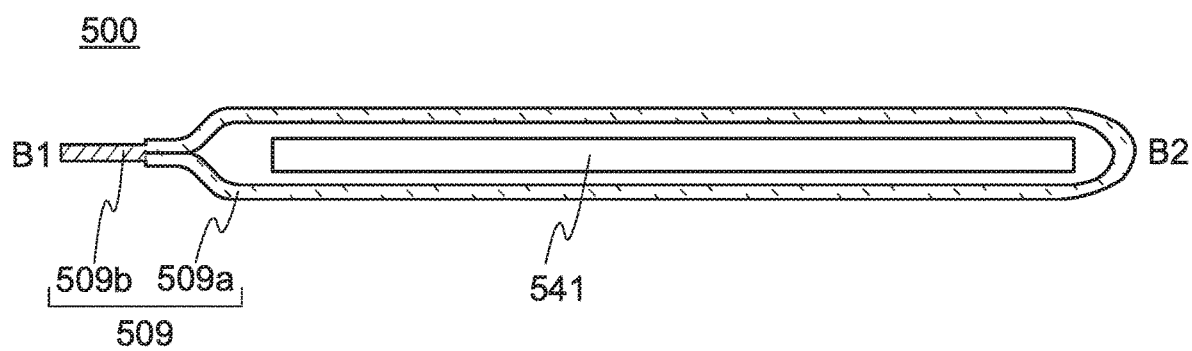
FIG. 24B2
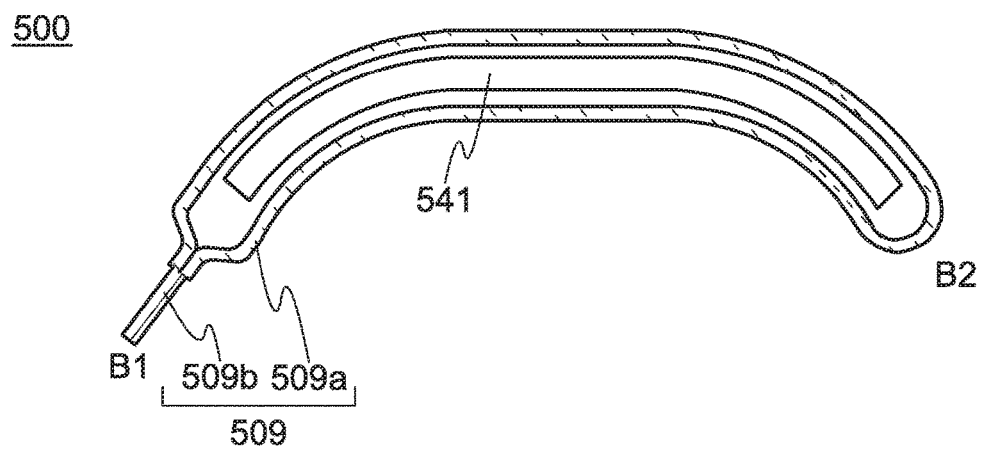

FIG. 35A
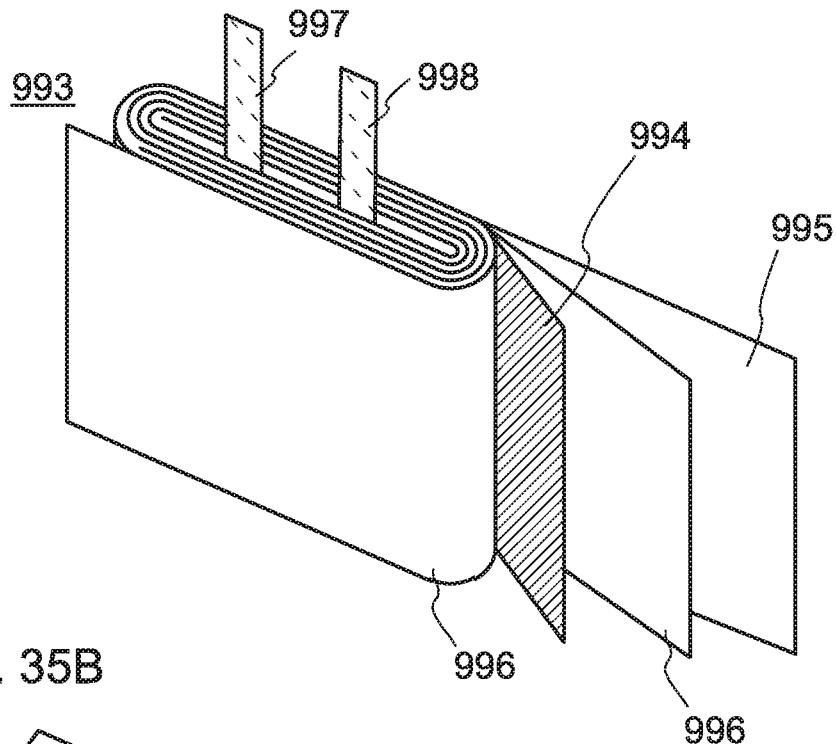
FIG. 35B
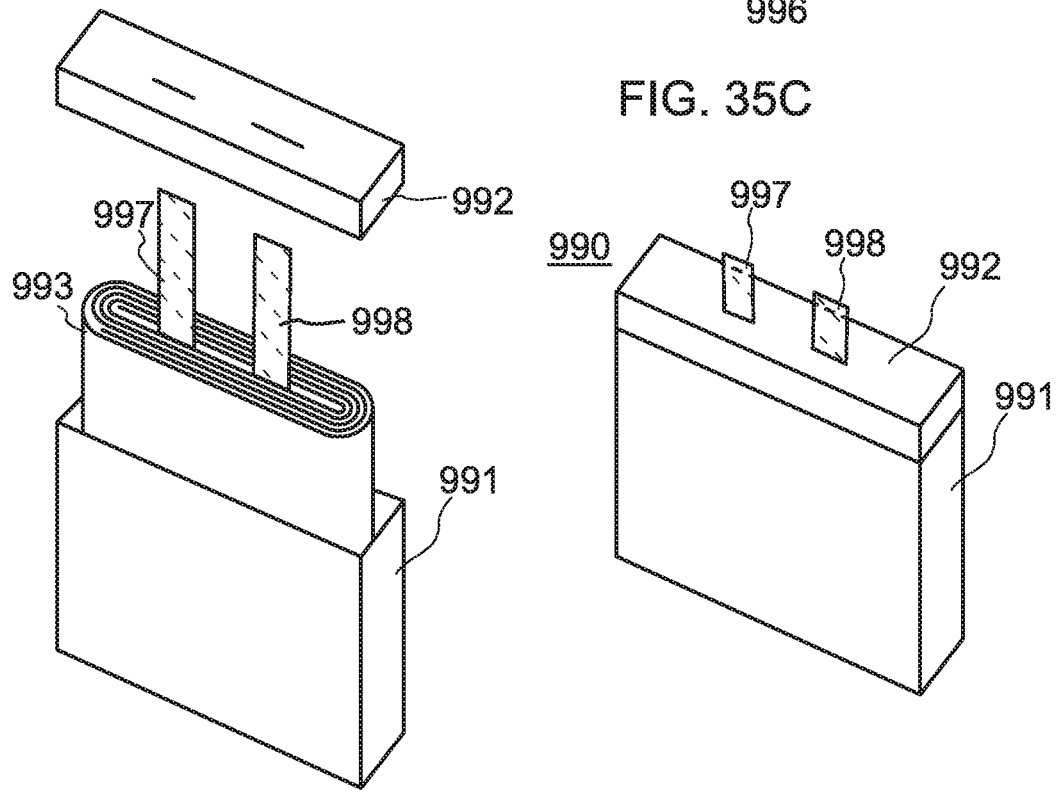
FIG. 35C

FIG. 37A1 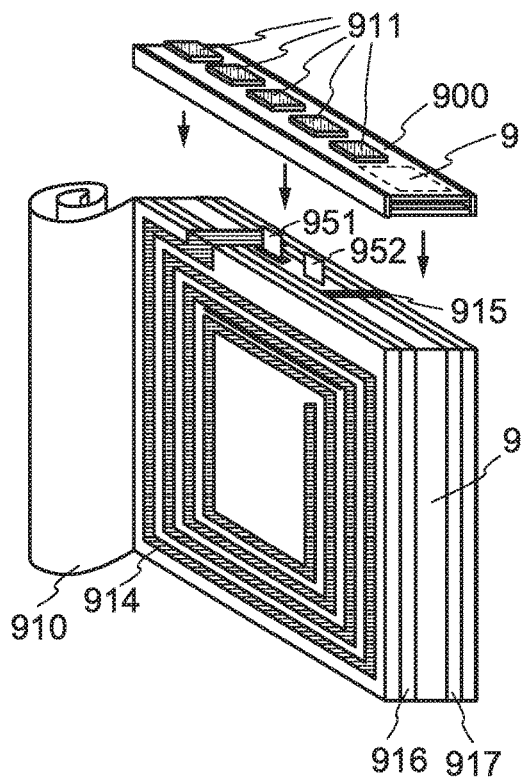
FIG. 37A2 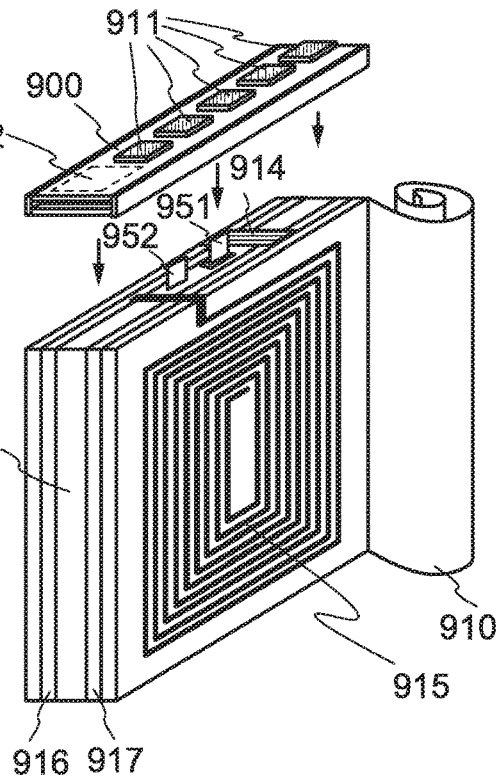
FIG. 37B1 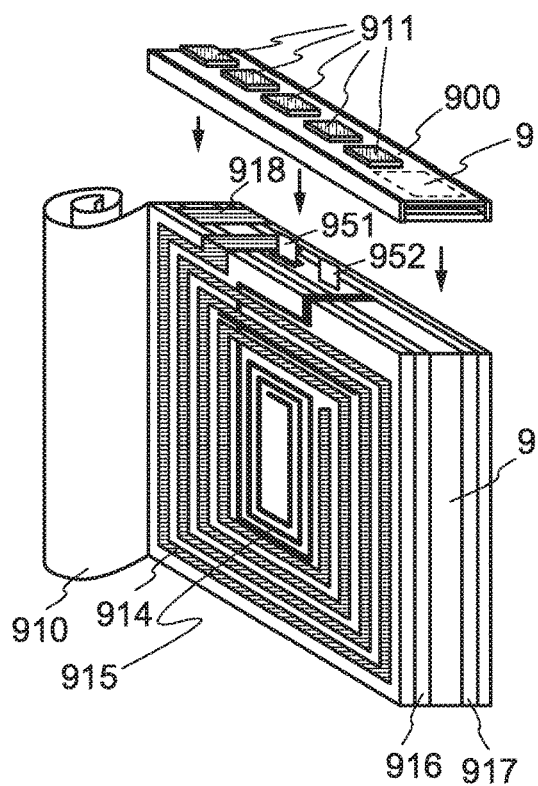
FIG. 37B2 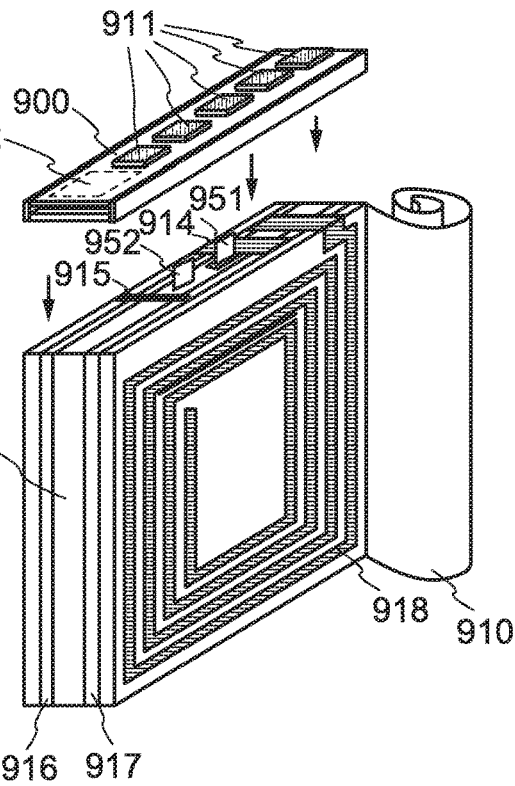

POWER STORAGE DEVICE, BATTERY MANAGEMENT UNIT, AND ELECTRONIC DEVICE

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a memory device, a driving method thereof, a manufacturing method thereof, or an evaluation method thereof. In particular, one embodiment of the present invention relates to a power storage device, a manufacturing method thereof, and an evaluation method thereof.

Note that a power storage device in this specification refers to every element and/or device having a function of storing electric power.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with a high output and a high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society. Patent Document 1 discloses an example of incorporating a power storage device in an electronic device.

Electronic devices used while being worn on human bodies have recently been proposed and are referred to as wearable displays and the like. To improve the convenience, it is necessary that such electronic devices can be repeatedly attached to and detached from human bodies.

REFERENCE

Patent Document

[Patent Document 1] Japanese Published Patent Application No. 2015-38868

SUMMARY OF THE INVENTION

Entry of impurities into a power storage device reduces the characteristics of the power storage device. For example, impurities such as water entering a nonaqueous electrolytic solution reduces discharge capacity in some cases. Poor airtightness of an exterior body of a power storage device, for example, might allow components in the air to go into the exterior body, which might result in entry of impurities into the power storage device.

Power storage devices incorporated in electronic devices used while being worn on human bodies might be repeatedly bent at the moment of repeatedly attaching and detaching the electronic devices. The repeated bending of the power storage devices causes deterioration of their exterior bodies, possibly allowing entry of impurities such as moisture into the exterior body. Knowing the amount of moisture entering an exterior body is important in improving the reliability of a power storage device.

An object of one embodiment of the present invention is to provide a repeatedly bendable power storage device. Another object of one embodiment of the present invention is to provide a highly reliable power storage device. Another object of one embodiment of the present invention is to provide a long-life power storage device. Another object of one embodiment of the present invention is to provide a repeatedly bendable electronic device. Another object of one embodiment of the present invention is to provide a flexible electronic device.

Another object of one embodiment of the present invention is to provide a flexible film. Another object of one embodiment of the present invention is to provide a repeatedly bendable film.

Another object of one embodiment of the present invention is to provide a method for evaluating the reliability of a power storage device. Another object of one embodiment of the present invention is to provide a method for evaluating the amount of impurities in a power storage device. Another object of one embodiment of the present invention is to provide a method for evaluating the amount of moisture in a power storage device. Another object of one embodiment of the present invention is to provide a method for evaluating the amount of moisture in an exterior body of a power storage device.

Another object of one embodiment of the present invention is to provide a power storage device with a novel structure. Another object of one embodiment of the present invention is to provide a novel power storage device, an electronic device including a novel power storage device, or the like.

Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a power storage device that includes a film, a positive electrode, and a negative electrode. A difference between the maximum height and the minimum height of a surface of the film is greater than or equal to 0.15 mm and less than 0.8 mm. The modulus of rigidity of the film is less than $6.5 \times 10^9$ N. The film includes a metal layer. The thickness of the metal layer is greater than or equal to 5 μm and less than or equal to 200 μm. The positive electrode and the negative electrode are surrounded by the film. The film includes a plurality of projections, for example.

One embodiment of the present invention is a power storage device that includes a film, a positive electrode, and a negative electrode. In the film, the ratio of the surface area to the area seen from above is greater than or equal to 1.005 and less than or equal to 10. The film includes a metal layer. The thickness of the metal layer is greater than or equal to 5 μm and less than or equal to 200 μm. The positive electrode and the negative electrode are surrounded by the film.

In the above structure, distortion at a point of rupture of the film is preferably greater than 0.6 and less than or equal to 2. In the above structure, the metal layer preferably contains aluminum.

One embodiment of the present invention is a power storage device that includes an exterior body, a positive electrode, and a negative electrode. The exterior body includes a first region and a second region. The rigidity of the first region is greater than or equal to 1.2 times and less than or equal to 4 times the rigidity of the second region.

One embodiment of the present invention is a power storage device that includes an exterior body, a positive electrode, and a negative electrode. The exterior body includes a first region and a second region. The difference between the maximum height and the minimum height of a surface seen from one direction is H in the first region and the second region. The H in the first region is greater than or equal to 2 times and less than or equal to 5 times the H in the second region.

In the above structure, it is preferable that the power storage device be repeatedly bendable and the second region include a region closer to an end portion of the exterior body than the first region is. In the above structure, it is preferable that the power storage device be repeatedly bendable and the first region have a region with a radius of curvature smaller than a radius of curvature of the second region.

One embodiment of the present invention can provide a repeatedly bendable power storage device. One embodiment of the present invention can provide a highly reliable power storage device. One embodiment of the present invention can provide a long-life power storage device. One embodiment of the present invention can provide a repeatedly bendable electronic device. One embodiment of the present invention can provide a flexible electronic device.

One embodiment of the present invention can provide a flexible film. One embodiment of the present invention can provide a repeatedly bendable film.

One embodiment of the present invention can provide a method for evaluating the reliability of a power storage device. One embodiment of the present invention can provide a method for evaluating the amount of impurities in a power storage device. One embodiment of the present invention can provide a method for evaluating the amount of moisture in a power storage device. One embodiment of the present invention can provide a method for evaluating the amount of moisture in an exterior body of a power storage device.

One embodiment of the present invention can provide a power storage device with a novel structure. One embodiment of the present invention can provide a novel power storage device, an electronic device including a novel power storage device, or the like.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

FIGS. 24A, 24B1, and 24B2 illustrate cross sections of a power storage device.
FIG. 35A to 35C illustrate an example of a power storage device.
FIGS. 37A1, 37A2, 37B1, and 37B2 illustrate examples of power storage devices.

DETAILED DESCRIPTION OF THE INVENTION

Figure 1:
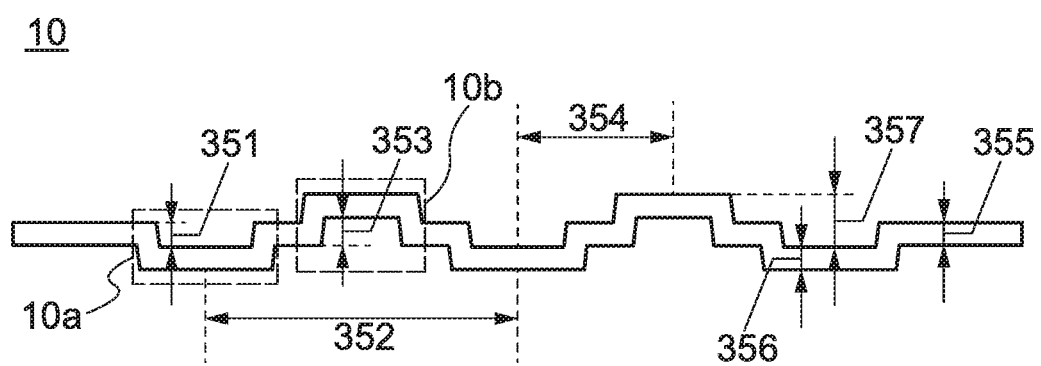
FIG. 1 illustrates a cross section of a film.
Figure 2A:
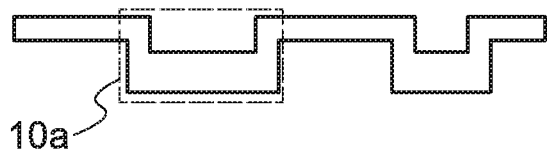
FIGS. 2A to 2F each illustrate a cross section of a film.
Figure 2B:
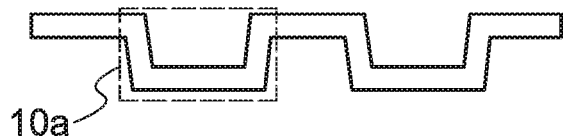
Figure 2C:
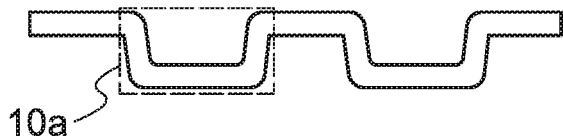
Figure 2D:
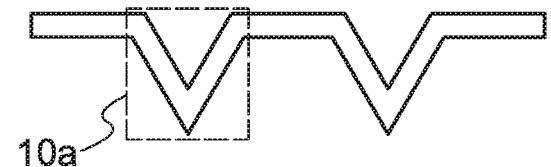
Figure 2E:
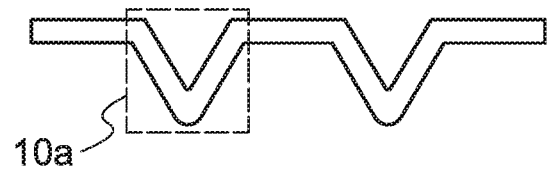
Figure 2F:
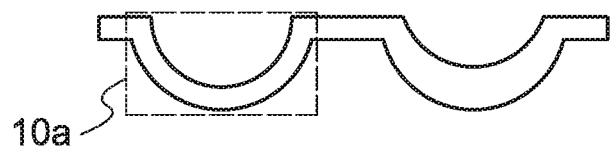
Figure 3A:
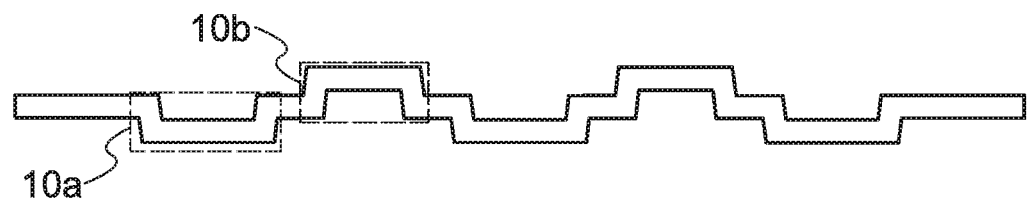
FIGS. 3A to 3D each illustrate a cross section of a film.
Figure 3B:
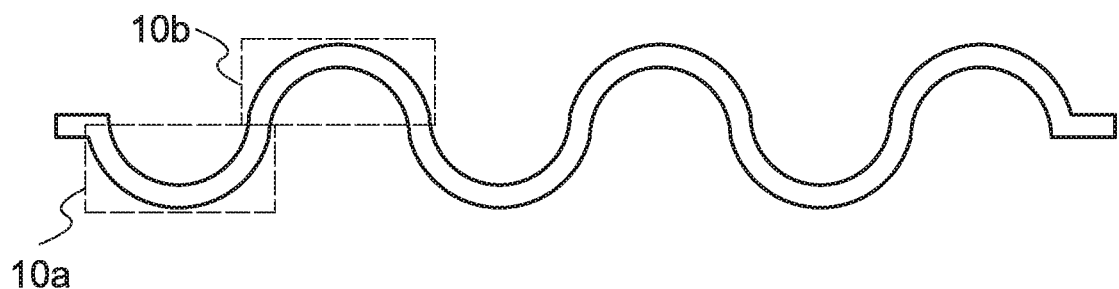
Figure 3C:
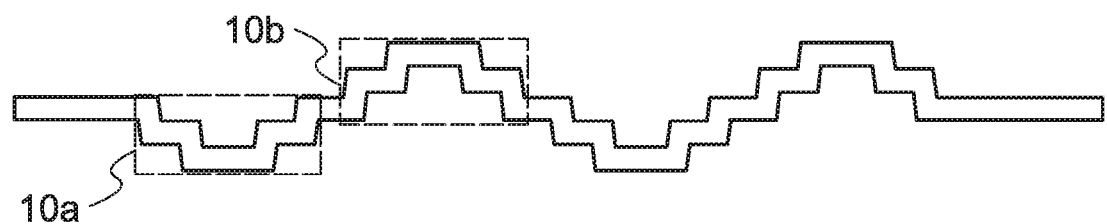
Figure 3D:
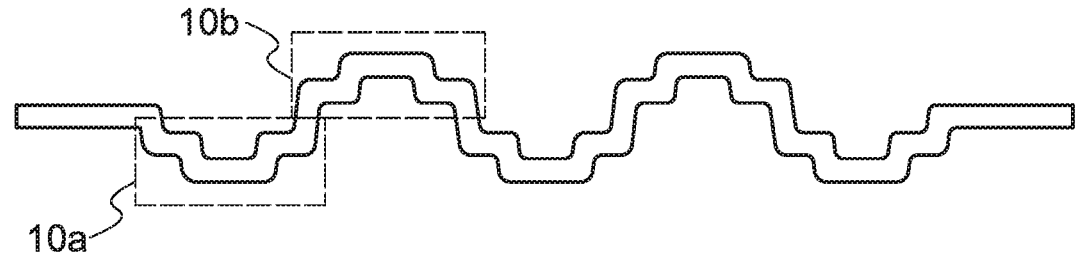

Hereinafter, embodiments and examples of the present invention will be described in detail with reference to the accompanying drawings. However, the present invention is not limited to the description of the embodiments and examples and it is easily understood by those skilled in the art that the mode and details can be changed variously. Accordingly, the present invention should not be interpreted as being limited to the description of the embodiments and examples below.

Note that in drawings used in this specification, the sizes, thicknesses, and the like of components such as films, layers, substrates, regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Here, a charge rate and a discharge rate of a power storage device will be described. For example, in the case of charging a secondary battery with a certain capacity [Ah] at a constant current, a charge rate of 1 C means the current value I [A] with which charging is ended in exactly 1 h, and a charge rate of 0.2 C means I/5 [A] (i.e., the current value with which charging is ended in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

In this embodiment, power storage devices of embodiments of the present invention and exterior bodies of the power storage devices are described.

Examples of the power storage device include secondary batteries utilizing electrochemical reaction (e.g., lithium-ion batteries), electrochemical capacitors (e.g., electric double layer capacitors and redox capacitors), air cells, and fuel cells.

It is preferable that a power storage device of one embodiment of the present invention can be repeatedly charged and discharged.

In charging and discharging of a power storage device, an electrolytic solution might be decomposed at the reaction potential of an electrode. Decomposition reactions of an electrolytic solution are irreversible in many cases and thus sometimes reduce the charge and discharge efficiency of the power storage device. When the charge and discharge efficiency is reduced, the power storage device suffers reduction in discharge capacity.

In addition, as charging and discharging are repeated, discharge capacity gradually decreases because of the decomposition reaction of an electrolytic solution in some cases.

The use of a nonaqueous electrolytic solution as an electrolytic solution of a power storage device can widen the range of the potential at which the power storage device operates. For example, decomposition of the electrolytic solution can be inhibited in a wider range of potentials. As a result, the power storage device can have higher discharge capacity.

A power storage device of one embodiment of the present invention preferably includes an exterior body, an electrode positioned in the exterior body, and a nonaqueous electrolytic solution.

<Exterior Body>

An exterior body of one embodiment of the present invention will be described below.

Entry of impurities into an exterior body of a power storage device reduces the characteristics of the power storage device. For example, impurities such as water entering a nonaqueous electrolytic solution reduces discharge capacity in some cases. Poor airtightness of an exterior body of a power storage device, for example, allows components in the air to go into the exterior body, which results in entry of impurities into the power storage device.

Here, the concentration of moisture in the exterior body of the power storage device is preferably 300 ppm or less, further preferably 100 ppm or less, still further preferably 50 ppm or less, yet still further preferably 20 ppm or less per weight of the electrolytic solution in the exterior body of the power storage device.

In the power storage device, the amount of moisture in the exterior body can be measured with a Karl Fischer moisture meter or the like.

The exterior body is preferably formed using a material that is less permeable to impurities. It is particularly preferable that the exterior body be formed using a material with a low moisture permeability such as a metal.

A film (sometimes referred to as a sheet or a foil) is preferably used as the exterior body of the power storage device of one embodiment of the present invention.

The exterior body of one embodiment of the present invention preferably contains at least one kind of metal selected from aluminum, copper, tin, niobium, titanium, nickel, manganese, iron, molybdenum, tungsten, tantalum, chromium, and the like. The exterior body may contain an alloy of any of these metals (e.g., stainless steel). Furthermore, the exterior body preferably includes a metal layer containing any of the metals or the alloy. Here, aluminum, copper, tin, niobium, titanium, and the like have a low Young's modulus and are easy to process in some cases. Aluminum is particularly preferable as a metal contained in the exterior body because it is inexpensive and is easy to process.

The thickness of the metal layer is, for example, greater than or equal to 5 µm and less than or equal to 200 µm, greater than or equal to 10 µm and less than or equal to 100 µm, or greater than or equal to 15 µm and less than or equal to 50 µm.

Alternatively, the exterior body of one embodiment of the present invention may include a carbon sheet. Examples of a carbon sheet include films containing graphite, carbon fiber, active carbon, graphene, a graphene compound, and the like.

Alternatively, the exterior body of one embodiment of the present invention preferably contains a resin. The resin may be in a film form. As the resin, polyethylene, polypropylene, a polycarbonate, an ionomer, or a polyamide can be used, for example.

To prevent a short circuit between the electrode and the exterior body of the power storage device, electrical conductivity of the surface of the exterior body is preferably low. Therefore, a surface of the exterior body preferably has a resin layer or the like. For example, a film in which resin layers are provided on both surfaces of a metal layer can be used as the exterior body.

For example, the exterior body of one embodiment of the present invention may be a film that contains the above metal or the above alloy and is provided with a resin layer on the front and/or the back.

For example, a single-layer film selected from a metal film (e.g., an aluminum film, a stainless steel film, and a copper film), a plastic film made of an organic material, a hybrid material film including an organic material (e.g., an organic resin or fiber) and an inorganic material (e.g., ceramic), a carbon-containing inorganic film (e.g., a carbon film or a graphite film), and the like; or a stacked-layer film including two or more of the above films is used as the exterior body.

When a metal film is used, the metal film preferably has the following three-layer structure, for example, to insulate the surfaces: an inner coat is provided to one surface of the metal film by using polypropylene, polyethylene, a polycarbonate, an ionomer, a polyamide, or the like, and an outer coat is provided to the other surface of the metal film by using a film of an insulating synthetic resin such as a polyamide resin or a polyester resin. For the resin film, alternatively, a polyethylene terephthalate (PET) resin or the like may be used. The above metal film may be coated with a stacked-layer film consisting of two or more layers. For example, an inner coat may be provided to one surface of the metal film by using a material such as polypropylene, and an outer coat may be provided to the other surface of the metal film by using a film in which a polyamide resin and polyethylene terephthalate (PET) resin, for example, are stacked. Here, the resin film has a thickness of greater than or equal to 10 µm and less than or equal to 200 µm or greater than or equal to 15 µm and less than or equal to 100 µm, for example.

The power storage device of one embodiment of the present invention can change its shape as a device incorporating the power storage device changes its shape.

The power storage device of one embodiment of the present invention is bendable. Such a bendable power storage device can be incorporated in devices that will change their shapes, including wearable devices and other electronic devices. Since the wearable device changes their shapes when attached to or worn on a human body or the like, the wearable device can fit more snugly.

Electronic devices like wearable devices can preferably be repeatedly attached to and detached from a human body. Accordingly, it is preferable that the power storage device of one embodiment of the present invention can be repeatedly bent.

When the power storage device is bent, the exterior body changes its shape. The change in shape of the exterior body induces a crack on part of the exterior body or thinning of a stretched part of the exterior body, for example, in some cases. In that case, the exterior body becomes more permeable to impurities. As a result, impurities in the air such as moisture easily enter the exterior body.

The permeability to impurities of the exterior body of the power storage device of one embodiment of the present invention does not readily increase even when the power storage device is repeatedly bent.

Here, repeatedly bending means alternating between a state with a large radius of curvature and a state with a small radius of curvature, for example. In bending a power storage device, a smaller radius of curvature means a greater change in shape of an exterior body, which more easily leads to a crack or the like.

When the power storage device is bent, the exterior body undergoes a local and significant change in shape in some cases. For example, the exterior body locally sags in some cases. A local sag induces wrinkles. A wrinkle can be regarded as a region with an extremely small radius of curvature. In repeated bending of the power storage device, a crack or the like occurs more easily at a wrinkle in some cases.

Thus, it is preferable that the exterior body of the power storage device of one embodiment of the present invention be less likely to sag.

Examples of a film that can be used as the exterior body will be described below.

A film can be prevented from sagging by having a larger thickness, for example.

Alternatively, a sag can be prevented by processing a film. For example, a film may be provided with projections. Examples of a film provided with projections include an embossed film and an accordion-folded film.

A metal film is easily embossed. Formation of projections by embossing increases the surface area of the exterior body that is exposed to the outside air, leading to an increased ratio of the surface area to the area seen from above, for example; thus, heat can be dissipated effectively. The projections formed on the front (or on the back) of the film by embossing form an enclosed space whose inner volume is variable, which is sealed by the film serving as a part of a wall of the sealing structure. This enclosed space can be said to be formed because the projections of the film have an accordion structure. Note that embossing, which is a kind of pressing, is not necessarily employed and any method that allows formation of a relief on part of the film is employed.

Next, the cross-sectional shapes of projections will be described with reference to FIG. 1 and FIGS. 2A to 2F.

As illustrated in FIG. 1, a projection 10a whose top portion points in a first direction and a projection 10b whose top portion points in a second direction are alternately arranged in a film 10. Note that the first direction is the direction in which one surface faces and the second direction is the direction in which the other surface faces.

The cross-sectional shape of each of the projection 10a and the projection 10b can be a hollow semicircular shape, a hollow semi-oval shape, a hollow polygonal shape, or a hollow irregular shape. In the case of a hollow polygonal shape, it is preferable that the polygon have more than six corners, in which case stress concentration at the corners can be reduced.

FIG. 1 shows a depth 351 of the projection 10*a*, a pitch 352 of the projection 10*a*, a depth 353 of the projection 10*b*, a distance 354 between the projection 10*a* and the projection 10*b*, a film thickness 355 of the film 10, and a bottom thickness 356 of the projection 10*a*. A height 357 is a difference between the maximum height of the film surface and the minimum height thereof.

FIGS. 2A to 2F illustrate examples of the film 10 provided with the projection 10*a*.

FIGS. 3A to 3D illustrate examples of the film 10 provided with the projection 10*a* and the projection 10*b*.

Next, the top surface shapes of projections will be described with reference to FIGS. 4A and 4B, FIGS. 5A to 5D, FIGS. 6A and 6B, and FIGS. 7A to 7D.

Figure 4A:
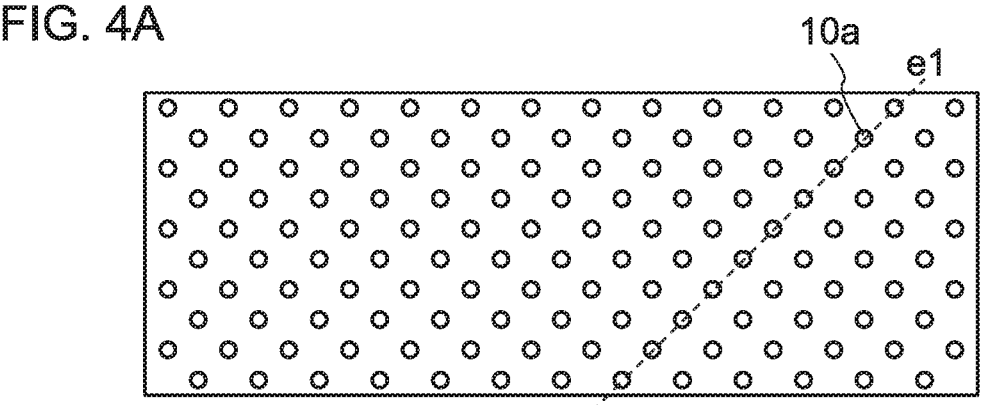
FIGS. 4A and 4B each illustrate a top surface of a film.

In a film illustrated in FIG. 4A, the projections 10*a* whose top portions are on one surface are arranged regularly. Here, a dashed line e1 indicating a direction in which the projections 10*a* are arranged is slanted to the sides of the film.

Figure 4B:
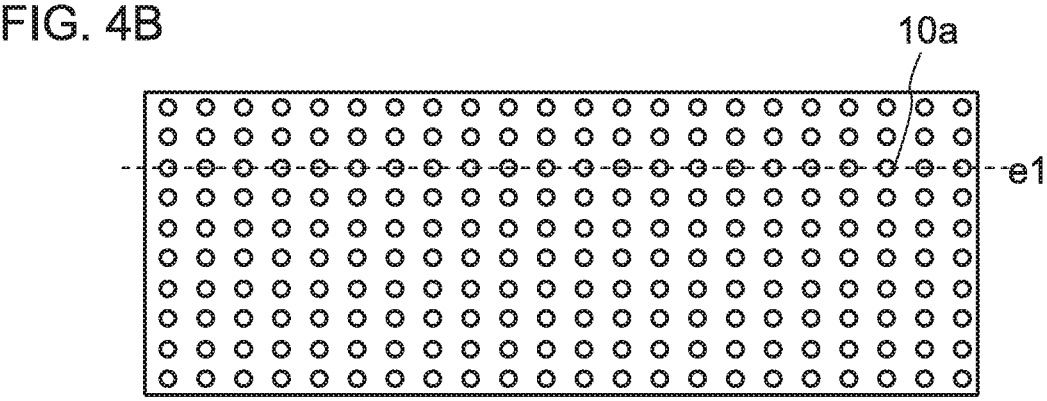

In a film illustrated in FIG. 4B, the projections 10*a* whose top portions are on one surface are arranged regularly. Here, a dashed line e1 indicating a direction in which the projections 10*a* are arranged is parallel to the long sides of the film.

Figure 5A:
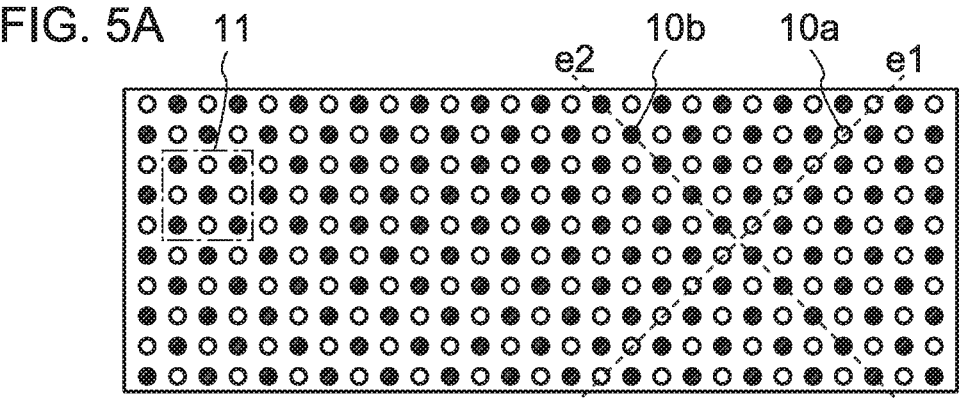
FIGS. 5A to 5D each illustrate a top surface of a film.

In a film illustrated in FIG. 5A, the projections 10*a* whose top portions are on one surface and the projections 10*b* whose top portions are on the other surface are arranged regularly. Here, a dashed line e1 indicating a direction in which the projections 10*a* are arranged and a dashed line e2 indicating a direction in which the projections 10*b* are arranged are slanted to the sides of the film. In addition, the dashed line e1 and the dashed line e2 cross each other.

Figure 5B:
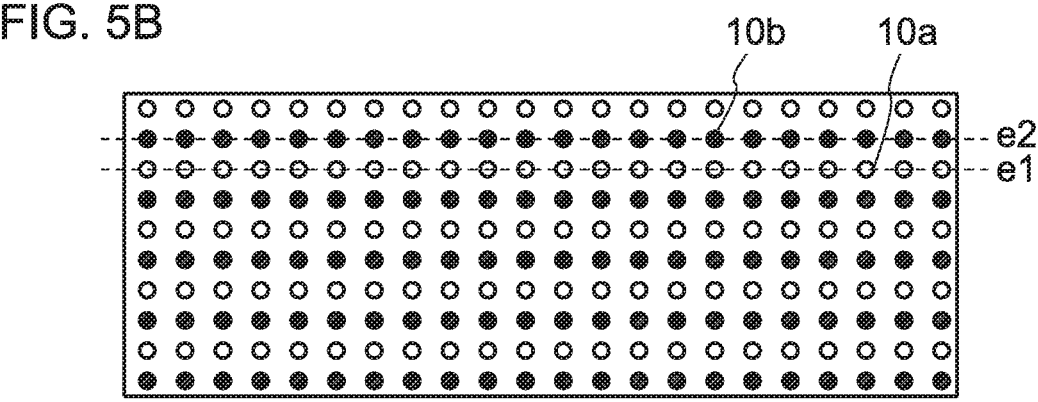

In a film illustrated in FIG. 5B, the projections 10*a* whose top portions are on one surface and the projections 10*b* whose top portions are on the other surface are arranged regularly. Here, a dashed line e1 indicating a direction in which the projections 10*a* are arranged and a dashed line e2 indicating a direction in which the projections 10*b* are arranged are parallel to the long side of the film.

Figure 5C:
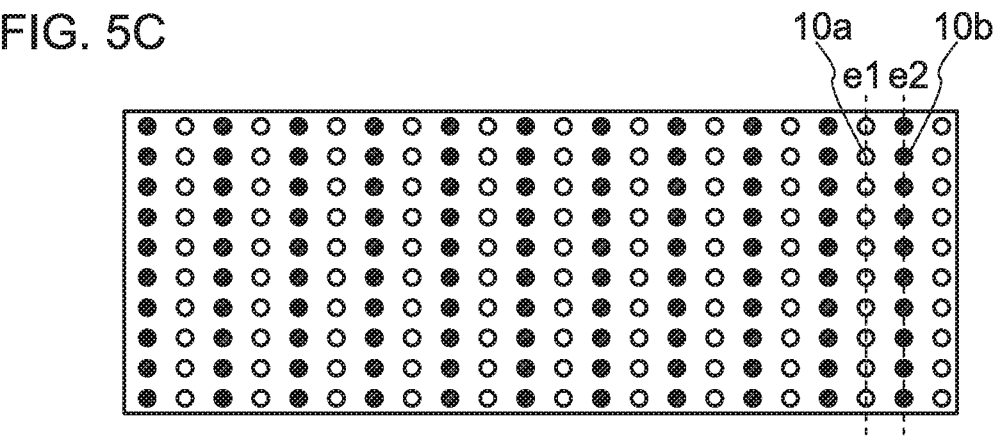

In a film illustrated in FIG. 5C, the projections 10*a* whose top portions are on one surface and the projections 10*b* whose top portions are on the other surface are arranged regularly. Here, a dashed line e1 indicating a direction in which the projections 10*a* are arranged and a dashed line e2 indicating a direction in which the projections 10*b* are arranged are parallel to the short side of the film.

Figure 5D:
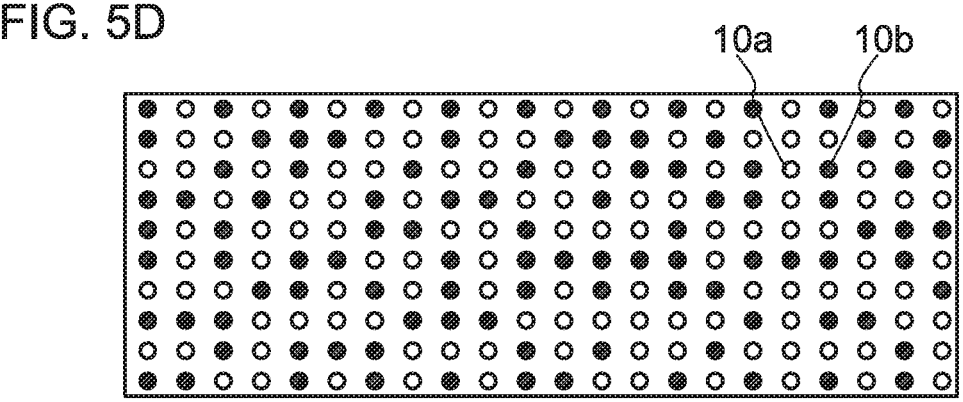

In a film illustrated in FIG. 5D, the projections 10*a* whose top portions are on one surface and the projections 10*b* whose top portions are on the other surface are arranged randomly.

Although the top surface shape of each of the projections illustrated in FIGS. 5A to 5D is a circle, it is not limited to a circle and may be a polygon or an irregular shape.

The projections 10*a* whose top portions are on one surface and the projections 10*b* whose top portions are on the other surface may have the same top surface shape as in the films illustrated in FIGS. 5A to 5D. Alternatively, the projections 10*a* whose top portions are on one surface and the projections 10*b* whose top portions are on the other surface may have different top surface shapes as illustrated in FIG. 6A.

Figure 6A:
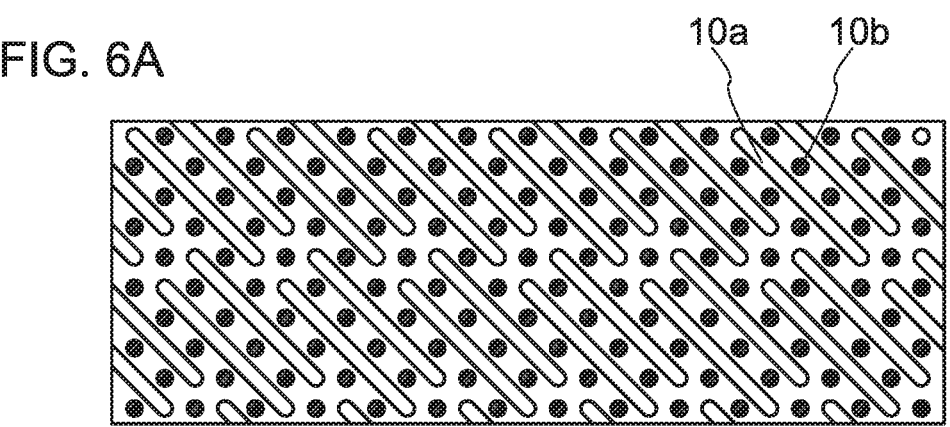
FIGS. 6A and 6B each illustrate a top surface of a film.

In a film illustrated in FIG. 6A, the projections 10*a* have linear top surface shapes, and the projections 10*b* have circular top surface shapes. Note that each of the top surface shapes of the projection 10*a* may be a straight-line shape, a curve shape, a wave shape, a zigzag shape, or an irregular shape, and each of the top surface shapes of the projection 10*b* may be a polygon or an irregular shape.

Figure 6B:
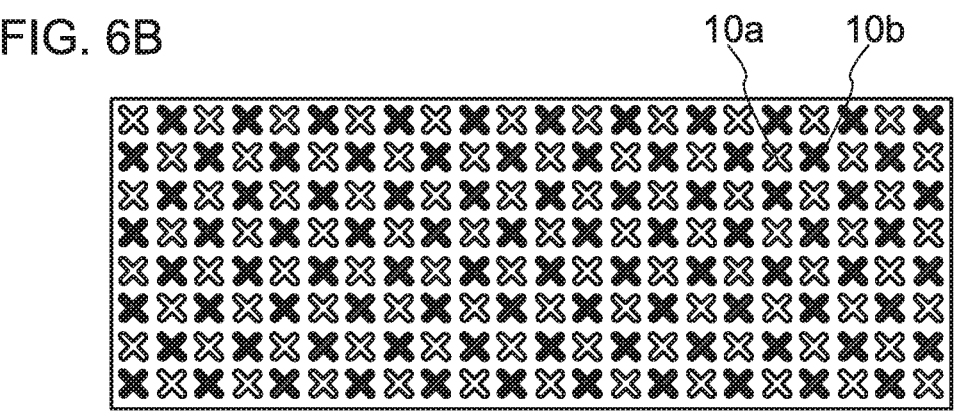

Alternatively, the top surface shapes of the projections 10*a* and 10*b* may be cross shapes as illustrated in FIG. 6B.

The top surface shapes as in FIGS. 5A to 5D and FIGS. 6A and 6B can reduce stress due to bending in at least two directions.

FIGS. 7A to 7D illustrate examples of projections with a linear top surface shape. Note that the shapes illustrated in FIGS. 7A to 7D are referred to as accordion structures in some cases. Cross sections taken along dashed lines e3 in FIGS. 7A to 7D can be any of the cross sections illustrated in FIG. 1, FIGS. 2A to 2F, and FIGS. 3A to 3D.

Figure 7A:
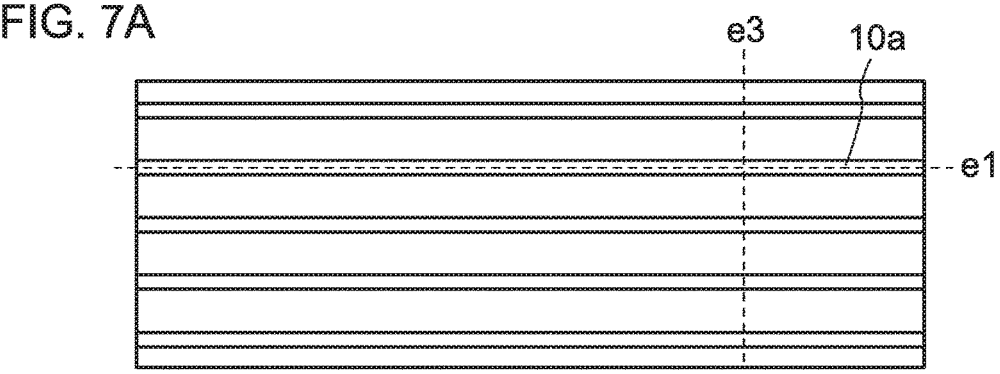
FIGS. 7A to 7D each illustrate a top surface of a film.
Figure 7B:
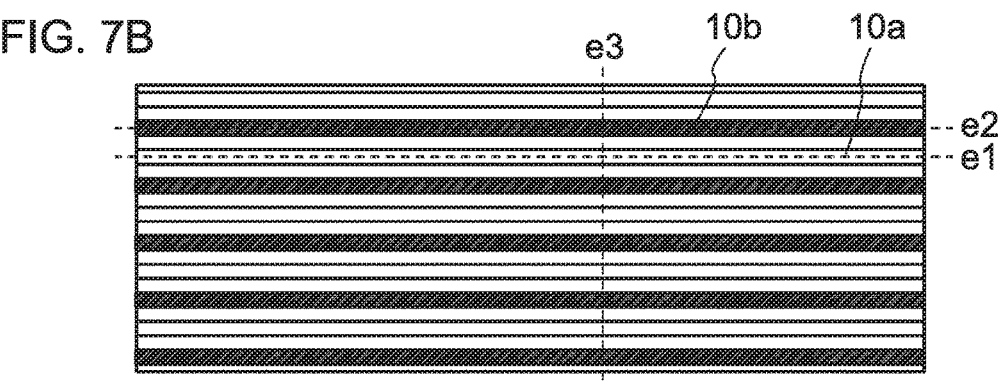

In a film illustrated in FIG. 7A, the linear projections 10*a* whose top portions are on one surface are arranged. Here, a dashed line e1 indicating a direction of the linear projections 10*a* is parallel to the sides of the film. In a film illustrated in FIG. 7B, the linear projections 10*a* whose top portions are on one surface and the linear projections 10*b* whose top portions are on the other surface are arranged alternately. Here, a dashed line e1 indicating a direction of the linear projections 10*a* and a dashed line e2 indicating a direction of the linear projections 10*b* are parallel to the sides of the film.

Figure 7C:
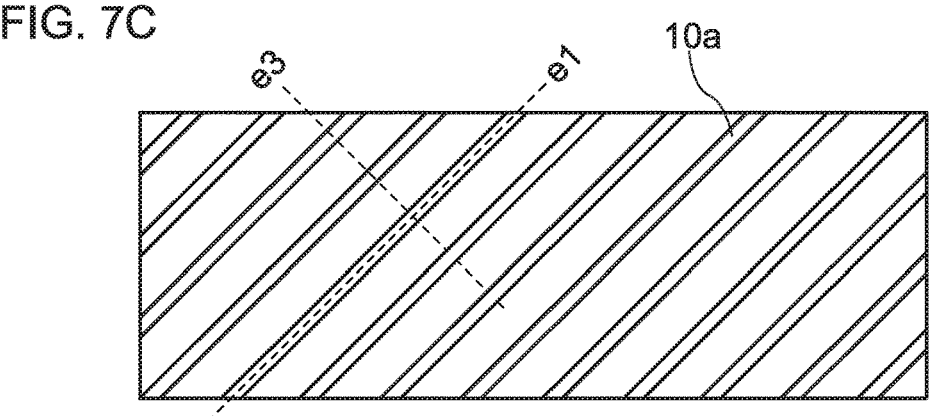
Figure 7D:
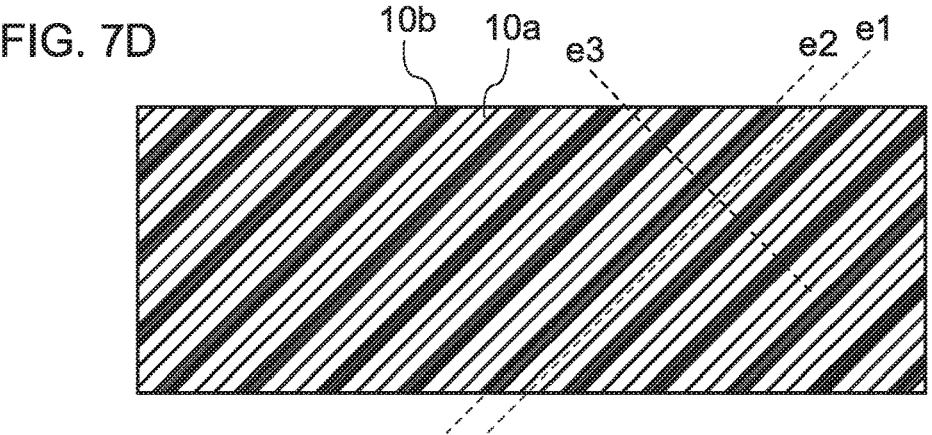

In a film illustrated in FIG. 7C, the linear projections 10*a* whose top portions are on one surface are arranged. Here, a dashed line e1 indicating a direction of the linear projections 10*a* is slanted to the sides of the film. In a film illustrated in FIG. 7D, the linear projections 10*a* whose top portions are on one surface and the linear projections 10*b* whose top portions are on the other surface are arranged alternately. Here, a dashed line e1 indicating a direction of the linear projections 10*a* and a dashed line e2 indicating a direction of the linear projections 10*b* are slanted to the sides of the film.

The exterior body of one embodiment of the present invention includes a plurality of projections and the depth of the projection is preferably 1 mm or less, further preferably greater than or equal to 0.15 mm and less than 0.8 mm, still further preferably greater than or equal to 0.3 mm and less than or equal to 0.7 mm.

The projections are preferably provided at a surface density of greater than or equal to $0.02/mm^2$ and less than or equal to $2/mm^2$, further preferably greater than or equal to $0.05/mm^2$ and less than or equal to $1/mm^2$, still further preferably greater than or equal to $0.1/mm^2$ and less than or equal to $0.5/mm^2$, for example.

Here, the ratio of the surface area to the area seen from above is represented by R. R will be described with reference to drawings. Regarding the region 11 surrounded by a dashed-dotted line in FIG. 5A, its area seen from above is the area in the top view in FIG. 5A. Here, the top view is preferably a view of the film 10 seen in a substantially perpendicular direction. R=J2/J1 is satisfied, where J1 is the area seen from above and J2 is the surface area.

Here, R is preferably greater than or equal to 1.005 and less than or equal to 10, further preferably greater than or equal to 1.015 and less than or equal to 5, still further preferably greater than 1.05 and less than or equal to 3, yet still further preferably greater than or equal to 1.1 and less than or equal to 2, yet still further preferably greater than 1.08 and less than 1.7, yet still further preferably greater than 1.1 and less than 1.4.

Here, the surface area of the film is measured with, for example, a scanning probe microscope (SPM), specific examples of which include an AFM and a DFM. Alternatively, a confocal laser scanning microscope or the like can be used.

<Buckling Load>

The load at which buckling occurs is called buckling load. A film having a high buckling load is less likely to sag and be wrinkled.

However, a film having too high a buckling load does not readily change its shape and is easily cracked, for example, by bending stress.

In the case of bending a film, the film can have a higher buckling load when provided with a projection than when flat. In addition, the film can sometimes achieve a higher buckling load than a flat film by having a large value of R=J2/J1.

<Rigidity>

When a power storage device is repeatedly bent, tensile stress and compressive stress are applied to its exterior body, for example. Such stress induces a crack on part of the exterior body or thinning of a stretched part of the exterior body, for example, in some cases.

It is thus preferable that the exterior body of one embodiment of the present invention easily expand and contract. Expansion and contraction of the exterior body relax the force applied thereto and the exterior body can be thus prevented from being cracked, for example.

A body with low rigidity can easily expand and contract. The use of a material with a low Young's modulus can lower rigidity.

A processed film can have lowered rigidity. For example, a film may be provided with projections. Furthermore, a film can have lowered rigidity by having a slit or the like in some cases. Here, when the film is provided with projections, the ratio of the surface area of the exterior body to the area seen from above increases.

The rigidity of a film can be determined in the following manner: while the film is pulled by exerting force thereon, elongation of the film in response to the force is measured. This measurement can be called a tension test. When the rigidity of a film, the force in the tension test, and displacement in the tension test are represented by k, P, and $\delta$, respectively, these have the relationship expressed by Formula (1). Accordingly, the rigidity k of a film can be determined by conducting a tension test on the film and measuring P and $\delta$.

$$P=k\delta \tag{1}$$

The length, the width, and the cross-sectional area of a sample are represented by L, W, and A, respectively. Distortion $\varepsilon$ is expressed by Formula (2) and stress $\sigma$ is expressed by Formula (3).

$$\varepsilon=\delta/L \tag{2}$$

$$\sigma=P/A \tag{3}$$

G defined by Formula (4) can be called modulus of rigidity.

$$G=kL/A \tag{4}$$

A product of the modulus of rigidity G and the thickness of a sample (or the rigidity k times a sample length divided by the sample width) is parameter G'. Here, G' is expressed by Formula (5).

$$G'=kL/W \tag{5}$$

Here, the ratio between stress $\sigma$ and distortion $\varepsilon$ is E, which can be expressed by Formula (6).

$$E=\sigma/\varepsilon \tag{6}$$

As a result of substitution of Formulae (1) to (3) in Formula (6), E can be expressed by Formula (7). That is, E is equal to the modulus of rigidity G here.

$$E=(P/A)\div(\delta/L)=(P/\delta)\cdot(L/A)=kL/A \tag{7}$$

The fact that E is equal to G and Formula (6) mean that G, $\sigma$, and $\varepsilon$ satisfy Formula (8).

$$G=\sigma/\varepsilon \tag{8}$$

<Tension Test>

An example of determining k through a tension test on a film is described below.

Samples A1 to A3 and a comparative sample C1 were prepared. Each of the samples is a metal layer coated with a resin layer on the front and the back.

The samples A1 to A3 are embossed such that the ascending order of the ratio of the surface area to the area seen from above is as follows: the sample A1, the sample A2, and the sample A3.

Each sample was cut into a substantial rectangle with a width W of 15 mm and a length L of 100 mm. The length L is, for example, the length of a side of the rectangle that is substantially parallel to the tensile direction.

A region within 25 mm of one end of the 100-mm length was fixed with a first jig, and a region within 25 mm of the other end was fixed with a second jig. The first jig is 50 mm away from the second jig.

The first jig was pulled at a rate of 10 mm/min to apply tensile stress. The measurement start position was where the applied force reached 5 N. Distortion in response to applied force was measured.

Figure 8A:
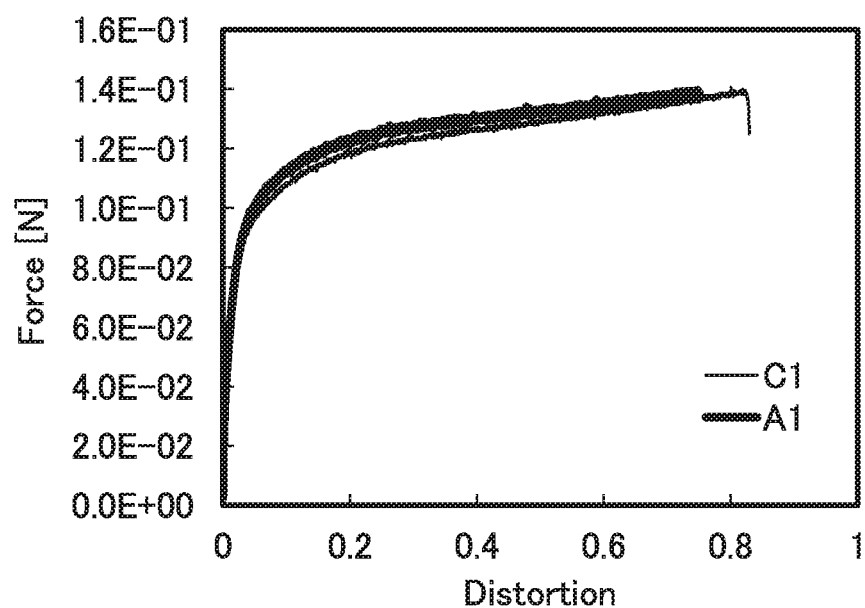
FIGS. 8A and 8B show test results of films.
Figure 8B:
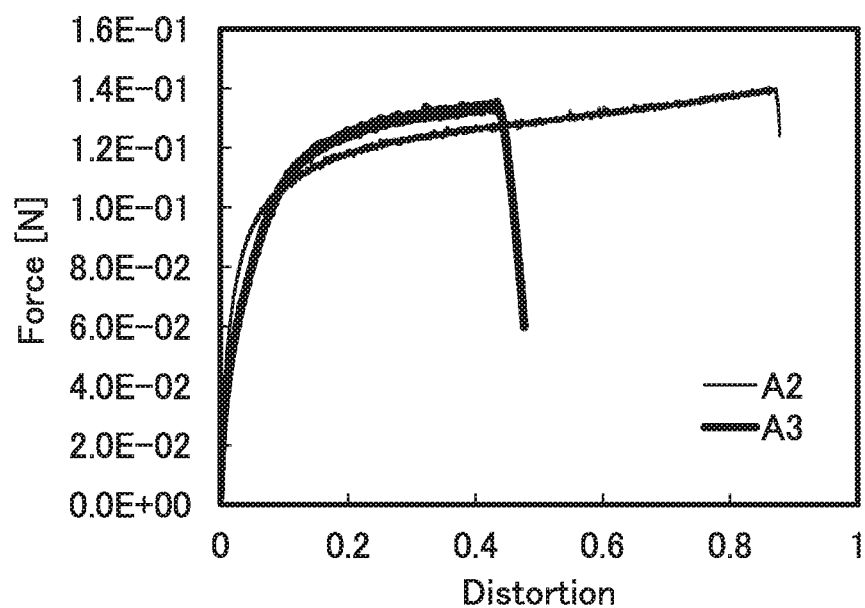

FIG. 8A shows the measurement results of the comparative sample C1 and the sample A1 and FIG. 8B shows those of the samples A2 and A3. In each of FIGS. 8A and 8B, the horizontal axis represents distortion $\varepsilon$ and the vertical axis represents force P. Displacement (amount of change) $\delta$ is a change in length by a tension test. Distortion $\varepsilon$ is expressed by Formula (2). L is the length before pulling.

$$\varepsilon=\delta/L \tag{2}$$

Here, Formula (9) is obtained by modifying Formula (8). When both sides of Formula (9) are multiplied by the cross-sectional area A, Formula (10) is obtained using Formula (3). Accordingly, the modulus of rigidity G can be obtained as the slope when the horizontal axis represents $\varepsilon$ and the vertical axis represents stress $\sigma$ (i.e., the quotient obtained by dividing the slope of a straight line when the horizontal axis represents $\varepsilon$ and the vertical axis represents the force P by the cross-sectional area). Formula (11) is obtained on the basis of Formulae (1) and (2). Thus, the quotient obtained by dividing the slope of a straight line when the horizontal axis represents $\varepsilon$ and the vertical axis represents the force P by L is the rigidity k.

$$\sigma=G\varepsilon \tag{9}$$

$$\sigma A=P=AG\varepsilon \tag{10}$$

$$P=k\delta=k\varepsilon L \tag{11}$$

Figure 9A:
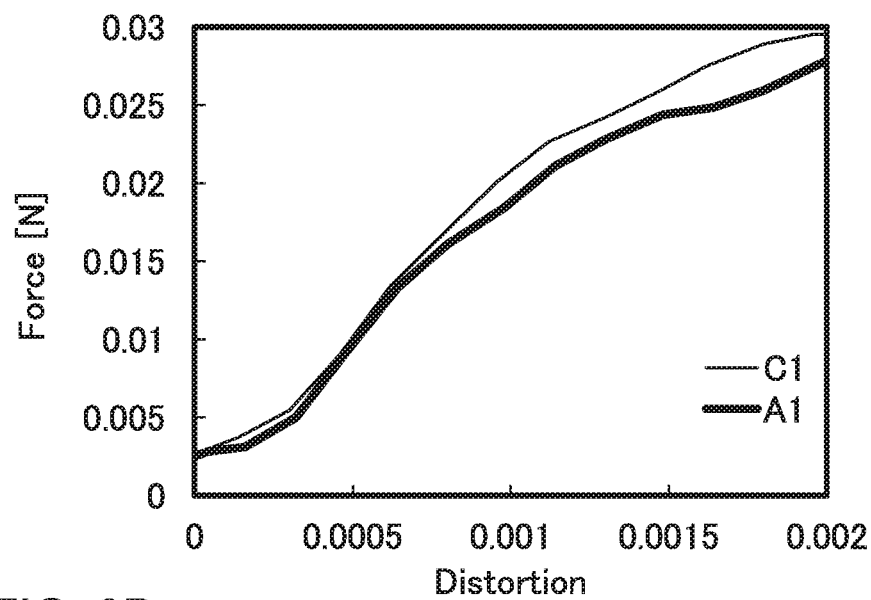
FIGS. 9A and 9B show test results of films.
Figure 9B:
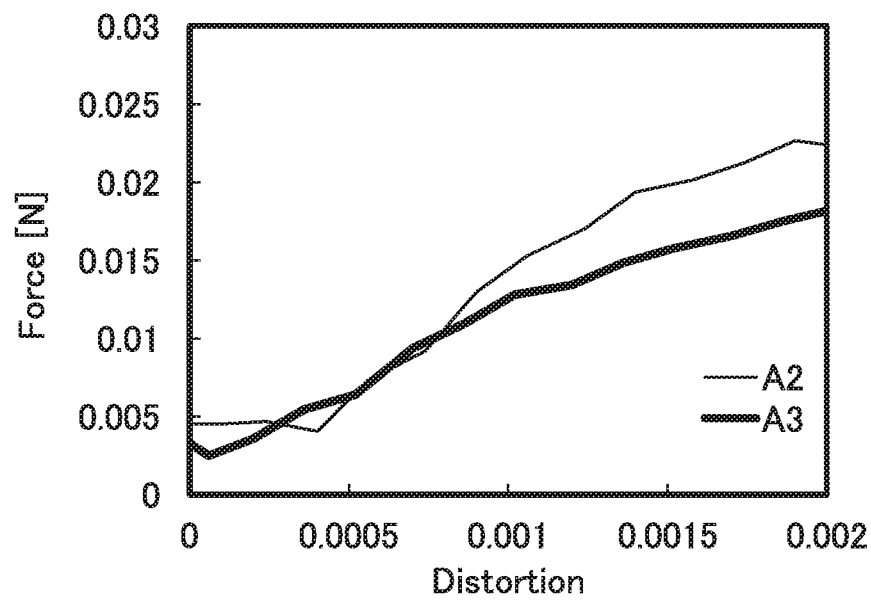

FIGS. 9A and 9B each show the range where the distortion $\varepsilon$ is 0.002 or less that is enlarged. In the range where the distortion $\varepsilon$ is greater than or equal to 0 and less than or equal to 0.002, the slope was obtained by approximation using a linear expression. The coefficient of determination $R^2$ obtained through the approximation was 0.96 to 0.97. Table 1 shows G' and k for each sample that were obtained from the value of the slope.

TABLE 1

|    | k [N/m]  | G [N/m$^2$] | G' [N/m]  |
|----|----------|-------------|-----------|
| C1 | 3.03E+05 | 6.60E+09    | 1.01E+06  |
| A1 | 2.78E+05 | 6.05E+09    | 9.25E+05  |
| A2 | 2.19E+05 | 4.77E+09    | 7.30E+05  |
| A3 | 1.71E+05 | 3.72E+09    | 5.69E+05  |

As can be observed from Table 1, the higher the ratio of the surface area to the area seen from above, the lower the rigidity and the modulus of rigidity. Here, the thickness of each of the samples A1 to A3 is the thickness before embossing, the thickness of a projection formed by embossing, or the thickness of a region between projections. In the calculation here, as an example, the thickness of a film before processing was used as the thickness. Furthermore, a product of the sample width and the sample thickness was used as the cross-sectional area in the calculation.

The rigidity, the modulus of rigidity, and the parameter G' of the exterior body of the power storage device of one embodiment of the present invention are preferably less than 0.9 times, further preferably greater than or equal to 0.5 times and less than 0.9 times, still further preferably greater than or equal to 0.6 times and less than 0.8 times those of the comparative sample C1 not provided with projections or the like, for example.

The modulus of rigidity of the exterior body of the power storage device is preferably less than 6.5×10$^9$ N/m$^2$, further preferably less than or equal to 6.3×10$^9$ N, still further preferably greater than or equal to 4.0×10$^9$ N and less than or equal to 5.7×10$^9$ N, for example. The parameter G' of the exterior body of the power storage device is preferably less than 9.9×10$^5$ N/m$^2$, further preferably less than or equal to 9.6×10$^5$ N, still further preferably greater than or equal to 6.1×10$^5$ N and less than or equal to 8.7×10$^5$ N, for example.

<Point of Rupture>

In the tension test results shown in FIGS. 8A and 8B, a sharp drop in force during the tension test is observed.

Table 2 shows approximate values of the distortion ε and the force P at the point where the force sharply decreases that are obtained from the tension test results in FIGS. 8A and 8B.

TABLE 2

|    | ε    | P [N] |
|----|------|-------|
| C1 | 0.75 | 139   |
| A1 | 0.82 | 140   |
| A2 | 0.87 | 140   |
| A3 | 0.43 | 133   |

Such a point where the force sharply decreases is the point where the film ruptures, e.g., is cracked, in some cases. In that case, the point is called a point of rupture. When the film is provided with projections or the like, there might be a region in which force is likely to be locally concentrated over the plane of the film, for example. The likelihood of this concentration depends on the depth of the projection, the gap between the projections, or the like in some cases. In addition, there might be a region in which the film is thinned because of the projection or the like. A crack or the like is especially likely to be formed in the above regions, which leads to a rupture. In other words, a film provided with a projection or the like easily ruptures in some cases.

Table 2 shows that the force at the point of rupture and the distortion ε at the point of rupture are 0.139 or more and 0.7 or more, respectively, in the samples A1 and A2 and are equivalent to those in the comparative sample 1 (not embossed); however, the force at the point of rupture and the distortion at the point of rupture are 0.133 and 0.43, respectively, in the sample A3 and are lower than those in the comparative sample 1.

In the sample A3, the ratio of the surface area to the area seen from above is high, which might result in concentration of tensile stress in some regions of the film, for example.

In the exterior body of the power storage device of one embodiment of the present invention, for example, the distortion ε at the point of rupture is greater than or equal to 0.6, or greater than 0.6 and less than or equal to 2.

<Graphene Compound>

A graphene compound of one embodiment of the present invention is described below.

Graphene has carbon atoms arranged in one atomic layer. A π bond exists between the carbon atoms. Graphene including two or more and hundred or less layers is referred to as multilayer graphene in some cases. The length in the longitudinal direction or the length of the major axis in a plane in each of graphene and multilayer graphene is greater than or equal to 50 nm and less than or equal to 100 μm or greater than or equal to 800 nm and less than or equal to 50 μm.

In this specification and the like, a compound including graphene or multilayer graphene as a basic skeleton is referred to as a graphene compound. Graphene compounds include graphene and multilayer graphene.

Graphene compounds are detailed below.

A graphene compound is a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or alkylene. An atomic group that modifies graphene or multilayer graphene is referred to as a substituent, a functional group, a characteristic group, or the like in some cases. Modification in this specification and the like refers to introduction of an atom other than carbon, an atomic group with an atom other than carbon, or an atomic group composed mainly of carbon to graphene, multilayer graphene, a graphene compound, or graphene oxide (described later) by a substitution reaction, an addition reaction, or other reactions.

Note that the surface side and the rear surface side of graphene may be modified with different atoms or atomic groups. In multilayer graphene, multiple layers may be modified with different atoms or atomic groups.

An example of the above-described graphene modified with an atom or an atomic group is graphene or multilayer graphene that is modified with oxygen or a functional group containing oxygen. Examples of a functional group containing oxygen include an epoxy group, a carbonyl group such as a carboxyl group, and a hydroxyl group. A graphene compound modified with oxygen or a functional group containing oxygen is referred to as graphene oxide in some cases. In this specification, graphene oxides include multilayer graphene oxides.

By introducing a given atomic group to a graphene compound, the physical property of the graphene compound can be changed. Therefore, by performing desirable modification in accordance with the application of a graphene compound, a desired property of the graphene compound can be exhibited intentionally.

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further modified with the above-mentioned atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of bonded oxygen or atomic group containing oxygen. In some cases, RGO includes a functional group, e.g., an epoxy group, a carbonyl group such as a carboxyl group, or a hydroxyl group.

A graphene compound may have a sheet-like shape where a plurality of graphene compounds overlap each other. Such a graphene compound is referred to as graphene compound sheet in some cases. The graphene compound sheet has, for example, an area with a thickness larger than or equal to 0.33 nm and smaller than or equal to 10 mm, preferably larger than 0.34 nm and smaller than or equal to 10 μm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring which is a seven- or more-membered ring, a region through which a lithium ion can pass may be generated.

A plurality of graphene compounds may be gathered to form a sheet-like shape. A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

In contrast, a graphene compound may also be used as an insulator. For example, a graphene compound sheet may be used as a sheet-like insulator. Graphene oxide, for example, has a higher insulation property than a graphene compound that is not oxidized, in some cases. A graphene compound modified with an atomic group may have an improved insulation property, depending on the type of the modifying atomic group.

A graphene compound in this specification and the like may include a precursor of graphene. The precursor of graphene refers to a substance used for forming graphene. The precursor of graphene may contain the above-described graphene oxide, graphite oxide, or the like.

Graphene containing an alkali metal or an element other than carbon, such as oxygen, is referred to as a graphene analog in some cases. In this specification and the like, graphene compounds include graphene analogs.

A graphene compound in this specification and the like may include an atom, an atomic group, and ions of them between the layers. The physical properties, such as electric conductivity and ion conductivity, of a graphene compound sometimes change when an atom, an atomic group, and ions of them exist between layers of the compound. In addition, a distance between the layers is increased in some cases.

A graphene compound has excellent electrical characteristics of high conductivity and excellent physical properties of high flexibility and high mechanical strength in some cases. A modified graphene compound can have extremely low conductivity and serve as an insulator depending on the type of the modification. A graphene compound has a planar shape. A graphene compound enables low-resistance surface contact.

This embodiment can be implemented in appropriate combination with any of the other embodiments.

Embodiment 2

In this embodiment, power storage devices of embodiments of the present invention are described.

<Example of Power Storage Device: Thin Storage Battery>

An example of a power storage device including the exterior body of one embodiment of the present invention is described below.

Figure 10:
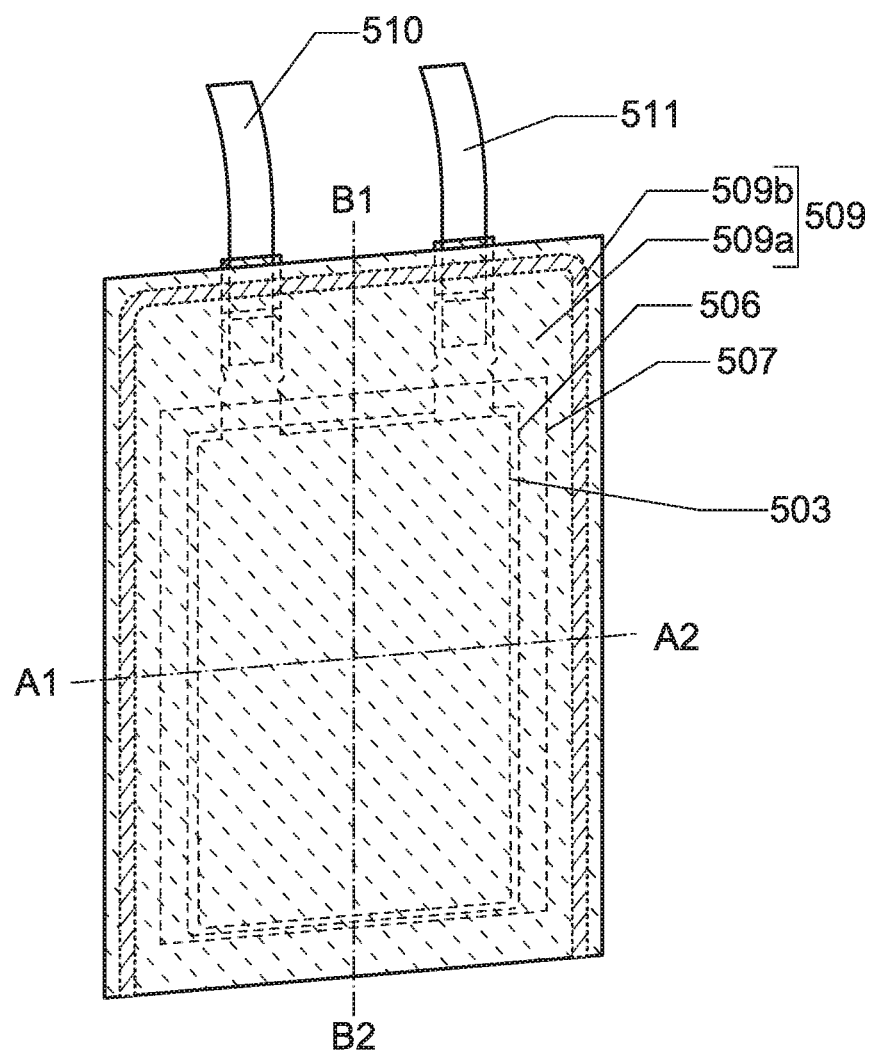
FIG. 10 illustrates a power storage device.

FIG. 10 illustrates a thin storage battery as an example of a power storage device. When a flexible thin storage battery is used in an electronic device at least part of which is flexible, the storage battery can be bent as the electronic device changes their shapes.

Figure 11A:
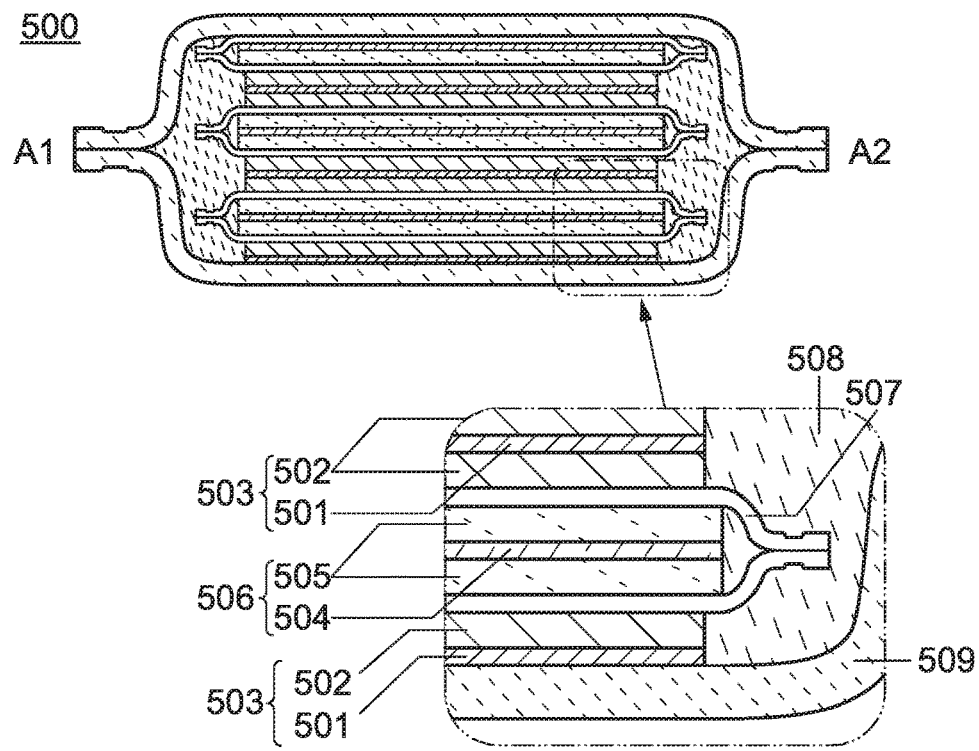
FIGS. 11A and 11B illustrate cross sections of a power storage device.
Figure 11B:
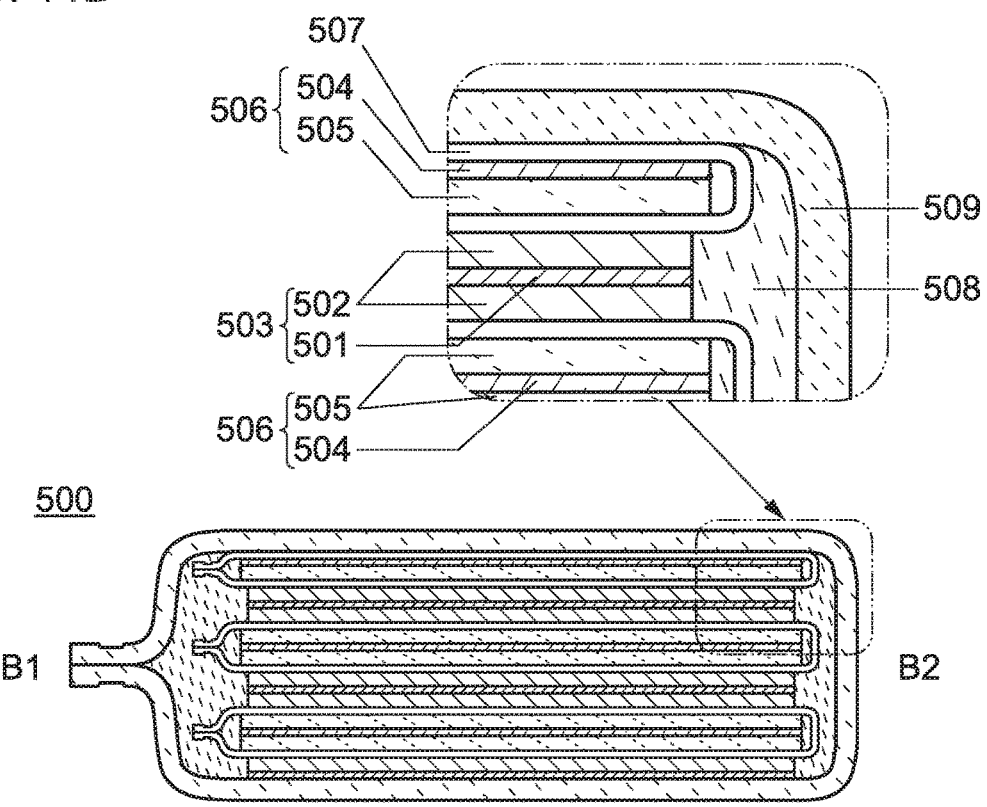

FIG. 10 is an external view of a power storage device 500, which is a thin storage battery. FIG. 11A is a cross-sectional view along dashed-dotted line A1-A2 in FIG. 10, and FIG. 11B is a cross-sectional view along dashed-dotted line B1-B2 in FIG. 10. The power storage device 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is contained in the exterior body 509.

In the example illustrated in FIG. 10, the exterior body 509 preferably includes a region 509a and a region 509b. In the example illustrated in FIG. 10, the region 509b functions as a sealing region of the exterior body 509. The region 509b seals three sides on the top surface of the exterior body 509. The exterior body 509 can be sealed by heat or the like.

The exterior body described in Embodiment 1 can be used as the exterior body 509.

Description of the exterior body in Embodiment 1 can be referred to for the region 509a and the region 509b.

The sealing structure of the power storage device is as follows: one rectangular film is folded in half such that two end portions overlap with each other and is sealed on three sides with an adhesive layer, or two films are stacked so as to overlap with each other and is sealed on four sides, which are edges of the film, with an adhesive layer.

The adhesive layer can be formed using a thermoplastic film material, a thermosetting adhesive, an anaerobic adhesive, a photo-curable adhesive such as a UV curable adhesive, or a reactive curable adhesive. As the material of the adhesive, an epoxy resin, an acrylic resin, a silicone resin, a phenol resin, or the like can be used.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 12A:
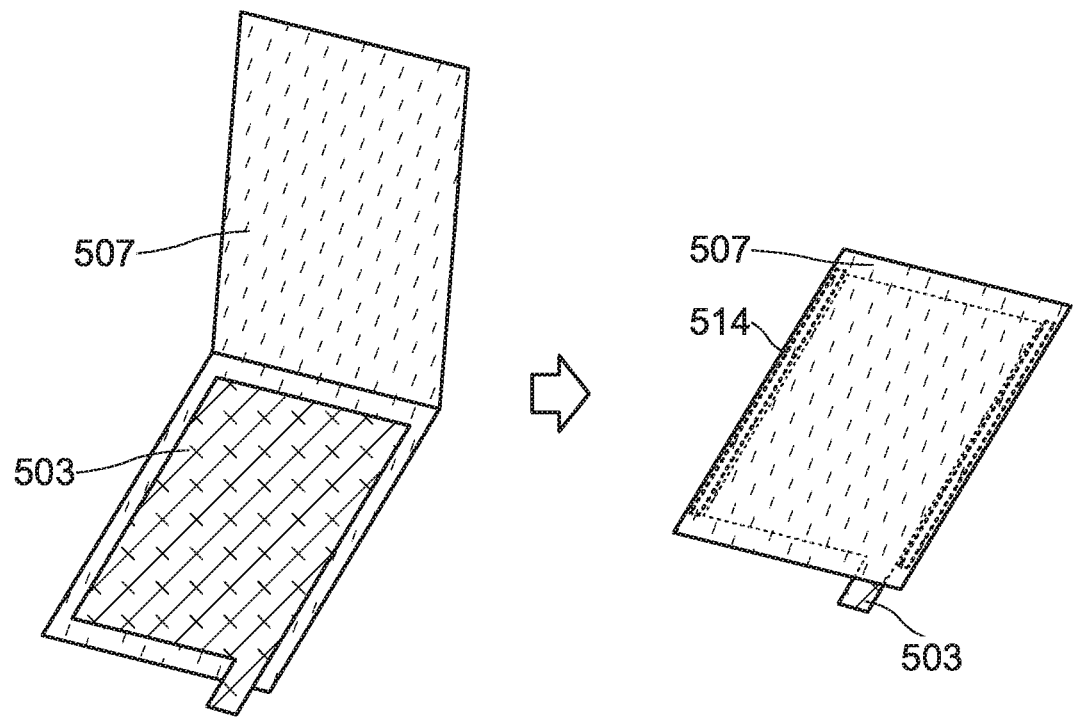
FIGS. 12A and 12B illustrate a method for manufacturing a power storage device.
Figure 12B:
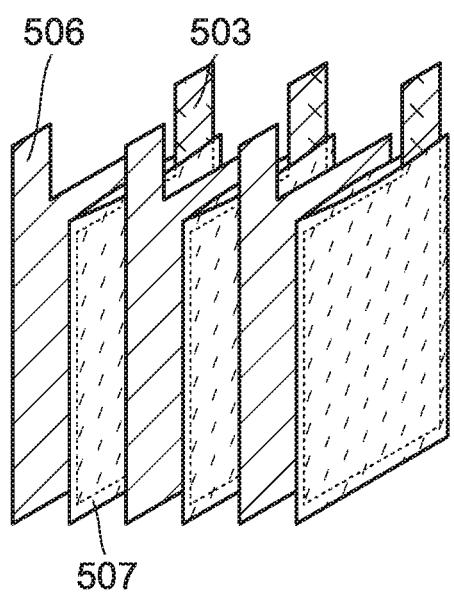

The separator 507 is preferably formed to have a bag-like shape to surround one of the positive electrode 503 and the negative electrode 506. For example, as illustrated in FIG. 12A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 12B, the positive electrodes 503 surrounded by the separators 507 and the negative electrodes 506 are alternately stacked and provided in the exterior body 509, whereby the power storage device 500, which is a thin storage battery, can be formed.

Details about the positive electrode 503 and the negative electrode 506 are described in the following embodiment.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where the reaction potential of the positive electrode or the negative electrode is out of the range of the potential window of the electrolytic solution 508, the electrolytic solution is decomposed by charge and discharge operations of a storage battery in some cases. In the case where the electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased.

When the resistance is extremely increased, the negative electrode potential is lowered. Consequently, lithium is intercalated into graphite and lithium is deposited on the surface of graphite. The lithium deposition might reduce capacity. For example, if a film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the negative electrode potential reaches the potential of lithium because of an increase in charging voltage.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a film on a surface of graphite. The formed coating film may thus be densified when the charging state is held at a temperature higher than room temperature after the release of the gas, for example.

Figure 13A:
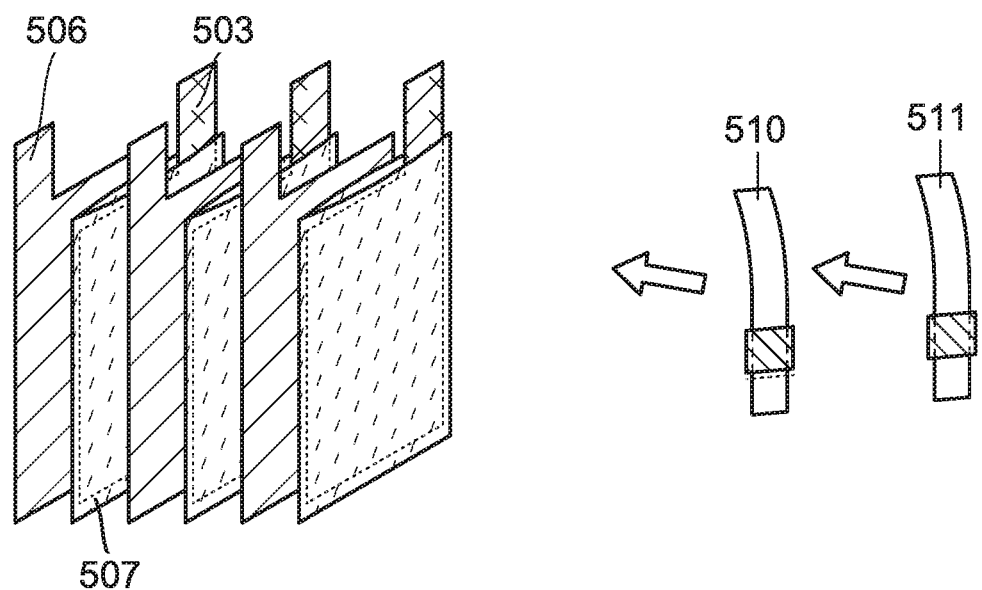
FIGS. 13A and 13B illustrate a method for manufacturing a power storage device.
Figure 13B:
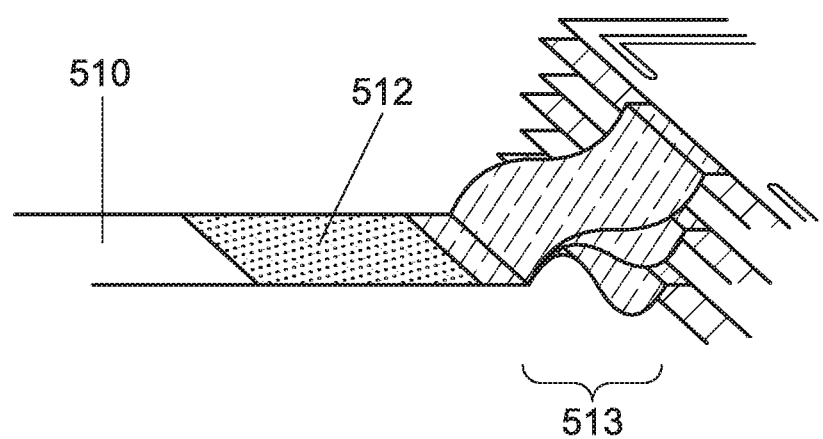

FIGS. 13A and 13B illustrate an example where current collectors are welded to a lead electrode. As illustrated in FIG. 13A, the positive electrodes 503 each wrapped by the separator 507 and the negative electrodes 506 are alternately stacked. Then, the positive electrode current collectors 501 are welded to the positive electrode lead electrode 510, and the negative electrode current collectors 504 are welded to the negative electrode lead electrode 511. FIG. 13B illustrates an example in which the positive electrode current collectors 501 are welded to the positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 13B, and it is therefore possible to relieve stress due to external force applied after fabrication of the power storage device 500. The reliability of the power storage device 500 can be thus increased. Here, a region of the positive electrode current collector or the negative electrode current collector on which welding is performed is referred to as a tab region in some cases.

In the power storage device 500 illustrated in FIG. 10 and FIGS. 11A and 11B, the positive electrode current collectors 501 and the negative electrode current collectors 504 are welded to the positive electrode lead electrode 510 and the negative electrode lead electrode 511, respectively, by ultrasonic welding so that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 14:
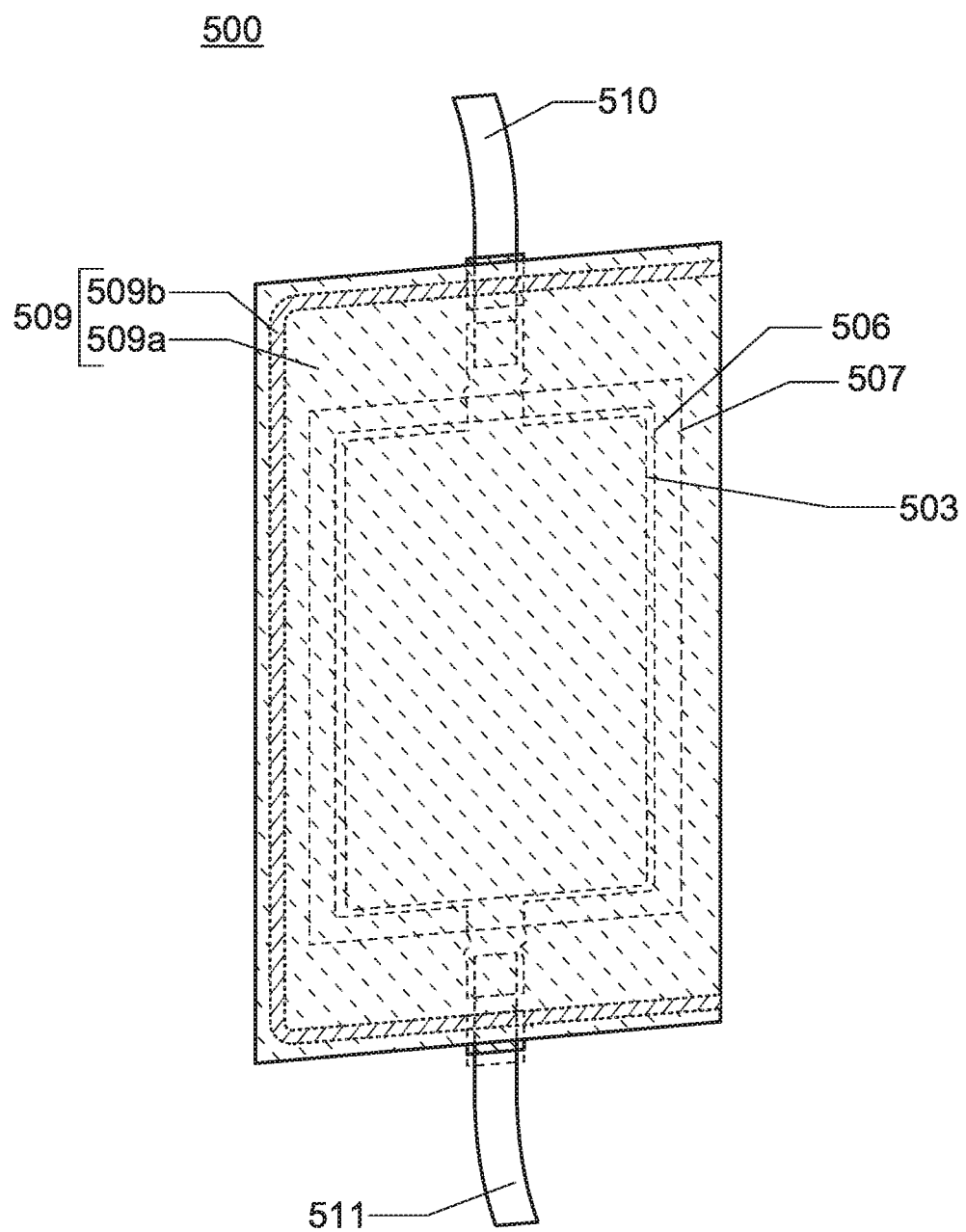
FIG. 14 illustrates a power storage device.

Although the positive electrode lead electrode 510 and the negative electrode lead electrode 511 are provided on the same side in FIG. 10, the positive electrode lead electrode 510 and the negative electrode lead electrode 511 may be provided on different sides as illustrated in FIG. 14. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

Although the examples in FIGS. 11A and 11B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of electrode active material layers, the storage battery can have a high capacity. In contrast, in the case of using a small number of electrode active material layers, the storage battery can have a small thickness and high flexibility.

In the above structure, the exterior body 509 of the storage battery can change its form such that the smallest curvature radius is greater than or equal to 3 mm and less than or equal to 30 mm, preferably greater than or equal to 3 mm and less than or equal to 10 mm. One or two films are used as the exterior body of the storage battery. In the case where the storage battery has a layered structure, the storage battery that is bent has a cross section sandwiched by two curves of the films serving as the exterior body.

Figure 15A:
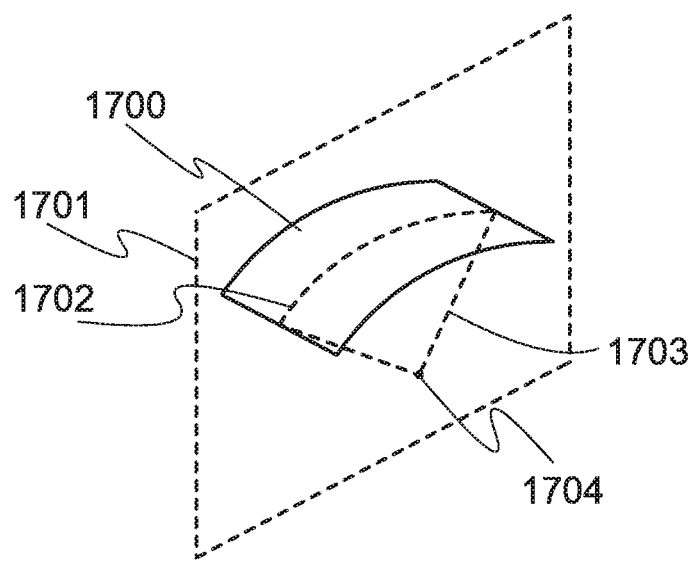
FIGS. 15A to 15C illustrate a radius of curvature of a plane.
Figure 15B:
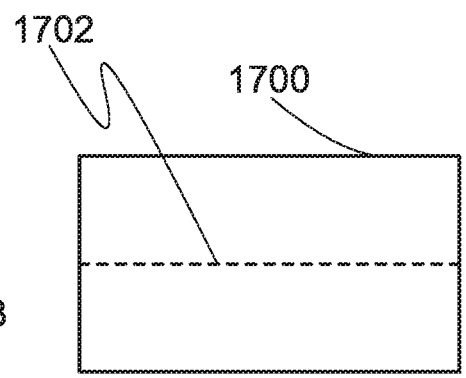
Figure 15C:
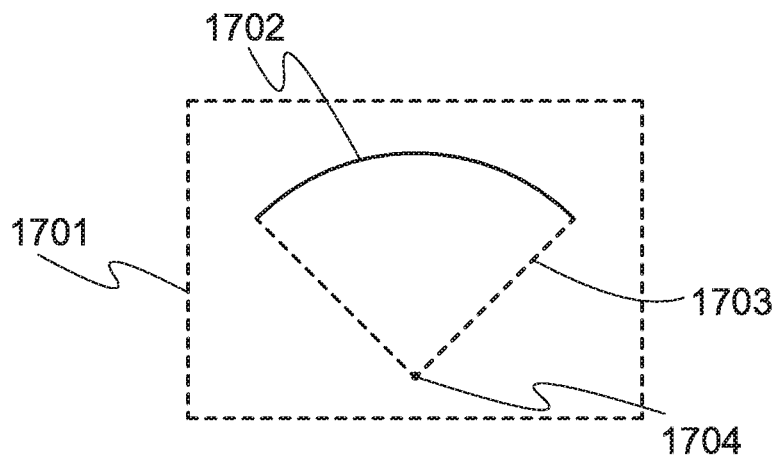

Description will be given of the radius of curvature of a surface with reference to FIGS. 15A to 15C. In FIG. 15A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 15B is a top view of the curved surface 1700. FIG. 15C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 16A:
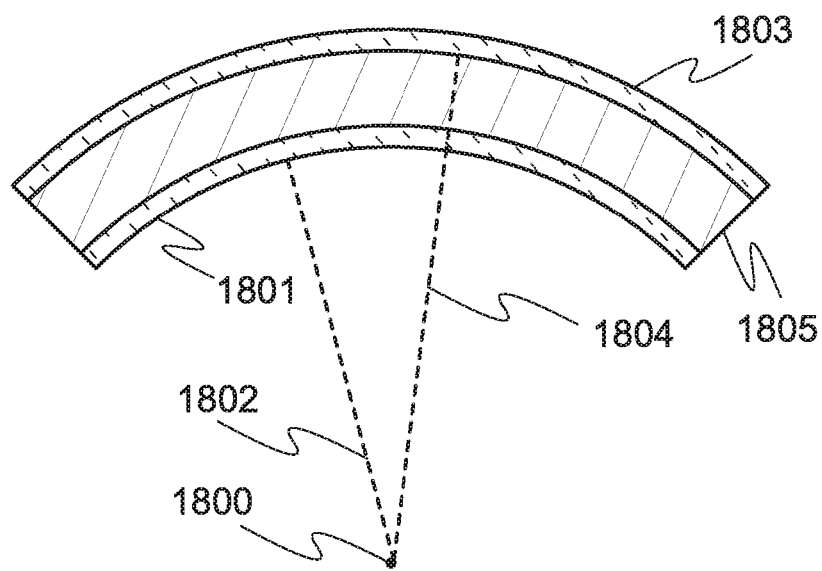
FIGS. 16A to 16D illustrate a radius of curvature of a film.
Figure 16B:
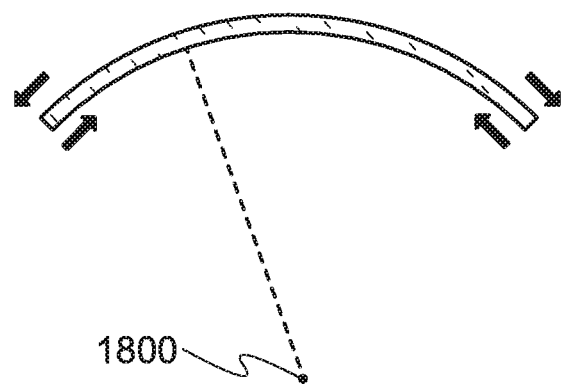

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 16A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 16B). However, by forming a pattern including projections on the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 16C:
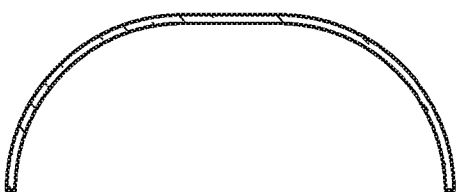
Figure 16D:
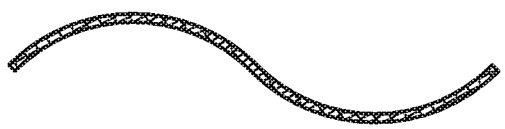

Note that the cross-sectional shape of the secondary battery is not limited to a simple arc shape, and the cross section can be partly arc-shaped; for example, a shape illustrated in FIG. 16C, a wavy shape illustrated in FIG. 16D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 17A:
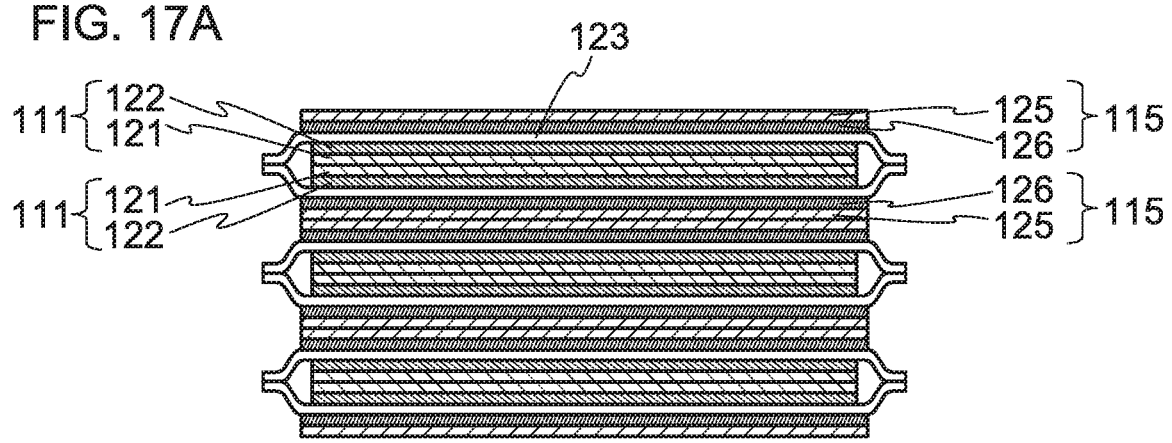
FIGS. 17A to 17C illustrate cross sections of a power storage device.

FIG. 17A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 17A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the power storage device is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body 509 of the power storage device 500 in the case where the power storage device 500 is curved, for example. Therefore, the deterioration of the power storage device 500 can be inhibited. Furthermore, the power storage device 500 can have high reliability.

Figure 17B:
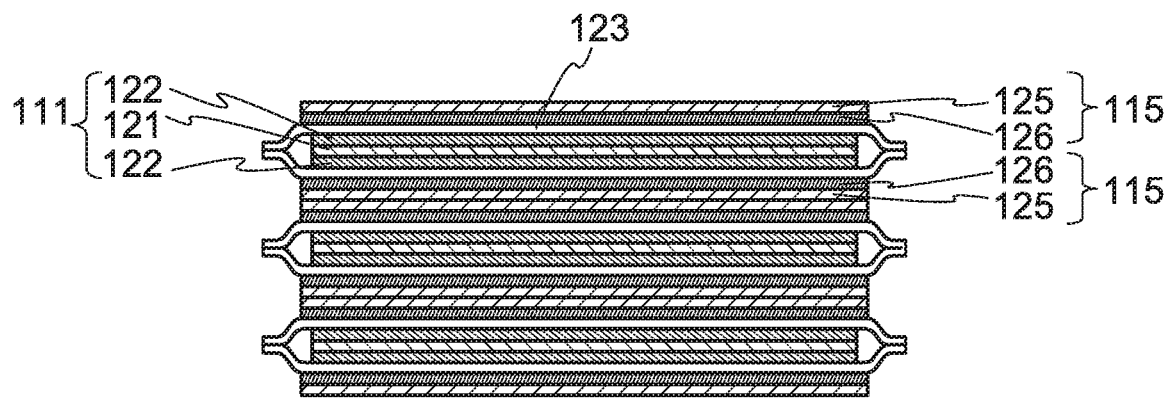

FIG. 17B illustrates an example of a stack of the positive electrodes 111 and the negative electrodes 115 which is different from that in FIG. 17A. The structure illustrated in FIG. 17B is different from that in FIG. 17A in that the positive electrode active material layers 122 are provided on both surfaces of the positive electrode current collector 121. When the positive electrode active material layers 122 are provided on both surfaces of the positive electrode current collector 121 as illustrated in FIG. 17B, the capacity per unit volume of the power storage device 500 can be increased.

Figure 17C:
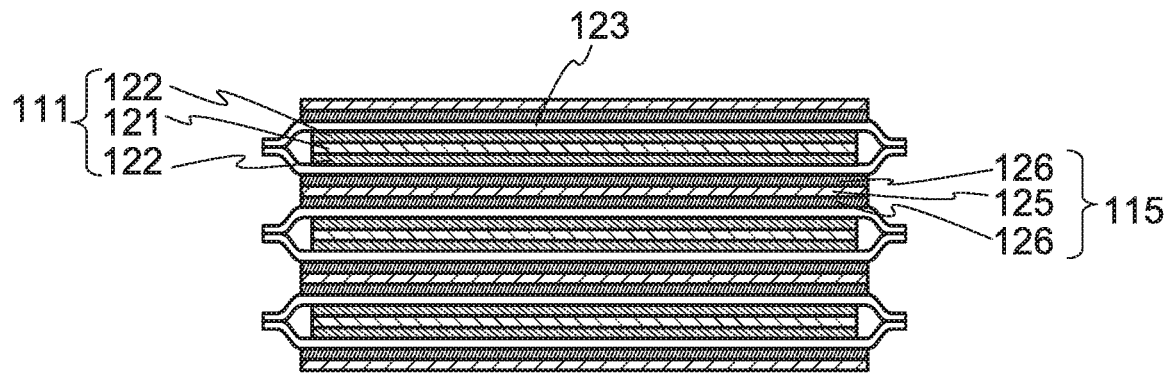

FIG. 17C illustrates an example of a stack of the positive electrodes 111 and the negative electrodes 115 which is different from that in FIG. 17B. The structure illustrated in FIG. 17C is different from that in FIG. 17B in that the negative electrode active material layers 126 are provided on both surfaces of the negative electrode current collector 125. When the negative electrode active material layers 126 are provided on both surfaces of the negative electrode current collector 125 as illustrated in FIG. 17C, the capacity per unit volume of the power storage device 500 can be further increased.

Figure 18A:
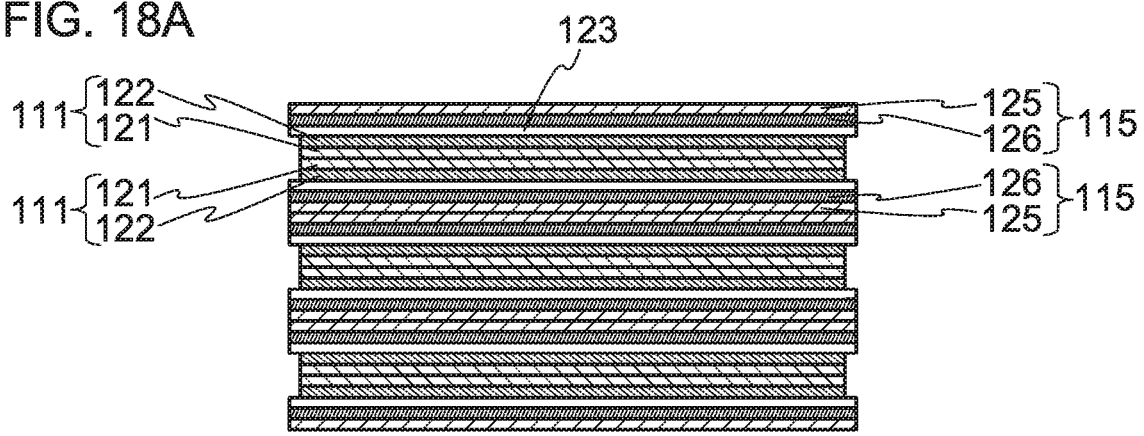
FIGS. 18A and 18B illustrate cross sections of a power storage device.

In the structures illustrated in FIGS. 11A and 11B and FIGS. 17A to 17C, the separator 123 has a bag-like shape by which the positive electrodes 111 are surrounded; however, one embodiment of the present invention is not limited thereto. FIG. 18A illustrates an example in which the separator 123 has a different structure from that in FIG. 17A. The structure illustrated in FIG. 18A is different from that in FIG. 17A in that the separator 123, which is sheet-like, is provided between every pair of the positive electrode active material layer 122 and the negative electrode active material layer 126. In the structure illustrated in FIG. 18A, six positive electrodes 111 and six negative electrodes 115 are stacked, and six separators 123 are provided.

Figure 18B:
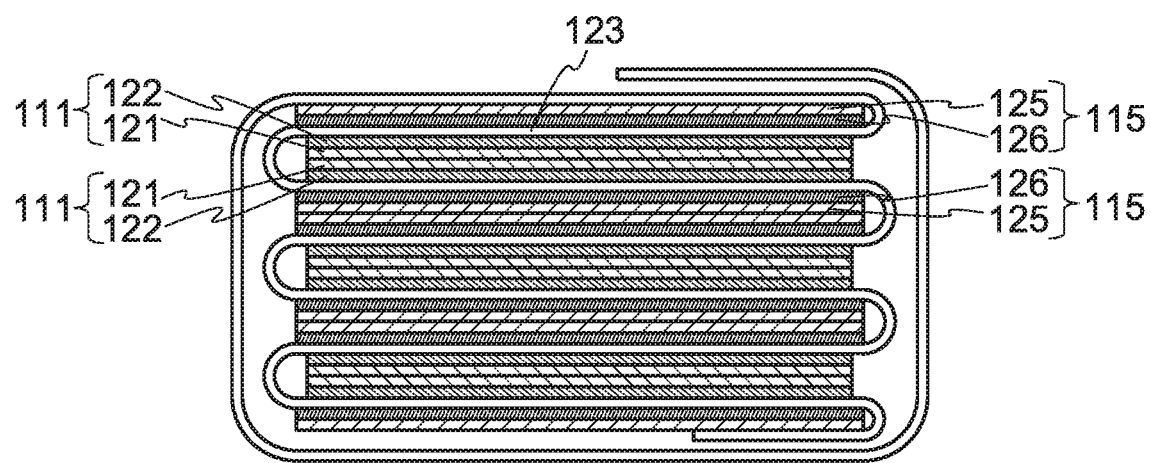

FIG. 18B illustrates an example in which the separator 123 different from that in FIG. 18A is provided. The structure illustrated in FIG. 18B is different from that in FIG. 18A in that one sheet of separator 123 is folded more than once to be interposed between every pair of the positive electrode active material layer 122 and the negative electrode active material layer 126. It can be said that the structure illustrated in FIG. 18B is a structure in which the separators 123 in the respective layers which are illustrated in FIG. 18A are extended and connected together between the layers. In the structure illustrated in FIG. 18B, six layers of the positive electrodes 111 and six layers of the negative electrodes 115 are stacked and the separator 123 is folded five times or more. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 19A:
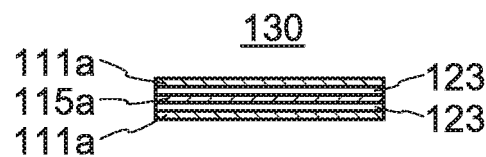
FIGS. 19A to 19C illustrate cross sections of a power storage device.
Figure 19B:
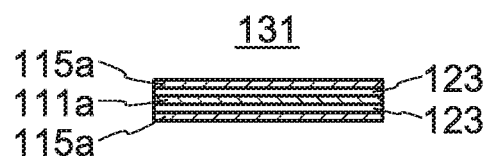
Figure 19C:
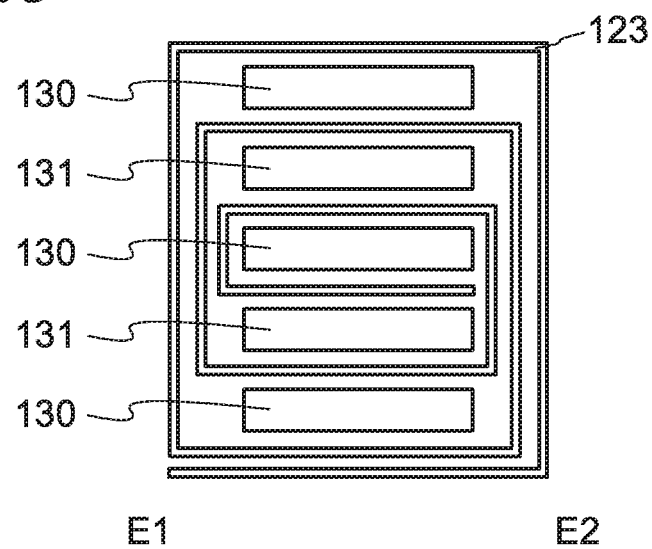

Note that the positive electrode, the negative electrode, and the separator may be stacked as illustrated in FIGS. 19A to 19C. FIG. 19A is a cross-sectional view of a first electrode assembly 130, and FIG. 19B is a cross-sectional view of a second electrode assembly 131. FIG. 19C is a cross-sectional view taken along the dashed-dotted line A1-A2 in FIG. 10. In FIG. 19C, the first electrode assembly 130, the second electrode assembly 131, and the separator 123 are selectively illustrated for the sake of clarity.

As illustrated in FIG. 19C, the power storage device 500 includes a plurality of first electrode assemblies 130 and a plurality of second electrode assemblies 131.

As illustrated in FIG. 19A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 19B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 19C, the plurality of first electrode assemblies 130 and the plurality of second electrode assemblies 131 are covered with the wound separator 123.

<Structure Example of Exterior Body>

Figure 20A:
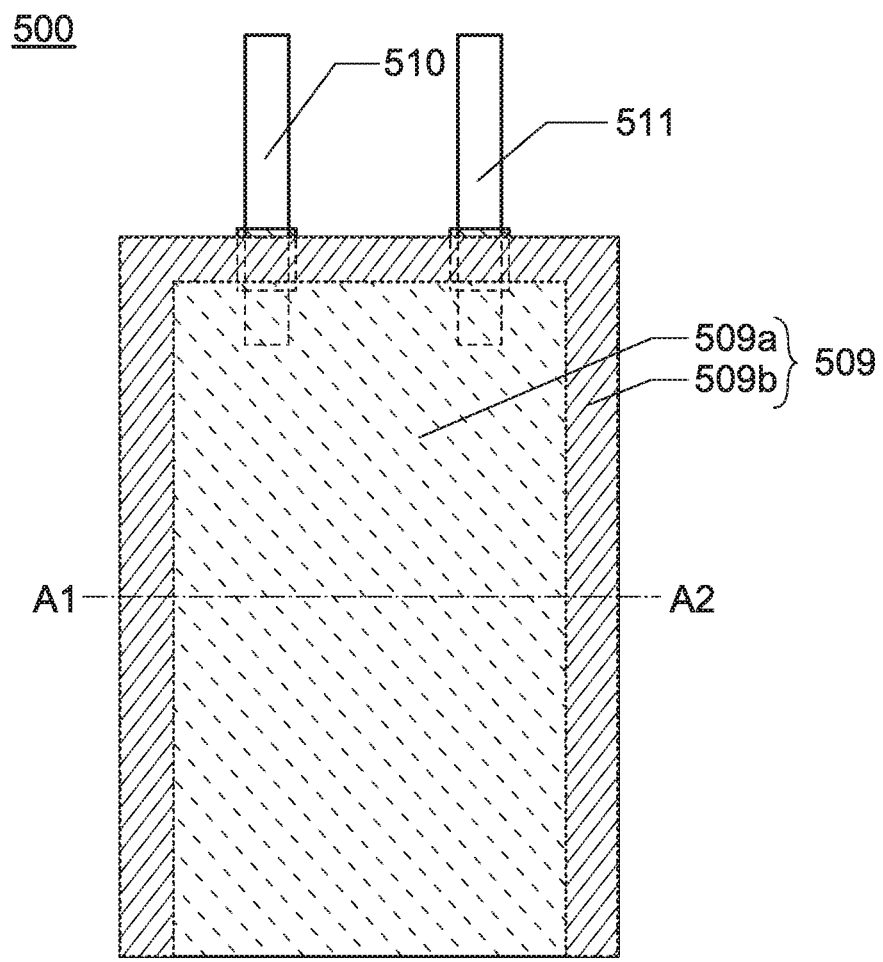
FIG. 20A is a top view of a power storage device and FIG. 20B is a cross-sectional view thereof.
Figure 20B:
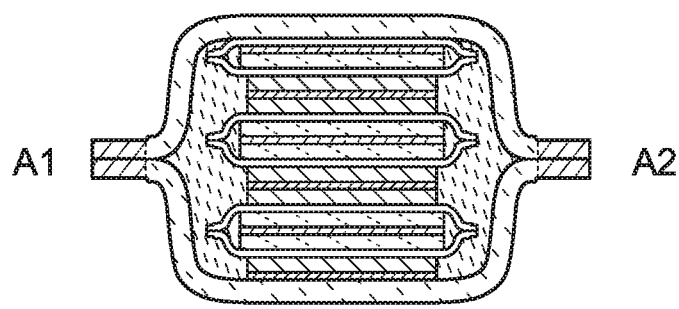

An example in which the region 509b has a shape different from that in FIG. 10 is illustrated in FIG. 20A. FIG. 20A illustrates a top surface of the power storage device 500. FIG. 20B illustrates a cross section along dashed-dotted line A1-A2 in FIG. 20A. To avoid complexity, the positive electrode 503, the negative electrode 506, and the separator 507 are not necessarily illustrated in FIG. 20A and the subsequent drawings.

In FIG. 20A, the exterior body 509 includes the region 509a and the region 509b. Part or the whole of the region 509b is a sealing portion.

<Variation 1>

Figure 21A:
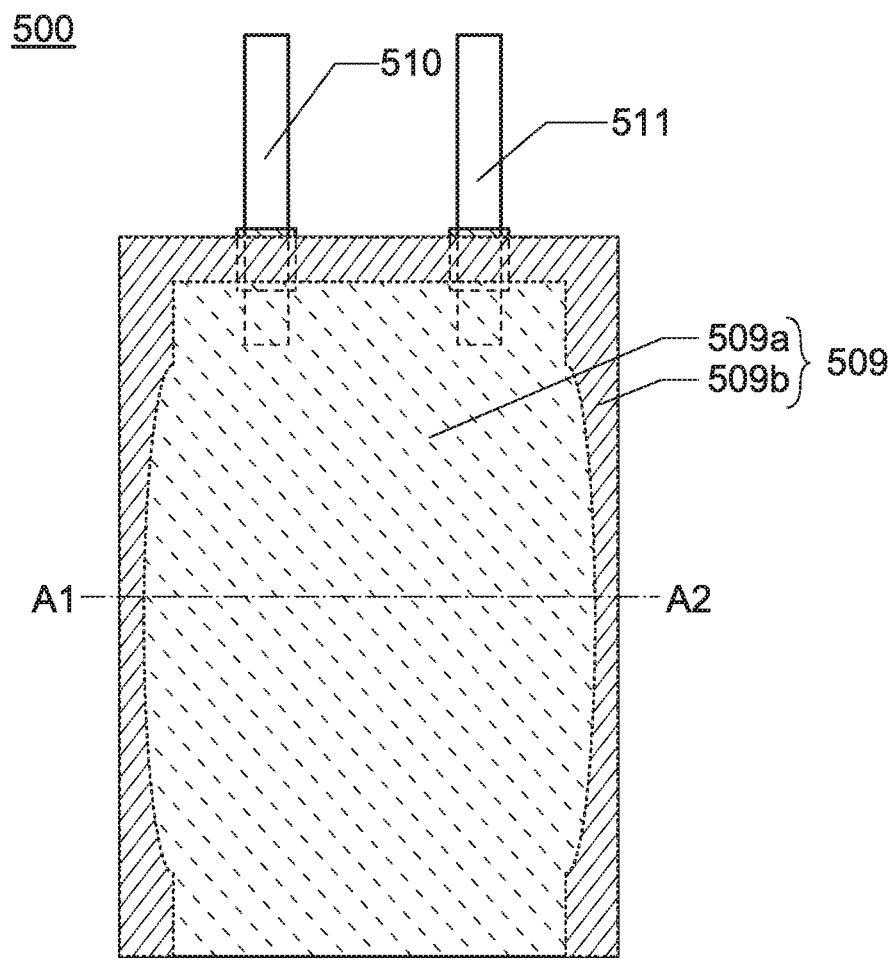
FIG. 21A is a top view of a power storage device and FIG. 21B is a cross-sectional view thereof.

An example in which the region 509b has a shape different from that in FIG. 20A is illustrated in FIG. 21A.

Figure 21B:
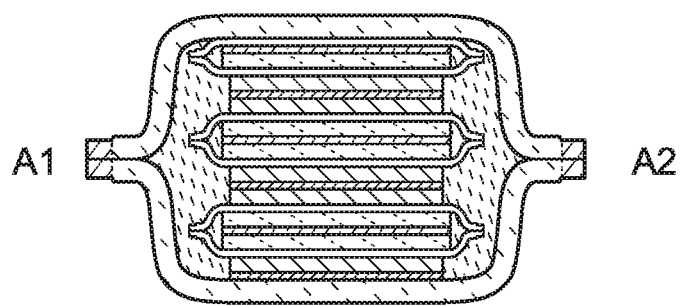

FIG. 21A illustrates a top surface of the power storage device 500. FIG. 21B illustrates a cross section along dashed-dotted line A1-A2 in FIG. 21A.

In FIG. 21A, the exterior body 509 includes the region 509a and the region 509b. Part or the whole of the region 509b is a sealing portion.

In the top surface illustrated in FIG. 21A, the regions of the region 509b which face the left and right side surfaces of the exterior body 509 have arched shapes, which can be rephrased as "the regions have depressions".

When the region 509b, which serves as a sealing portion, has arched regions along the side surfaces of the exterior body 509, stress can be relaxed in bending the power storage device 500 and a wrinkle on the exterior body 509 can be prevented in some cases.

Figure 22A:
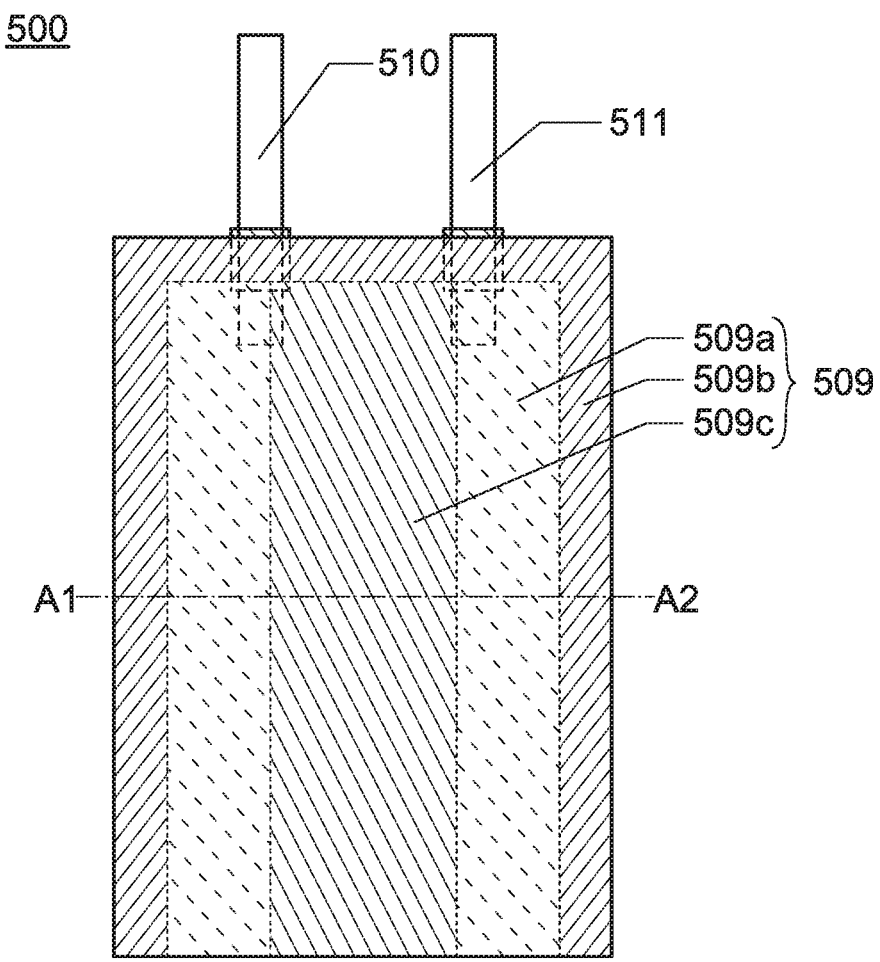
FIG. 22A is a top view of a power storage device and FIG. 22B is a cross-sectional view thereof.
Figure 22B:
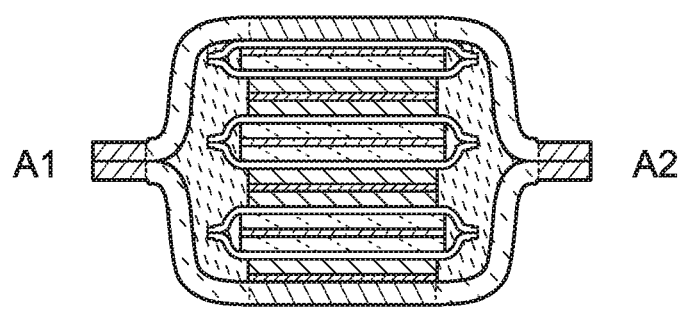

FIG. 22A illustrates a top surface of the power storage device 500. FIG. 22B illustrates a cross section along dashed-dotted line A1-A2 in FIG. 22A. The exterior body 509 of the power storage device 500 illustrated in FIG. 22A includes the regions 509a, the region 509b, and a region 509c. In FIG. 22A, the regions 509a are located on the left and right sides of the region 509c and the region 509b is located outside the regions 509a.

The region 509b is preferably a sealing portion of the exterior body 509, for example. When the region 509b is a sealing portion in the top surface of the exterior body 509 illustrated in FIG. 22A, the exterior body 509 is sealed on the top side and the left and right sides.

<Variation 2>

Figure 23A:
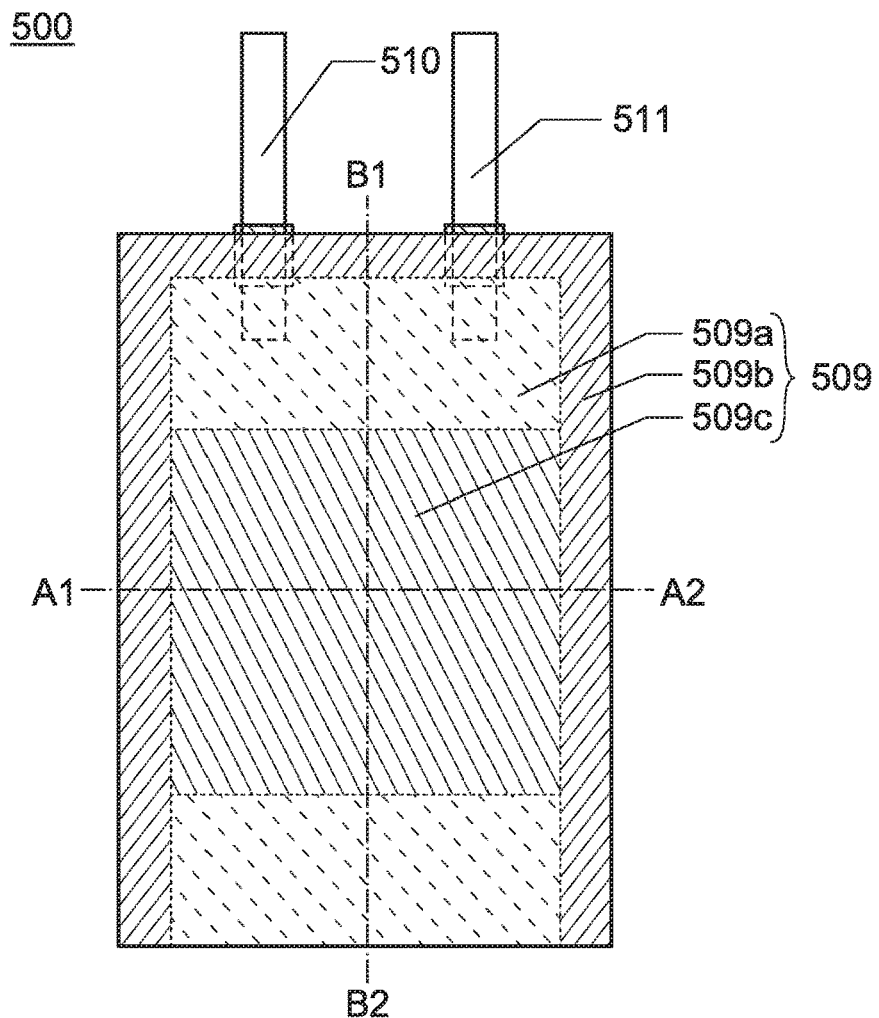
FIG. 23A is a top view of a power storage device and FIG. 23B is a cross-sectional view thereof.
Figure 23B:
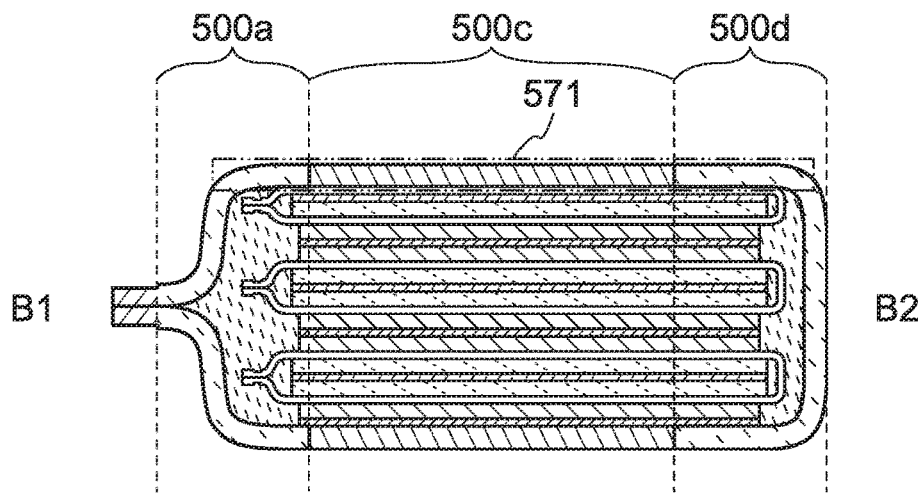

FIG. 23A illustrates a top surface of the power storage device 500. FIG. 23B illustrates a cross section along dashed-dotted line B1-B2 in FIG. 23A. The exterior body 509 of the power storage device 500 illustrated in FIG. 23A includes the regions 509a, the region 509b, and the region 509c. In FIG. 23A, the regions 509a are located on the upper and lower sides of the region 509c.

The region 509b is preferably a sealing portion of the exterior body 509. When the region 509b is a sealing portion in the top surface of the exterior body 509 illustrated in FIG. 23A, the exterior body 509 is sealed on the top side and the left and right sides.

The power storage device 500 illustrated in FIG. 23B includes a region 500a, a region 500c, and a region 500d. Here, the region 500a includes the region 509a, the region 500c includes the region 509c, and the region 500d includes the region 509a.

An example where the power storage device 500 is bent is described with reference to FIGS. 24A, 24B1, and 24B2. FIG. 24A illustrates a cross section of the power storage device 500 along dashed-dotted line A1-A2 in FIG. 10, and FIG. 24B1 is a cross section along dashed-dotted line B1-B2 in FIG. 10. FIG. 24B2 is an example of a cross section along dashed-dotted line B1-B2 in the case where the power storage device 500 is bent in the B1-B2 direction. A structure body 541 is a structure body positioned inside the exterior body 509 of the power storage device 500, e.g., a stack including a positive electrode, a negative electrode, and a separator.

When the power storage device 500 is bent in the B1-B2 direction, stress due to bending is applied to the exterior body 509. In the exterior body 509, two sheets are bonded to each other in the region 509b that includes a sealing portion. Thus, the region 509b is less likely to change its shape than the region 509a. For example, the region 509b is less likely to be stretched than the region 509a. For this reason, a region of the region 509a that is closer to the region 509b, such as a region 561 surrounded by a dashed line in FIG. 24A, undergoes higher stress or more distorted than the other regions of the region 509a in some cases. As a result, the exterior body 509 in the region 561 or the like is easily cracked, for example.

Here, when the region 509b has arched regions as illustrated in FIGS. 21A and 21B, for example, stress on the region 561 in bending the power storage device 500 in the B1-B2 direction can be relaxed and a crack or the like can be prevented in some cases.

The exterior body of the power storage device of one embodiment of the present invention is preferably provided with projections because rigidity can be reduced, for example. When the region 509a has a lower modulus of rigidity, for example, the region 509a easily expands and contracts, facilitating relaxation of stress. On the other hand, the exterior body provided with projections might increase the thickness of the power storage device. The thickness of the power storage device is, for example, the thickness of the thickest region of the power storage device. For example, when the depth of the projection in the region 509a is large, the difference between the maximum height and the minimum height of the film surface in the region 509a (e.g., the height 357 in FIG. 1) becomes large. Accordingly, when the power storage device 500 is incorporated in an electronic device or the like, the power storage device 500 occupies a higher volume. In addition, a dead space increases inside the electronic device or the like.

Therefore, the regions 509a are in the vicinity of the region 509b and the region 509c is provided inside the regions 509a as illustrated in FIGS. 22A and 22B, and the region 509c is provided with no projections or provided with shallower projections or the like than the regions 509a, for example, whereby the volume occupied by the power storage device 500 in an electronic device or the like can be reduced. In addition, a dead space inside the electronic device or the like can be reduced.

An adhesive layer and the film are adhered and fixed to each other and subjected to pressure bonding when a sealing structure is formed. The projections in the region 509b are made different in size from those in the regions 509a. When the projections in the region 509b have a smaller size than those in the regions 509a, the influence of a strain can be reduced to an acceptable level.

In the case where the region 509a is provided with projections and the region 509b is not, the exterior body can swell a lot even when volume expansion occurs in the region 509a inside the power storage device. That is, explosion of the power storage device can be prevented. In contrast, the region 509b without projections has poorer flexibility and stress relaxation effect than the region 509a. Accordingly, providing projections also in the end portion of the film helps reduce the influence of a strain to an acceptable level.

Figure 25A:
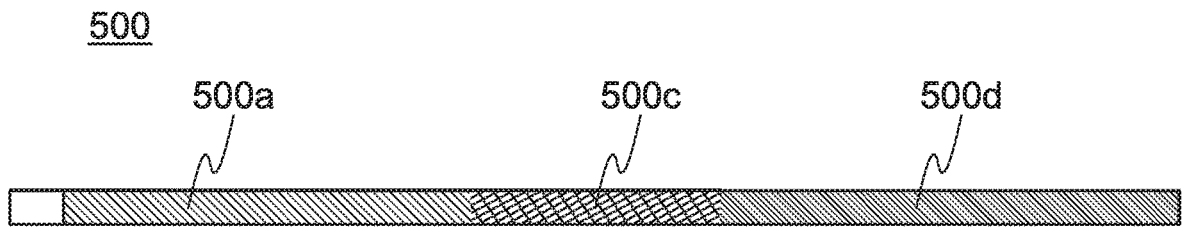
FIGS. 25A to 25C illustrate cross sections of a power storage device.
Figure 25B:
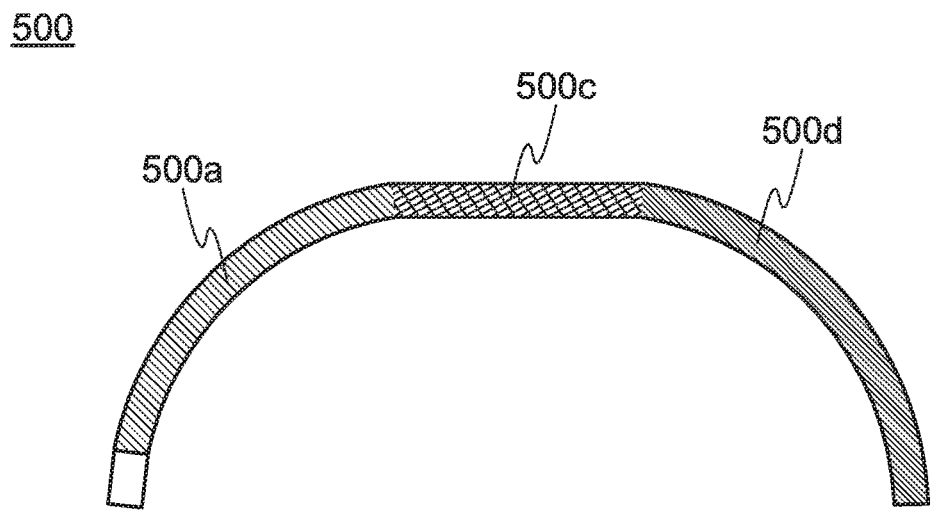
Figure 25C:
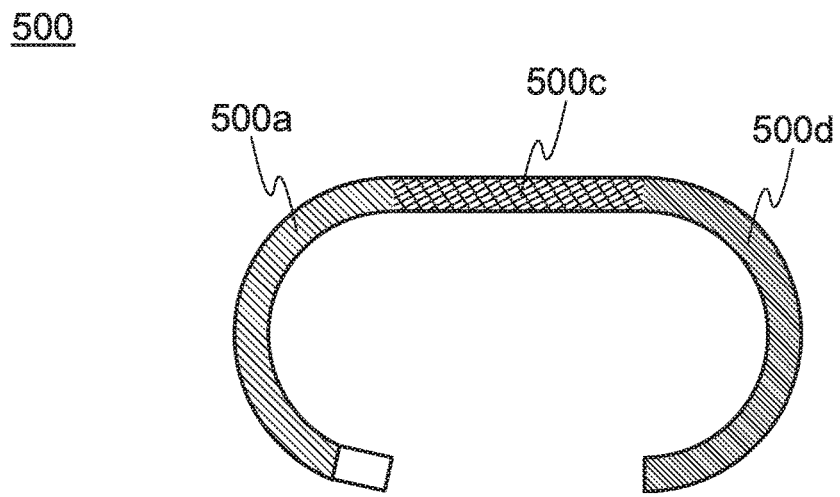

Next, an example in which the power storage device 500 shown in FIGS. 23A and 23B is bent in the B1-B2 direction is described with reference to FIGS. 25A to 25C. FIG. 25A illustrates an example of the power storage device 500 that is almost flat. FIGS. 25B and 25C each illustrate an example of bending the power storage device 500. In the examples illustrated in FIGS. 25B and 25C, the regions 500a and 500d are more bent, or have a smaller radius of curvature, than the region 500c.

Figure 26A:
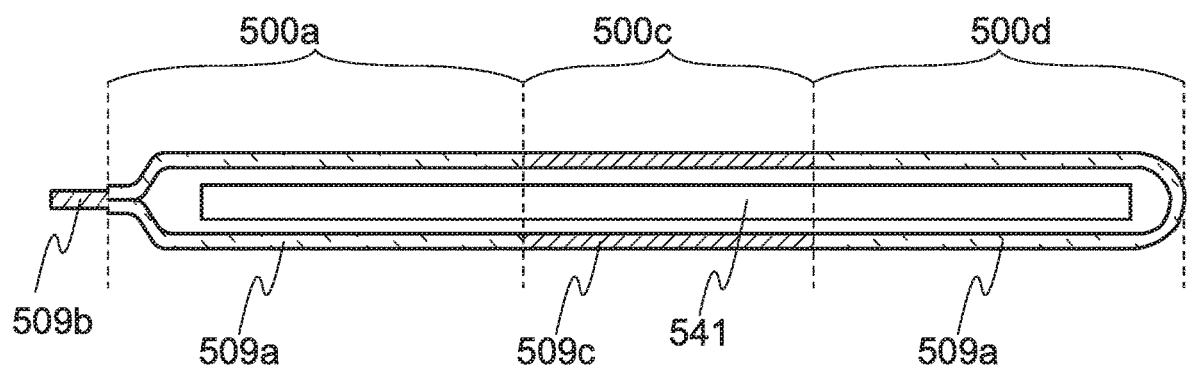
FIGS. 26A and 26B illustrate cross sections of a power storage device.
Figure 26B:
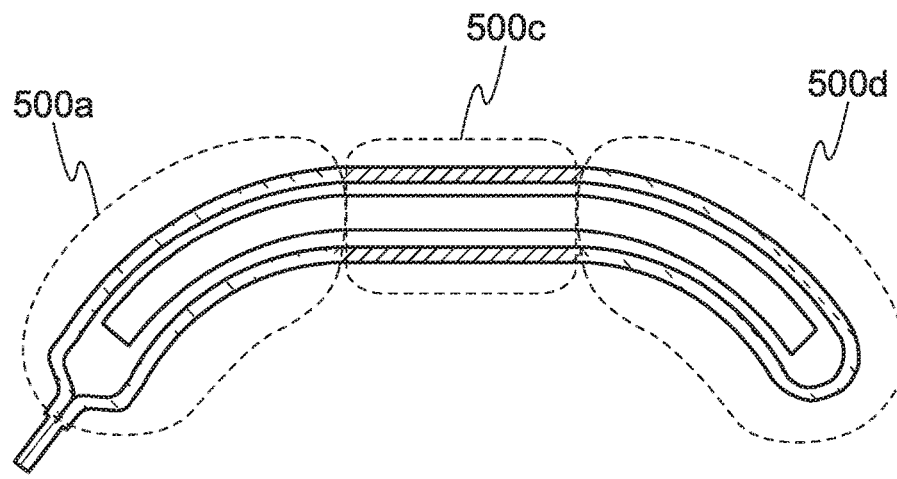

FIGS. 26A and 26B show the exterior body 509 in the example of bending the power storage device 500. FIG. 26A illustrates an example of the power storage device 500 that is almost flat. FIG. 26B illustrates an example of bending the power storage device 500. In the example illustrated in FIG. 26B, the regions 500a and 500d are more bent, or have a smaller radius of curvature, than the region 500c, and the region 509a changes its shape more than the region 509c.

Since the region 509a has a lower modulus of rigidity than the region 509c, the region 509a is more easily stretched. Owing to the stretchiness of the region 509a, which changes in shape more, distortion of the exterior body 509 of the power storage device 500 or locally concentrated stress thereon can be reduced. Accordingly, a crack or the like on the exterior body 509 of the power storage device 500 can be inhibited.

In the power storage device 500, when the maximum thickness of the region 509a is smaller than that of the region 509c, for example, the volume occupied by the power storage device 500 in an electronic device or the like can be reduced. In addition, a dead space inside the electronic device or the like can be reduced.

In FIG. 10, FIG. 14, FIGS. 20A and 20B, FIGS. 21A and 21B, FIGS. 22A and 22B, and FIGS. 23A and 23B, the region 509b is preferably flatter than the region 509a. Furthermore, the ratio R of the surface area to the area seen from above is preferably smaller in the region 509b than in the region 509a. In the region 509b, a difference between the maximum height and the minimum height of the film surface (e.g., the height 357 in FIG. 1) is preferably smaller than in the region 509a.

In FIGS. 22A and 22B and FIGS. 23A and 23B, the region 509c is preferably flatter than the region 509a. R in the region 509a is preferably higher than that in the region 509c; for example, the former is preferably greater than or equal to 2 times, further preferably greater than or equal to 2 times and less than or equal to 5 times the latter. H in the region 509a is preferably larger than that in the region 509c; for example, the former is preferably greater than or equal to 2 times, further preferably greater than or equal to 2 times and less than or equal to 5 times the latter.

In FIGS. 22A and 22B and FIGS. 23A and 23B, the region 509c may be flatter than the region 509b. The region 509c may have a lower R than the region 509b. The region 509c may have a smaller H than the region 509a.

In FIGS. 22A and 22B and FIGS. 23A and 23B, for example, the rigidity or the modulus of rigidity of the region 509a is preferably less than or equal to $1.45 \times 10^4$ N, further preferably greater than or equal to $0.90 \times 10^3$ N and less than or equal to $1.30 \times 10^4$ N. The rigidity or modulus of rigidity of the region 509a is preferably greater than or equal to 1.2 times and less than or equal to 4 times, further preferably greater than or equal to 1.5 times and less than or equal to 3 times, still further preferably greater than or equal to 1.7 times and less than or equal to 2.5 times that of the region 509c.

Figure 27A:
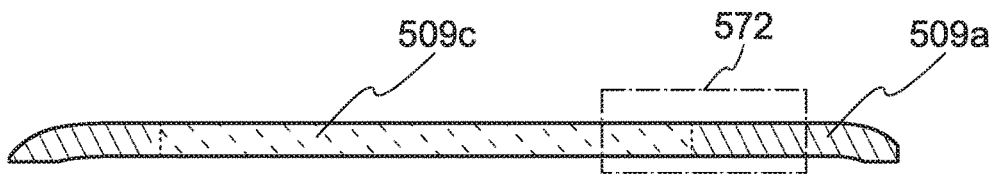
FIGS. 27A to 27D illustrate cross sections of a power storage device.
Figure 27B:
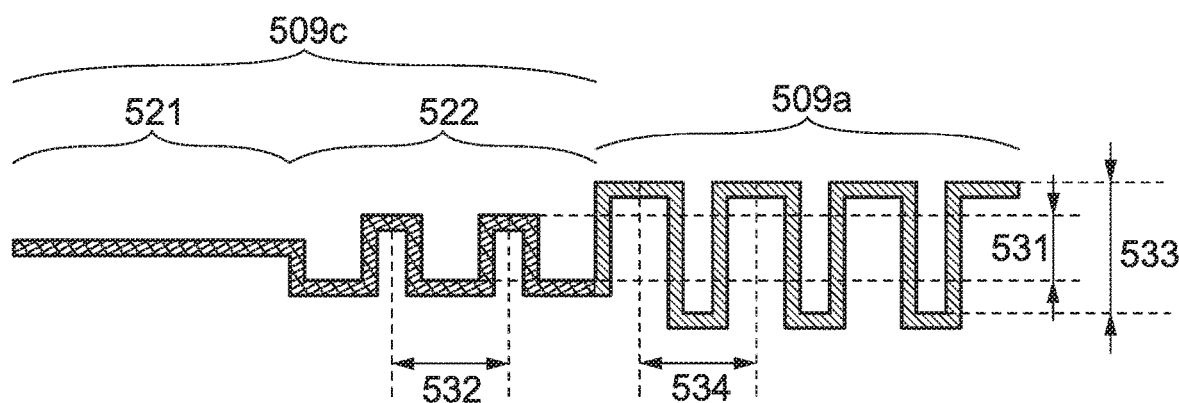
Figure 27C:
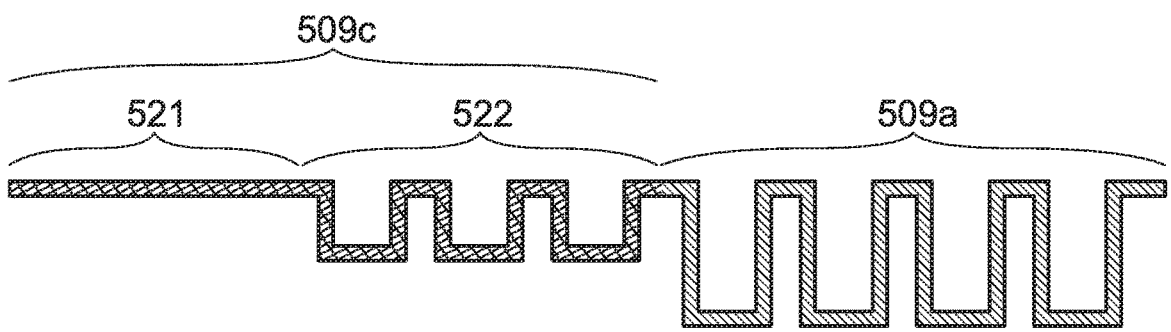
Figure 27D:
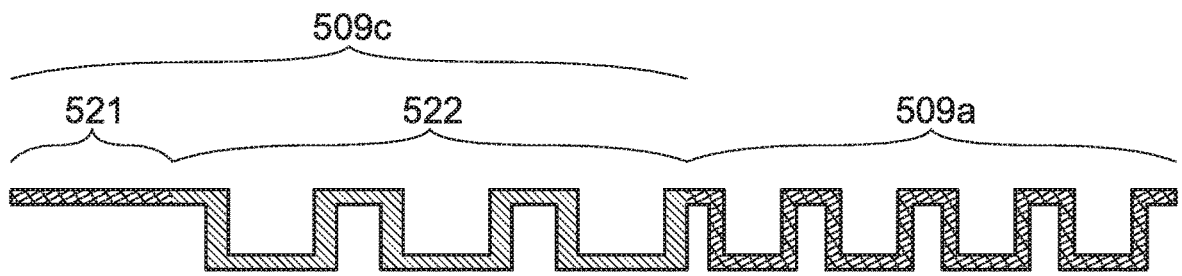

Examples of cross sections of the region 509a and the region 509c included in the exterior body 509 are described with reference to FIGS. 27A to 27D. FIG. 27A is an enlarged view of the exterior body 509 in a region 571 surrounded by a dashed-two dotted line in FIG. 23B. FIG. 27B is an enlarged view of a region 572 surrounded by a dashed-dotted line in FIG. 27A. A distance 531 is a difference between the maximum height and the minimum height of the surface in the region 509c seen in one direction. A distance 533 is a difference between the maximum height and the minimum height of the surface in the region 509a seen in one direction. In FIG. 27B, the distance 533 is larger than the distance 531. FIGS. 27C and 27D show examples of the region 572 different from that in FIG. 27B. In FIG. 27C, the distance 533 is larger than the distance 531, and the heights of the surfaces of the region 509c and the region 509a are substantially the same. In FIG. 27D, the distance 531 and the distance 533 are substantially the same, and a distance 532 is larger than that in FIG. 27B and the like.

Figure 28A:
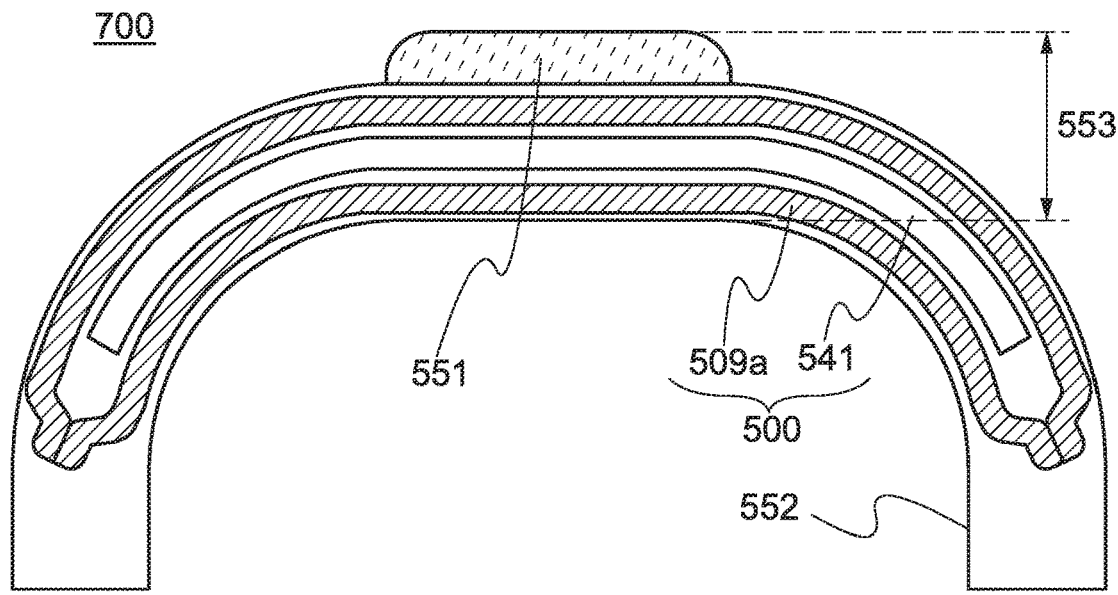
FIGS. 28A to 28C illustrate cross sections of an electronic device and a cross section of a film.
Figure 28B:
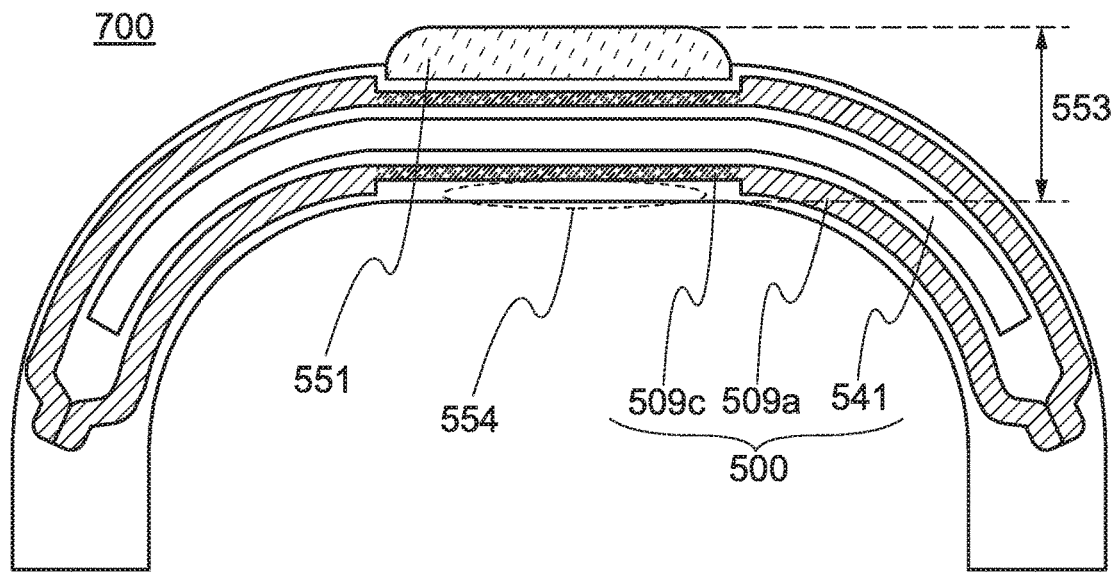
Figure 28C:
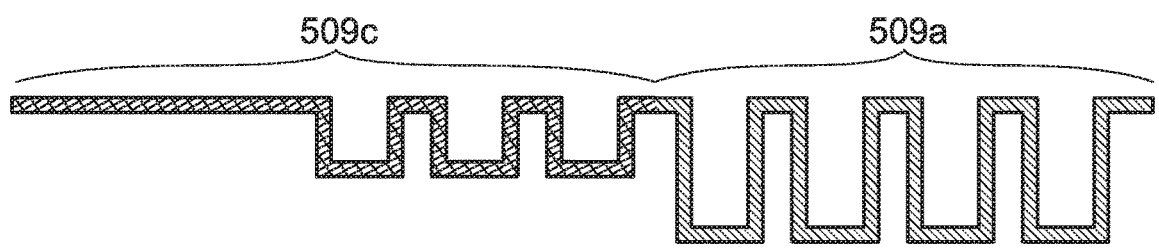

FIGS. 28A to 28C illustrate examples in which the power storage device 500 is incorporated in a device 700. FIG. 28A illustrates a cross section of the device 700. The device 700 includes a display portion 551, a housing 552, and the power storage device 500 positioned inside the housing 552. The power storage device 500 includes the region 509a, which is part of the exterior body 509, and the structure body 541.

The device 700 in FIG. 28B is different from that in FIG. 28A in that the power storage device 500 includes the region 509c. In the example illustrated in FIG. 28C, the maximum thickness of the region 509c is smaller than that of the region 509a. Accordingly, a space 554 can be provided under the region 509c. When the device 700 includes a circuit substrate or the like, the circuit substrate or the like can be located in the space 554, whereby the volume of the housing 552 can be small. Alternatively, the device 700 can have higher functionality. Furthermore, since the power storage device 500 has a small thickness under the display portion 551, the thickness 553 of the device 700 can be smaller.

As examples of the device 700, a wearable device and other electronic devices can be given. The electronic devices described in the following embodiments can be used, for example.

<Manufacturing Method>

Embossing, which is a kind of pressing, will be described.

Figure 29:
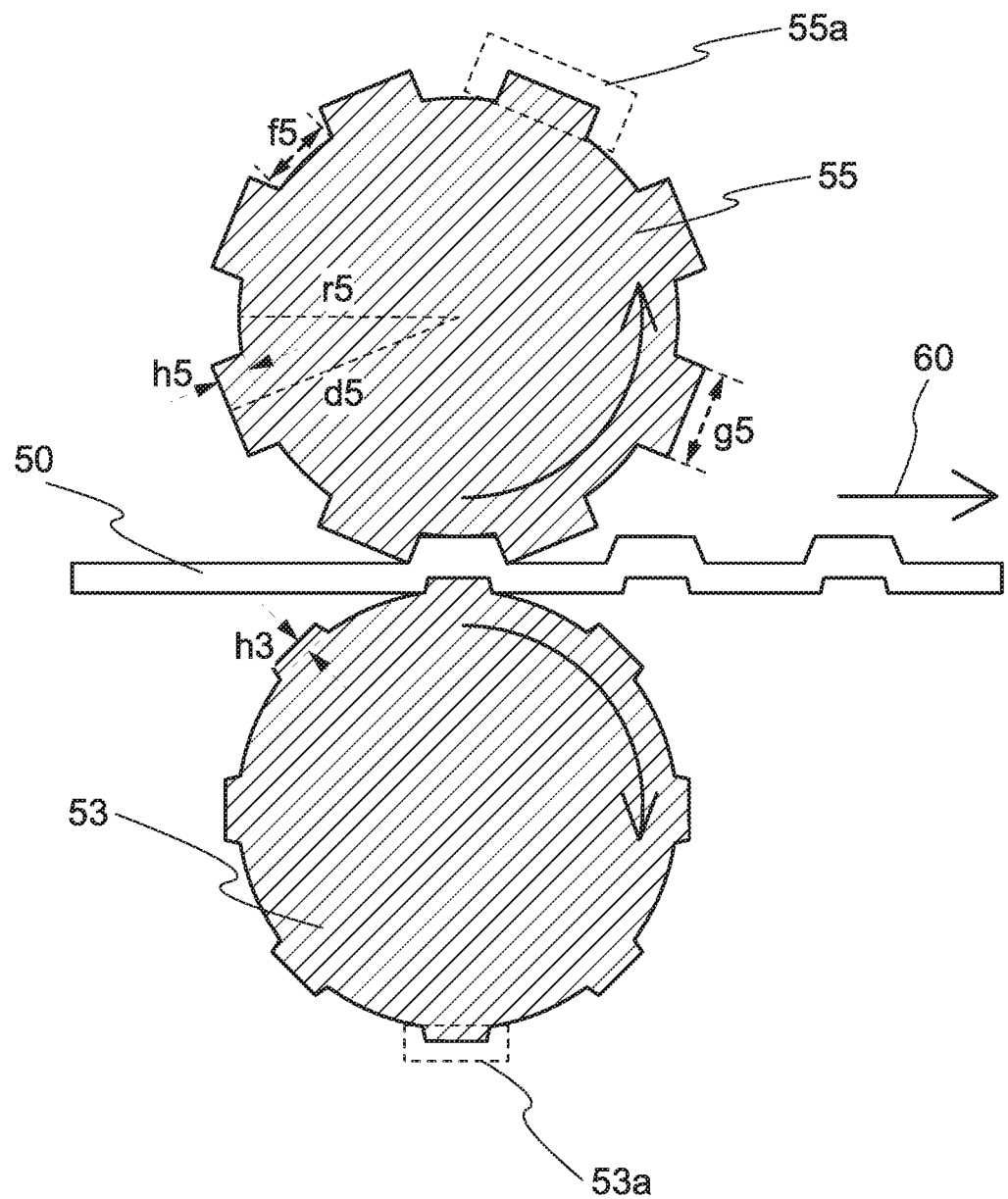
FIG. 29 is a cross-sectional view illustrating a mode of a manufacturing method of the present invention.

FIG. 29 is a cross-sectional view showing an example of embossing. Note that embossing is a kind of pressing and refers to processing for forming projections and depressions on a film by bringing an embossing roll whose surface has projections and depressions into contact with the film with pressure. The embossing roll is a roll whose surface is patterned.

FIG. 29 illustrates an example where both surfaces of a film are embossed, and shows a method for forming a film having projections whose top portions are on one surface.

FIG. 29 illustrates the state where a film 50 is sandwiched between an embossing roll 53 in contact with the one surface of the film and an embossing roll 55 in contact with the other surface and the film 50 is being transferred in a direction 60. The surface of the film is patterned by pressure or heat. The surface of the film may be patterned by pressure and heat.

The embossing rolls can be formed of metal rolls, ceramic rolls, plastic rolls, rubber rolls, an organic resin rolls, lumber rolls, or the like, as appropriate.

In FIG. 29, embossing is performed using the male embossing roll 53 and the female embossing roll 55. The male embossing roll 53 has a plurality of projections 53a. The projections correspond to projections formed on a film to be processed. The female embossing roll 55 has a plurality of projections 55a. Between adjacent projections 55a, a depression is positioned into which a projection formed on the film by the projection 53a of the male embossing roll 53 fits.

Successive embossing by which the film 50 partly stands out and debossing by which the film 50 is partly indented can form a projection and a flat portion successively. In this manner, a pattern can be formed on the film 50.

It is preferable that a height h3 of each of the projections 53a of the male embossing roll 53 be smaller than a height h5 of each of the projections 55a of the female embossing roll 55. It is also preferable that the width of each of the projections 53a of the male embossing roll 53 be smaller than the width of a depression between adjacent projections 55a of the female embossing roll 55. Accordingly, in a projection formed on a sheet, a top portion can have a region thicker than a bottom portion.

Note that the height of a projection of an embossing roll corresponds to the difference between the distance between the center and the surface of a top portion of the embossing roll in a region with a protrusion and the radius of the embossing roll. For example, the height h5 of the projection of the embossing roll 55 corresponds to the difference between a distance d5 between the center and the surface of the top portion of the projection 55a and a radius r5 of the embossing roll 55 (d5−r5).

Furthermore, the width of a projection of an embossing roll is the shortest length in the projection. For example, in the embossing roll 55, the shortest length g5 in the width of the projection 55a is referred to as the width of the projection 55a.

Moreover, the width of a depression between adjacent projections of an embossing roll is the shortest distance between side surfaces of the adjacent projections. For example, in the embossing roll 55, the shortest distance f5 between side surfaces of adjacent projections 55a is referred to as the width of the depression.

Figure 30A:
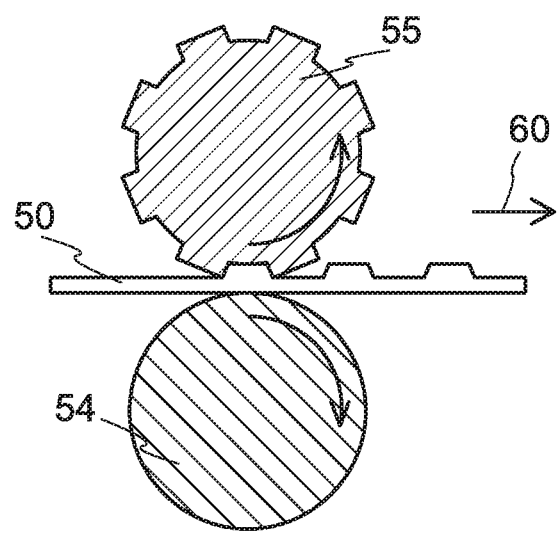
FIGS. 30A to 30C are cross-sectional views illustrating a mode of a manufacturing method of the present invention.
Figure 30B:
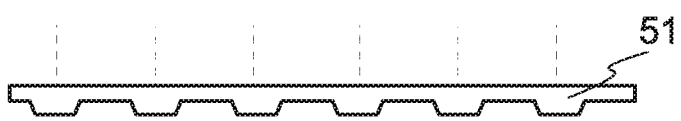
Figure 30C:
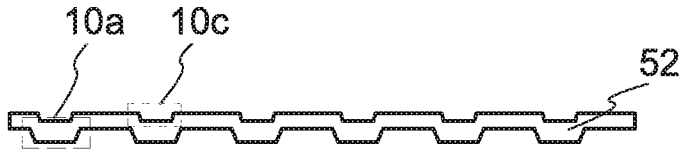

Next, a method for forming a film having a plurality of projections, which is a method different from that described with reference to FIG. 29, will be described with reference to FIGS. 30A to 30C. FIGS. 30A to 30C illustrate an example where one surface of a film is embossed, and show a method for forming a film having projections whose top portions are on one surface.

FIG. 30A illustrates the state where the film 50 sandwiched between the embossing roll 55 in contact with one surface of the film and a roll 54 in contact with the other surface and the film 50 is being transferred in the direction 60. Note that the roll 54 may be fixed without rotating. Since the embossing roll 55 is provided only on one surface of the film here, a plurality of projections formed on the film have no space. This means that the film has protrusions on one surface and is flat on the other surface.

Then, as illustrated in FIG. 30B, a film 51 in which projections are formed on one surface by embossing is partly removed. Here, the film is partly removed from a flat surface, that is, the surface that was in contact with the roll 54, of the projections. As a method for removing part of the film, thermal removal by laser irradiation, chemical removal by dropping an etchant, physical removal using a tool, or the like can be given.

As a result, the spaces 10c can be formed in the projections 10a as illustrated in FIG. 30C. In this manner, a film 52 having the projections 10a can be formed.

Note that in the method of forming a film illustrated in FIGS. 30A to 30C, a metal film is preferably used as the film 50. In addition, a heat-seal layer is preferably provided on one or both surfaces of the metal film after the process illustrated in FIGS. 30A to 30C.

Next, a method for forming a film having a plurality of projections, which is a method different from those described with reference to FIG. 29 and FIGS. 30A to 30C, will be described with reference to FIGS. 31A to 31D. FIGS. 31A to 31D illustrate an example where both surfaces of a film are embossed using embossing plates, and show a method for forming a film having projections whose top portions are on one surface and projections whose top portions are on the other surface.

Figure 31A:
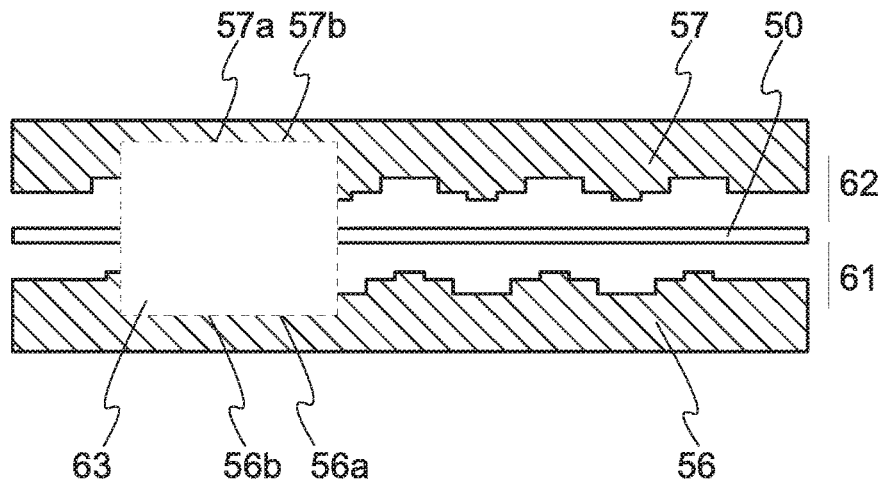
FIGS. 31A to 31D are cross-sectional views illustrating a mode of a manufacturing method of the present invention.
Figure 31B:
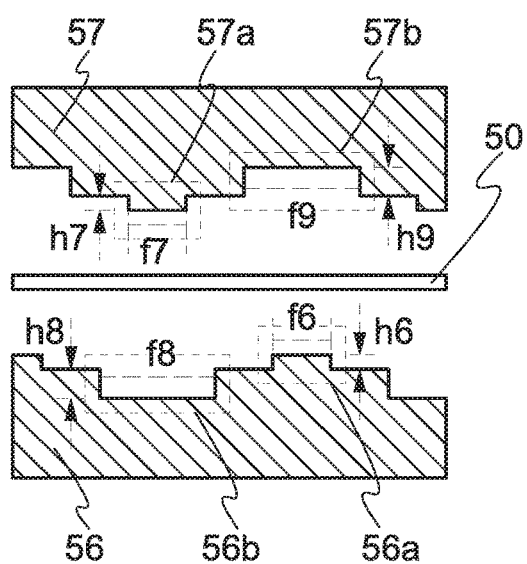

As illustrated in FIG. 31A, an embossing plate 56 having projections 56a and depressions 56b, and an embossing plate 57 having projections 57a and depressions 57b are prepared.

Then, the film 50 is positioned between the embossing plates 56 and 57.

Figure 31C:
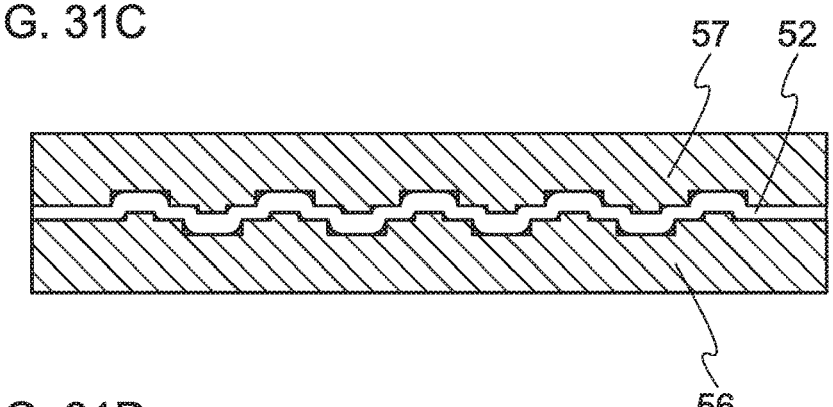

After that, the embossing plate 56 is pressed in a direction of an arrow 61 shown in FIG. 31A or against one surface of the film 50, and the embossing plate 57 is pressed in a direction of an arrow 62 shown in FIG. 31A or against the other surface of the film 50 (see FIG. 31C). It is preferable that the positions of the embossing plates 56 and 57 be adjusted at this time so that the projections 56a of the embossing plate 56 fit the depressions 57b of the embossing plate 57 and the projections 57a of the embossing plate 57 fit the depressions 56b of the embossing plate 56.

Here, a height h6 of each of the projections 56a of the embossing plate 56 is preferably smaller than a depth h9 of each of the depressions 57b of the embossing plate 57. Furthermore, a width f6 of each of the projections 56a of the embossing plate 56 is preferably smaller than a width f9 of each of the depressions 57b of the embossing plate 57 (see FIG. 31B).

In addition, a height h7 of each of the projections 57a of the embossing plate 57 is preferably smaller than a depth h8 of each of the depressions 56b of the embossing plate 56. Furthermore, a width f7 of each of the projections 57a of the embossing plate 57 is preferably smaller than a width f8 of each of the depressions 56b of the embossing plate 56 (see FIG. 31B).

Figure 31D:
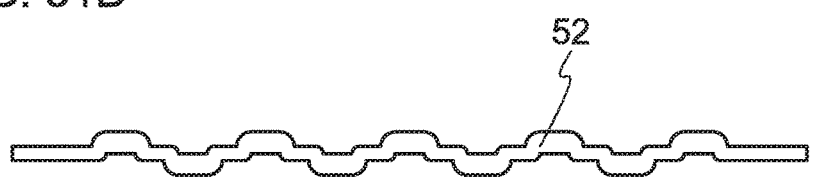

As a result, a film 52 having projections whose top portions are on one surface and projections whose top portions are on the other surface can be formed as illustrated in FIG. 31D. Furthermore, in each of the projections, a top portion can have a region thicker than a bottom portion.

Note that an embossing roll or an embossing plate is not necessarily used, and a relief may be formed on part of a film.

Here, the case of performing two or more kinds of embossing on a surface of a film is described.

After a first kind of embossing is performed on the entire film, a second kind of embossing may be performed thereon.

Alternatively, the pressure, the heat, or the like at the time of processing may be adjusted to vary the height of the projections formed by embossing on the surface of the film.

This embodiment can be implemented in appropriate combination with any of the other embodiments.

Embodiment 3

In this embodiment, a positive electrode and a negative electrode of a power storage device of one embodiment of the present invention are described.

The positive electrode of one embodiment of the present invention preferably includes a positive electrode active material. The positive electrode of one embodiment of the present invention may include a binder. The positive electrode of one embodiment of the present invention may include a conductive additive.

The negative electrode of one embodiment of the present invention preferably includes a negative electrode active material. The negative electrode of one embodiment of the present invention may include a binder. The negative electrode of one embodiment of the present invention may include a conductive additive.

<Negative Electrode Active Material>

As a negative electrode active material, for example, a carbon-based material, an alloy-based material, or the like can be used.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.1 V and lower than or equal to 0.3 V vs. Li/Li$^+$ when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Note that it is known that when lithium ions are intercalated in graphite, the interlayer distance of graphite increases from 0.336 nm to 0.370 nm, for example. That is, the interlayer distance increases by approximately 11%.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

Furthermore, the negative electrode active material of one embodiment of the present invention may include silicon, lithium, and oxygen. For example, the negative electrode active material may include silicon and lithium silicon oxide positioned outside the silicon.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The reaction potential of the negative electrode active material is preferably as low as possible, in which case the voltage of the power storage device can be high. On the other hand, when the potential is low, power of reducing an electrolytic solution is increased, so that an organic solvent or the like in an electrolytic solution might be subjected to reductive decomposition. The range of potentials in which the electrolysis of an electrolytic solution does not occur is referred to as a potential window. The electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials such as graphite and silicon can increase the voltage of power storage devices but are likely to cause the reductive decomposition of electrolytic solutions.

<Positive Electrode Active Material>

Examples of a positive electrode active material include a composite oxide with an olivine crystal structure, a composite oxide with a layered rock-salt crystal structure, and a composite oxide with a spinel crystal structure.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used. $LiCoO_2$ is particularly preferable because it has a high capacity, stability in the air higher than that of $LiNiO_2$, and thermal stability higher than that of $LiNiO_2$, for example. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because the characteristics of a secondary battery using such a material can be improved.

The average diameter of primary particles of the positive electrode active material is preferably greater than or equal to 5 nm and less than or equal to 50 μm, more preferably greater than or equal to 100 nm and less than or equal to 500 nm, for example. Furthermore, the specific surface area is preferably greater than or equal to 5 m$^2$/g and less than or equal to 15 m²/g. Furthermore, the average diameter of secondary particles is preferably greater than or equal to 5 µm and less than or equal to 50 µm. Note that the average particle diameter can be measured with a particle size distribution analyzer or the like using a laser diffraction and scattering method or by observation with a scanning electron microscope (SEM) or a TEM. The specific surface area can be measured by a gas adsorption method.

Another example of the positive electrode active material is a lithium-manganese composite oxide that is represented by a composition formula $Li_aMn_bM_cO_d$. Here, the element M is preferably a metal element other than lithium and manganese, or silicon or phosphorus, more preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d<0.5$. To achieve a high capacity, the lithium-manganese composite oxide preferably includes a region where the surface portion and the middle portion are different in the crystal structure, the crystal orientation, or the oxygen content. To obtain such a lithium-manganese composite oxide, it is preferable that $1.6 \leq a \leq 1.848$, $0.19 \leq c/b \leq 0.935$, and $2.5 \leq d \leq 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.31803}$ refers to that formed at a ratio (molar ratio) of the amounts of raw materials of $Li_2CO_3:MnCO_3:NiO=0.84:0.8062:0.318$. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 32A:
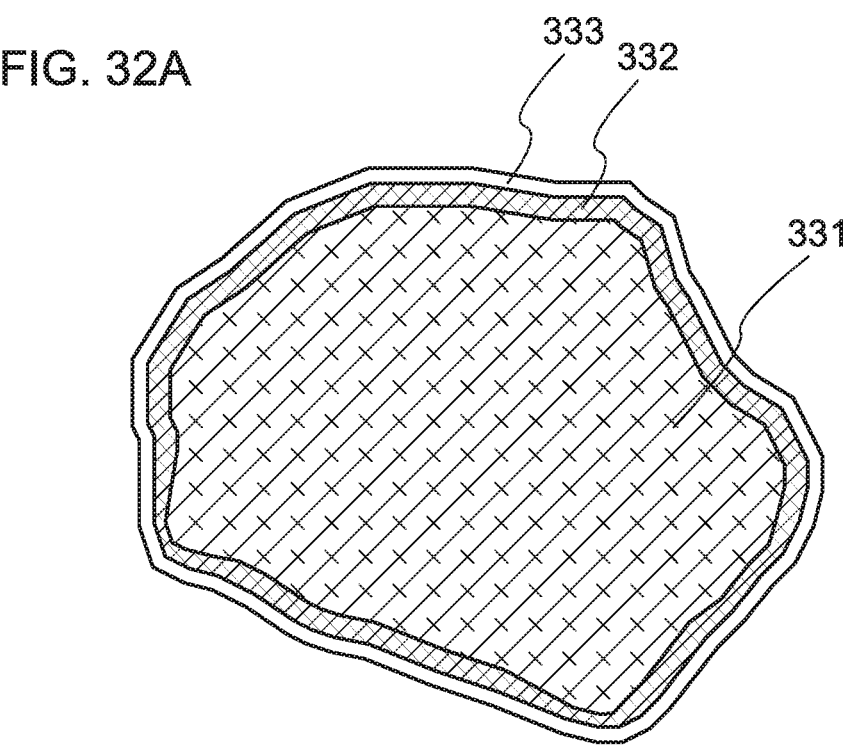
FIGS. 32A and 32B each illustrate a cross section of a particle.
Figure 32B:
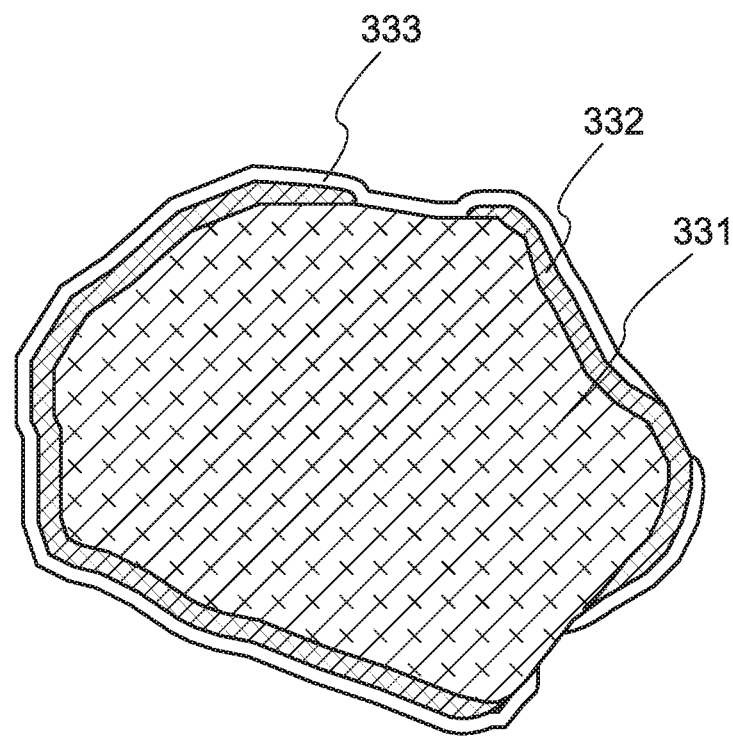

FIGS. 32A and 32B each illustrate an example of a cross-sectional view of a particle of a lithium-manganese composite oxide having a region with different crystal structures, crystal orientations, or oxygen contents.

As illustrated in FIG. 32A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 32B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by a1:b1:c1:d1; and the atomic ratio of lithium to manganese, the element M, and oxygen in the region 332 is represented by a2:b2:c2:d2. Note that the composition of each of the region 331 and the region 332 can be measured by, for example, energy dispersive X-ray spectroscopy (EDX) using a transmission electron microscope (TEM). In measurement by EDX, the proportion of lithium is sometimes difficult to measure. Thus, a difference between the region 331 and the region 332 in composition except for lithium will be described below. Here, d1/(b1+c1) is preferably greater than or equal to 2.2, more preferably greater than or equal to 2.3, still more preferably greater than or equal to 2.35 and less than or equal to 3. Furthermore, d2/(b2+c2) is preferably less than 2.2, more preferably less than 2.1, much more preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d<0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the region 332 and the region 331. The transition layer is a region where the composition, crystal structure, or crystal lattice constant changes continuously or gradually. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

The region 333 preferably contains carbon or a metal compound. Examples of the metal include cobalt, aluminum, nickel, iron, manganese, titanium, zinc, and lithium. Examples of the metal compound include an oxide and a fluoride of the metal.

It is particularly preferable that the region 333 contain carbon. Since carbon has high conductivity, the particle covered with carbon in the electrode of the power storage device can reduce the resistance of the electrode, for example. The region 333 preferably includes a graphene compound. The use of the graphene compound in the region 333 allows the lithium-manganese composite oxide particle to be efficiently coated. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the secondary battery using the lithium-manganese composite oxide as a positive electrode material can have improved cycle performance.

The thickness of a layer containing carbon is preferably greater than or equal to 0.4 nm and less than or equal to 40 nm.

Furthermore, the average diameter of primary particles of the lithium-manganese composite oxide is preferably greater than or equal to 5 nm and less than or equal to 50 µm, more preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average diameter of secondary particles is preferably greater than or equal to 5 µm and less than or equal to 50 µm.

Alternatively, a composite material ($LiMPO_4$ (general formula) (M is one or more of Fe(II), Mn(II), Co(II), and Ni(II))) can be used as the positive electrode active material. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \leq 1$, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

$LiFePO_4$ is particularly preferable because it properly has properties necessary for the positive electrode active material, such as safety, stability, a high capacity density, and the existence of lithium ions which can be extracted in initial oxidation (charge).

Alternatively, a composite material such as $Li_{(2-j)}MSiO_4$ (general formula) (M is one or more of Fe(II), Mn(II), Co(II), and Ni(II); $0 \leq j \leq 2$) may be used as the positive electrode active material. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as $NaFeO_2$ and $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on the surface of the positive electrode active material. Providing a conductive material such as a carbon layer leads to an increase in the conductivity of an electrode. For example, the positive electrode active material can be coated with a carbon layer by mixing a carbohydrate such as glucose at the time of baking the positive electrode active material.

The average diameter of primary particles of the positive electrode active material is preferably greater than or equal to 50 nm and less than or equal to 100 µm.

<Binder>

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder.

The content of the binder with respect to the total amount of an active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive with respect to the total amount of the active material layer 102 is preferably greater than or equal to 1 wt % and less than or equal to 10 wt %, more preferably greater than or equal to 1 wt % and less than or equal to 5 wt %.

<Conductive Additive>

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

As the conductive additive, a graphene compound may be used.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. In addition, it is preferable to use a graphene compound as the conductive additive because the electrical resistance can be reduced in some cases. Here, it is particularly preferable to use, for example, graphene, multilayer graphene, or RGO as a graphene compound.

In the case where an active material with a small particle diameter (e.g., 1 μm or less) is used, the specific surface area of the active material is large and thus more conductive paths for the active material particles are needed. In such a case, it is particularly preferred that a graphene compound that can efficiently form a conductive path even in a small amount is used.

A cross-sectional structure example of the active material layer 102 including a graphene compound as a conductive additive is described below.

Figure 33A:
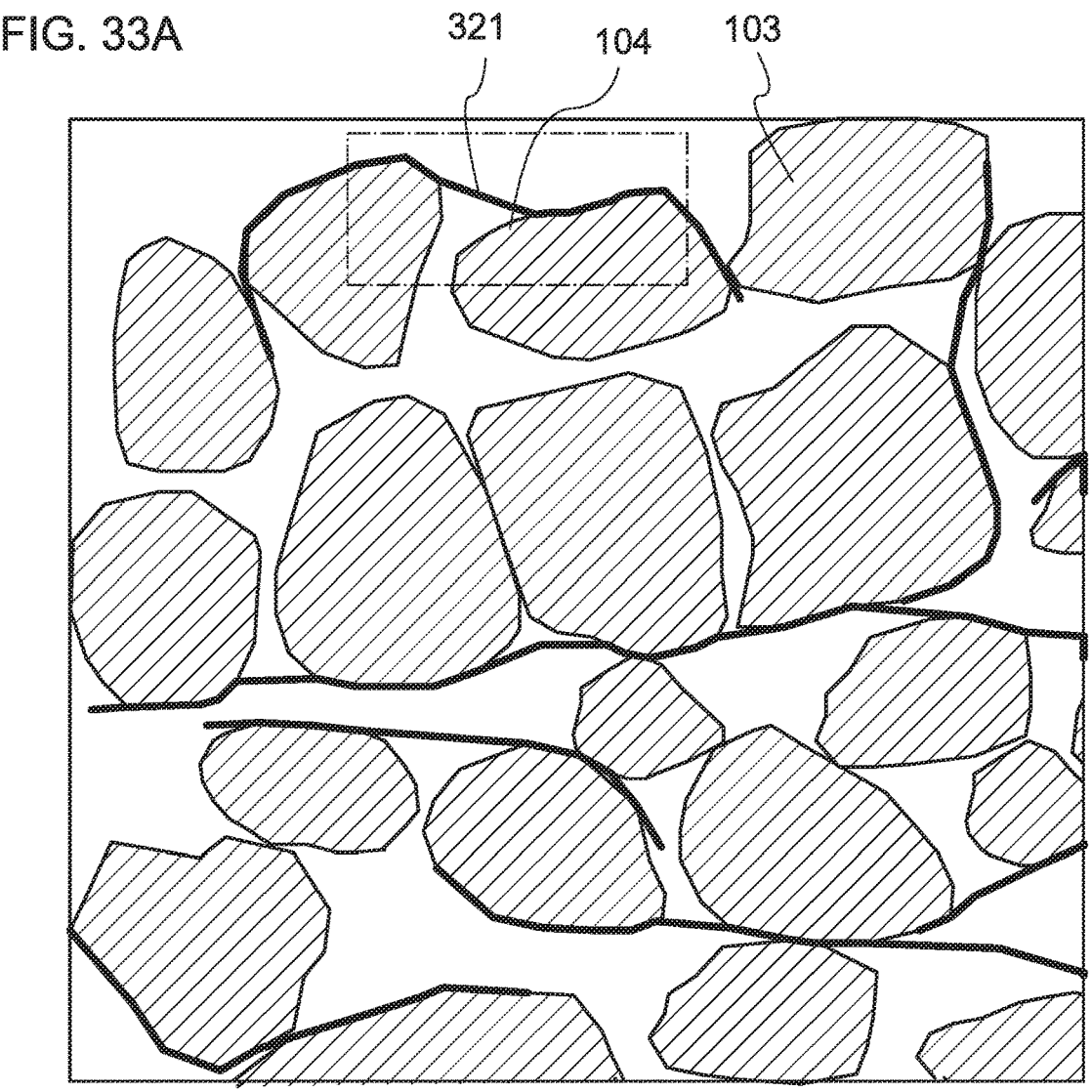
FIGS. 33A and 33B illustrate cross sections of an electrode.

FIG. 33A shows a longitudinal sectional view of the active material layer 102. The active material layer 102 includes active material particles 103, a graphene compound 321 serving as a conductive additive, and a binder 104. Here, graphene or multilayer graphene may be used as the graphene compound 321, for example. The graphene compound 321 preferably has a sheet-like shape. The graphene compound 321 may have a sheet-like shape formed of a plurality of sheets of multilayer graphene and/or a plurality sheets of graphene that partly overlap with each other.

The longitudinal section of the active material layer 102 in FIG. 33A shows substantially uniform dispersion of the sheet-like graphene compounds 321 in the active material layer 102. The graphene compounds 321 are schematically shown by thick lines in FIG. 33A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer 102 is formed in such a manner that graphene oxide is used as the graphene compound 321 and mixed with an active material. When graphene oxide with extremely high dispersibility in a polar solvent is used for the formation of the graphene compounds 321, the graphene compounds 321 can be substantially uniformly dispersed in the active material layer 102. The solvent is removed by volatilization from a dispersion medium in which graphene oxide is uniformly dispersed, and the graphene oxide is reduced; hence, the graphene compounds 321 remaining in the active material layer 102 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compound 321 than that of a normal conductive additive. Thus, the proportion of the active material particles 103 in the active material layer 102 can be increased. Accordingly, the discharge capacity of a power storage device can be increased.

Figure 33B:
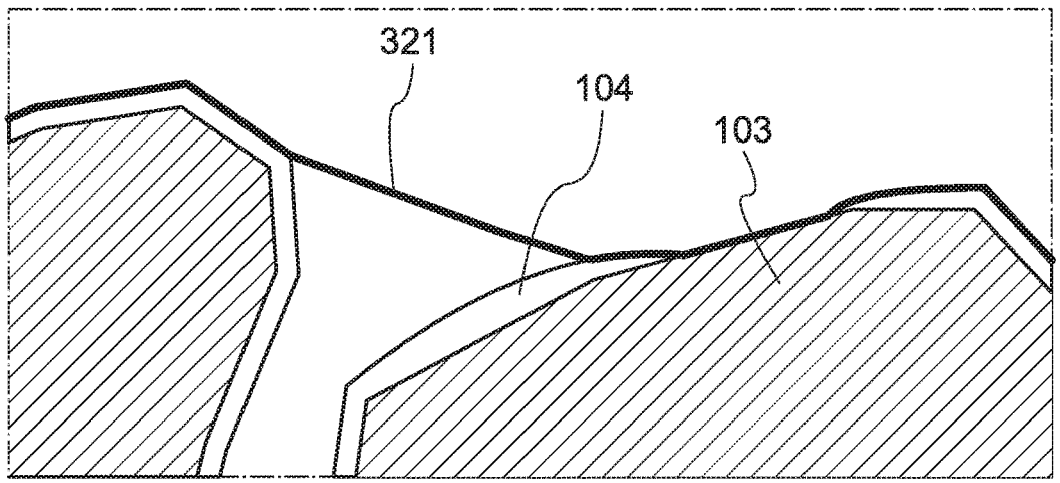

FIG. 33B is an enlarged view illustrating a region surrounded by a dashed dotted line in FIG. 33A. The binder 104 may exist in the shape of a layer on a surface of the active material particle 103. The graphene compound 321 preferably includes a region in contact with a surface of the binder 104. The binder 104 is located between the active material particle 103 and the graphene compound 321, for example. Preferably, the binder 104 is provided on the active material particle 103 and the graphene compound 321 is provided on the binder 104.

<Current Collector>

The current collector 101 can be formed using a material that has high conductivity, such as a metal like stainless steel, gold, platinum, aluminum, or titanium, or an alloy thereof. In the case where the current collector 101 is used in the positive electrode, it is preferred that it not dissolve at the potential of the positive electrode. In the case where the current collector 101 is used in the negative electrode, it is preferred that it not be alloyed with carrier ions such as lithium ions. Alternatively, the current collector 101 can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a punching-metal shape, and an expanded-metal shape. The current collector 101 preferably has a thickness of 5 µm to 30 µm inclusive.

This embodiment can be implemented in appropriate combination with any of the other embodiments.

Embodiment 4

In this embodiment, a structure example of the thin storage battery described in Embodiment 2 and a structure example of a power storage system will be described.

<Structural Example of Thin Storage Battery>

FIGS. 34A to 34C and FIGS. 35A to 35C illustrate structural examples of thin storage batteries. A wound body 993 illustrated in FIG. 34A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 34A:
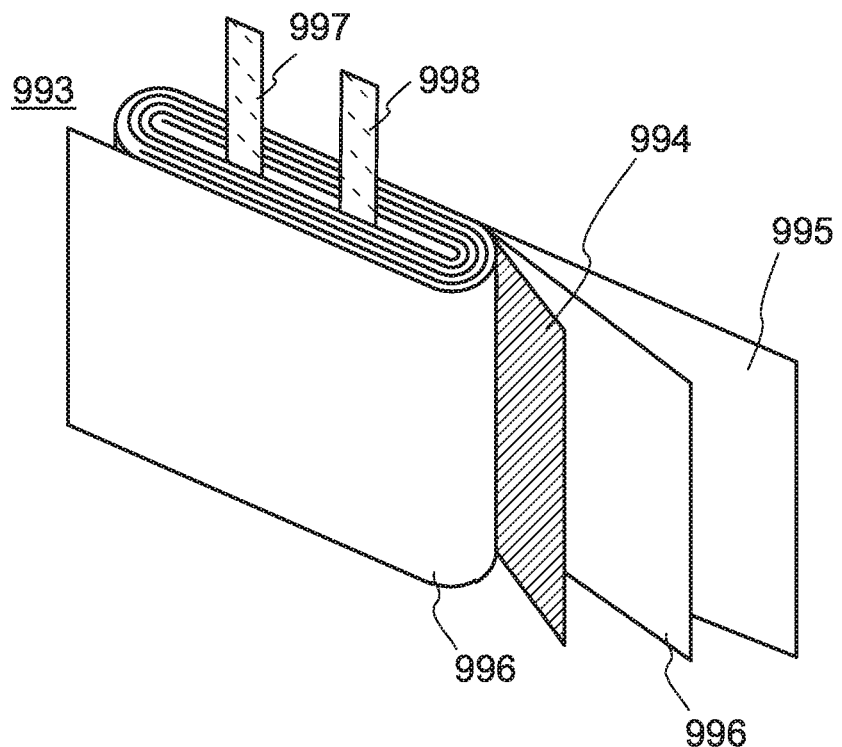
FIG. 34A to 34C illustrate an example of a power storage device.
Figure 34B:
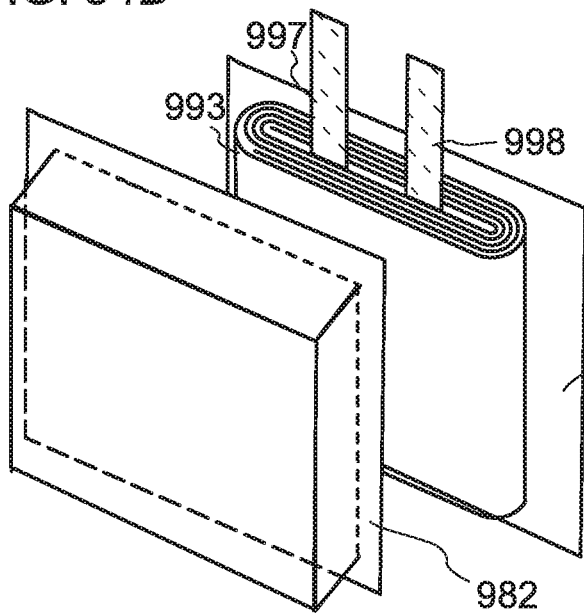
Figure 34C:
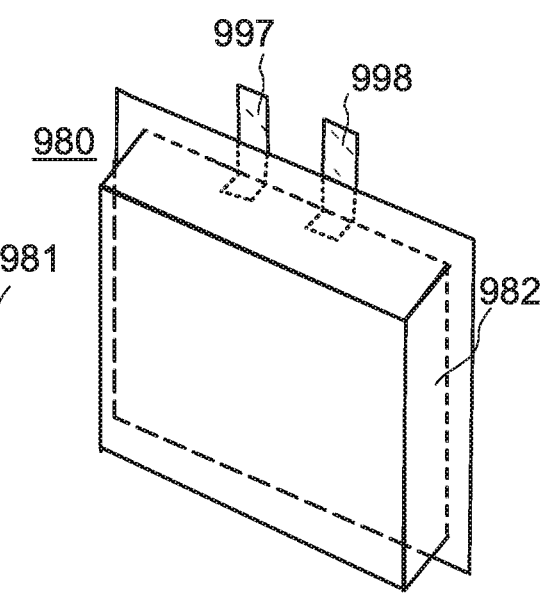

In a storage battery 980 illustrated in FIGS. 34B and 34C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 34B and 34C illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 35A to 35C illustrate another example of a flexible thin storage battery. The wound body 993 illustrated in FIG. 35A is the same as that illustrated in FIG. 34A, and the detailed description thereof is omitted.

In the storage battery 990 illustrated in FIGS. 35B and 35C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the cycle performance of the battery can be improved.

<Structural Example of Power Storage System>

Structural examples of power storage systems will be described with reference to FIGS. 36A and 36B, FIGS. 37A1, 37A2, 37B1, and 37B2, and FIGS. 38A and 38B. Here, a power storage system refers to, for example, a device including a power storage device.

Figure 36A:
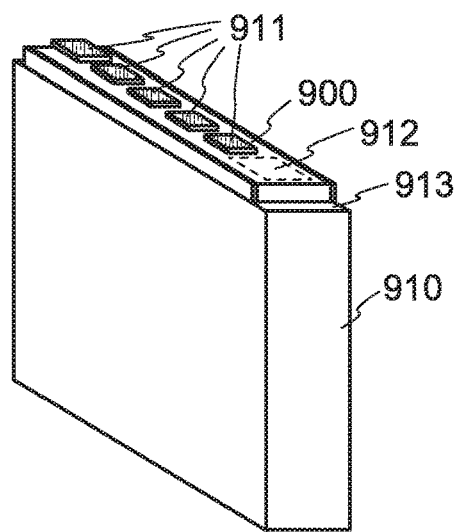
FIGS. 36A and 36B illustrate an example of a power storage device.
Figure 36B:
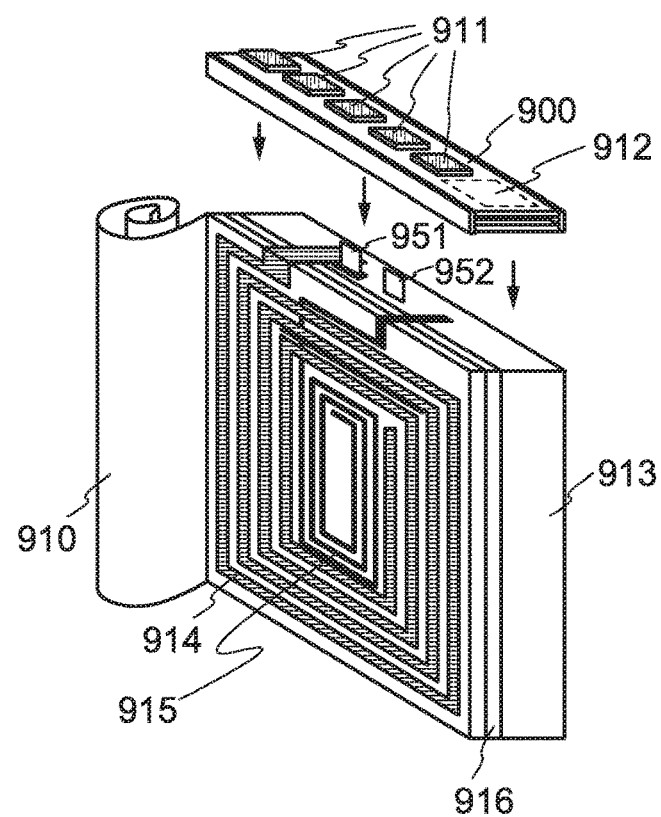

FIGS. 36A and 36B are external views of a power storage system. The power storage system includes a circuit board 900 and a storage battery 913. A label 910 is attached to the storage battery 913. As shown in FIG. 36B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field by the storage battery 913, for example. As the layer 916, for example, a magnetic body can be used.

Note that the structure of the power storage system is not limited to that shown in FIGS. 36A and 36B.

For example, as shown in FIGS. 37A1 and 37A2, two opposite surfaces of the storage battery 913 in FIGS. 36A and 36B may be provided with respective antennas. FIG. 37A1 is an external view showing one side of the opposite surfaces, and FIG. 37A2 is an external view showing the other side of the opposite surfaces. For portions similar to those in FIGS. 36A and 36B, the description of the power storage system illustrated in FIGS. 36A and 36B can be referred to as appropriate.

As illustrated in FIG. 37A1, the antenna 914 is provided on one of the opposite surfaces of the storage battery 913 with the layer 916 interposed therebetween, and as illustrated in FIG. 37A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 37B1 and 37B2, two opposite surfaces of the storage battery 913 in FIGS. 36A and 36B may be provided with different types of antennas. FIG. 37B1 is an external view showing one side of the opposite surfaces, and FIG. 37B2 is an external view showing the other side of the opposite surfaces. For portions similar to those in FIGS. 36A and 36B, the description of the power storage system illustrated in FIGS. 36A and 36B can be referred to as appropriate.

As illustrated in FIG. 37B1, the antennas 914 and 915 are provided on one of the opposite surfaces of the storage battery 913 with the layer 916 interposed therebetween, and as illustrated in FIG. 37B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 38A:
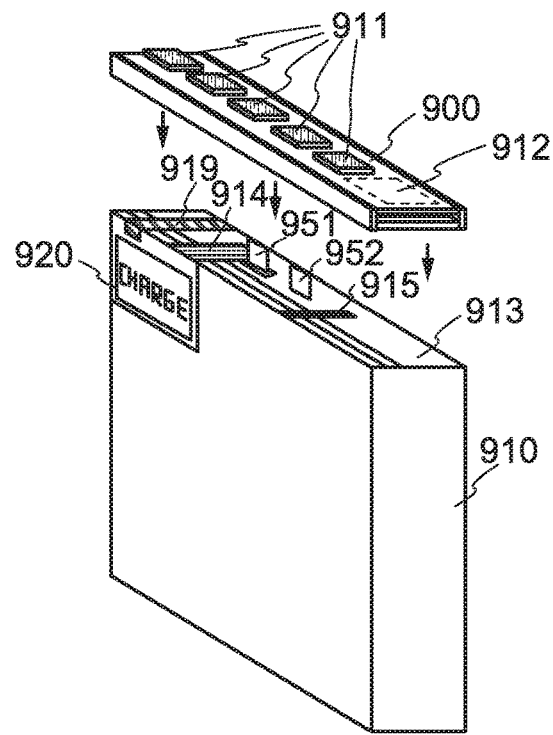
FIGS. 38A and 38B illustrate examples of power storage devices.

Alternatively, as illustrated in FIG. 38A, the storage battery 913 in FIGS. 36A and 36B may be provided with a display device 920. The display device 920 is electrically connected to the terminal 911 via a terminal 919. It is possible that the label 910 is not provided in a portion where the display device 920 is provided. For portions similar to those in FIGS. 36A and 36B, the description of the power storage system illustrated in FIGS. 36A and 36B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 38B:
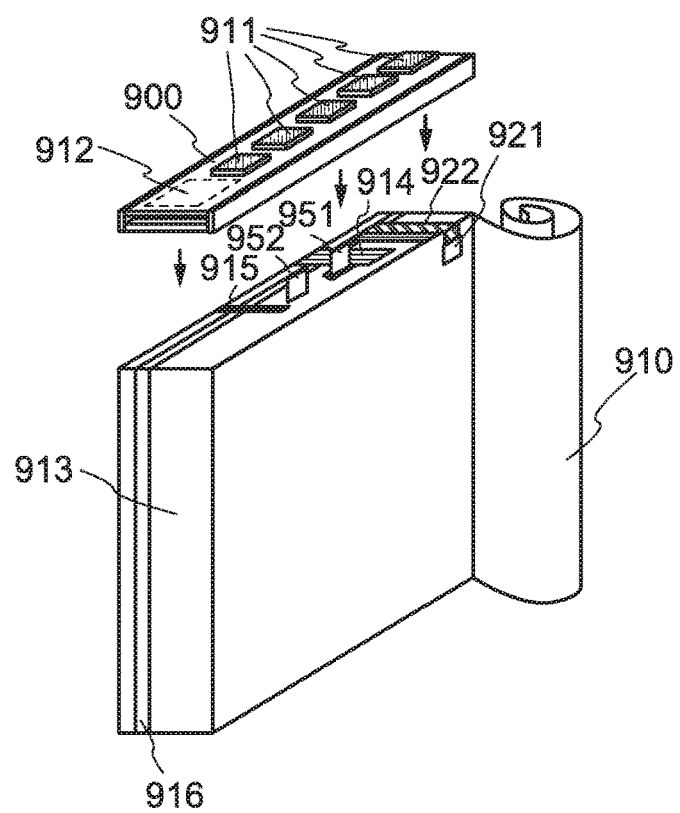

Alternatively, as illustrated in FIG. 38B, the storage battery 913 illustrated in FIGS. 36A and 36B may be provided with a sensor 921. The sensor 921 is electrically connected to the terminal 911 via a terminal 922. For portions similar to those in FIGS. 36A and 36B, the description of the power storage system illustrated in FIGS. 36A and 36B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 5

In this embodiment, an example of an electronic device including a flexible storage battery will be described.

FIGS. 39A to 39G illustrate examples of electronic devices including the flexible storage batteries described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 39A:
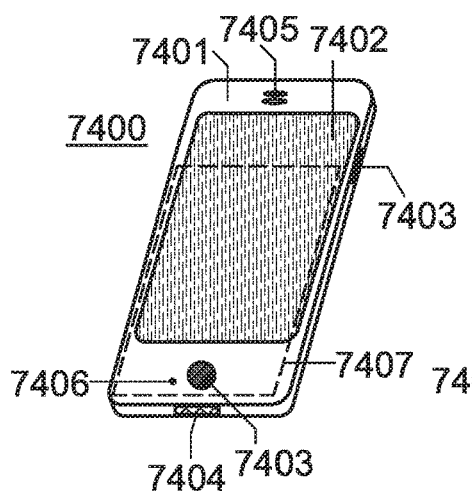
FIGS. 39A to 39G illustrate examples of electronic devices.

FIG. 39A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 39B:
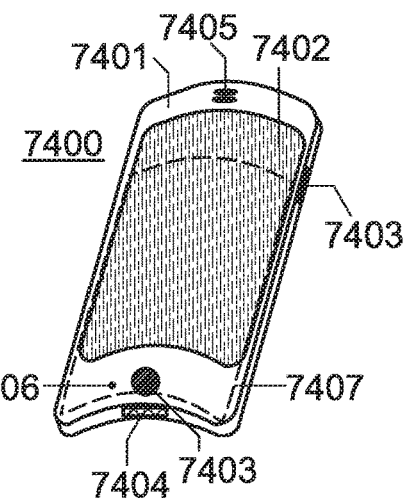
Figure 39C:
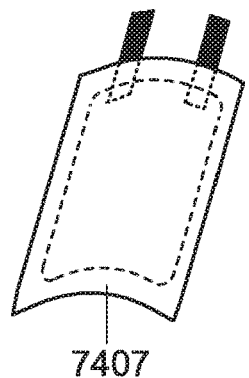

FIG. 39B illustrates the mobile phone 7400 that is bent. When the whole mobile phone 7400 is bent by the external force, the power storage device 7407 included in the mobile phone 7400 is also bent. FIG. 39C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 39D:
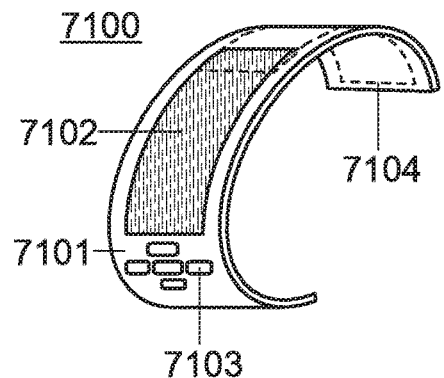
Figure 39E:
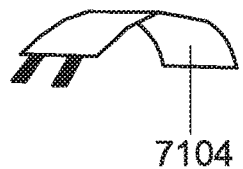

FIG. 39D illustrates an example of a bangle display device. A portable display device 7100 includes a housing 7101, a display portion 7102, an operation button 7103, and a power storage device 7104. FIG. 39E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 39F:
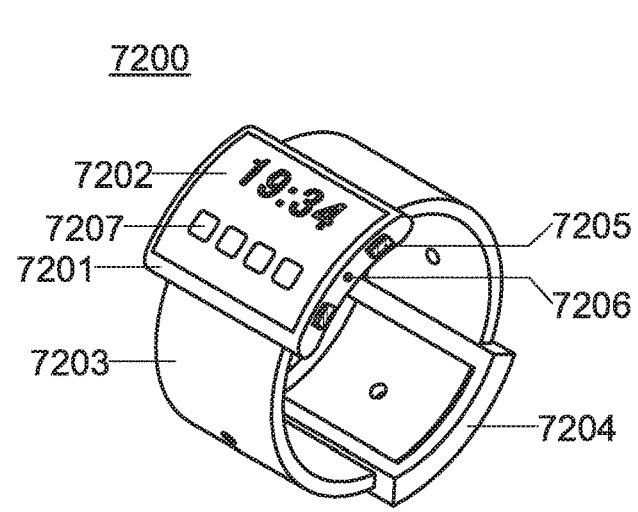

FIG. 39F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 39E that is in the state of being curved can be provided in the housing 7201. Alternatively, the power storage device 7104 illustrated in FIG. 39E can be provided in the band 7203 such that it can be curved.

A portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 39G:
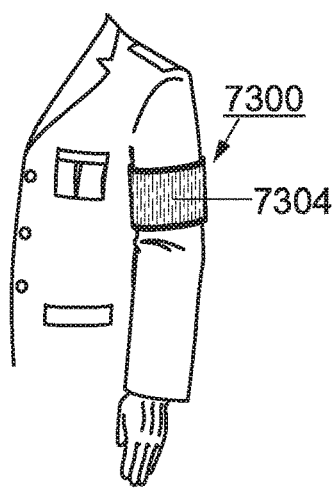

FIG. 39G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 6

In this embodiment, examples of electronic devices that can include power storage devices will be described.

Figure 40A:
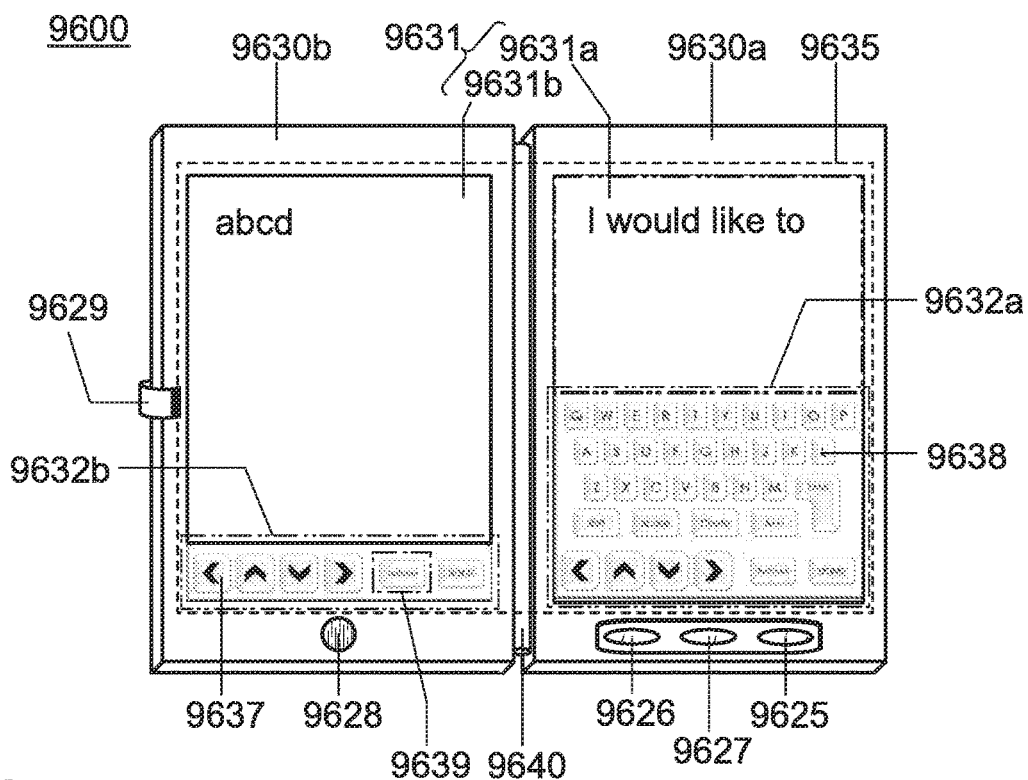
FIGS. 40A to 40C illustrate an example of an electronic device.
Figure 40B:
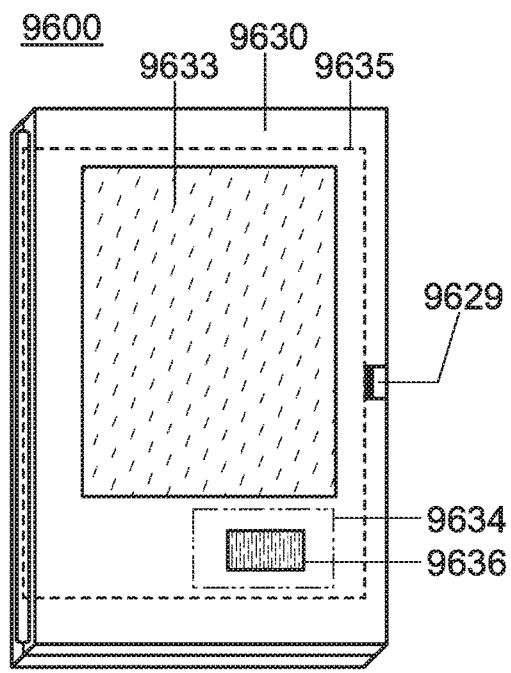

FIGS. 40A and 40B illustrate an example of a tablet terminal that can be folded in half. A tablet terminal 9600 illustrated in FIGS. 40A and 40B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 40A illustrates the tablet terminal 9600 that is opened, and FIG. 40B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 40A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 40A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 40B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 40A and 40B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 40C:
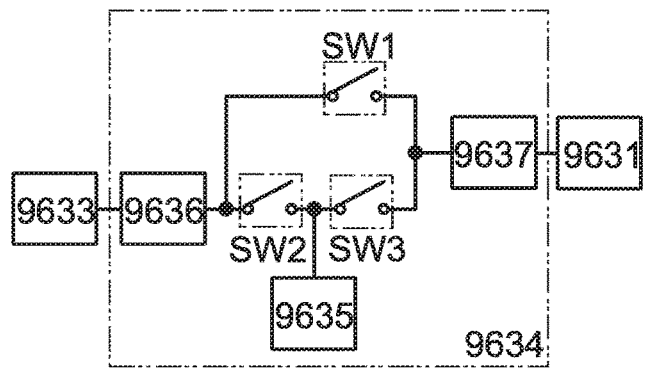

The structure and operation of the charge and discharge control circuit 9634 illustrated in FIG. 40B will be described with reference to a block diagram in FIG. 40C. The solar cell 9633, the power storage unit 9635, the DCDC converter 9636, a converter 9637, switches SW1 to SW3, and the display portion 9631 are illustrated in FIG. 40C, and the power storage unit 9635, the DCDC converter 9636, the converter 9637, and the switches SW1 to SW3 correspond to the charge and discharge control circuit 9634 in FIG. 40B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 41:
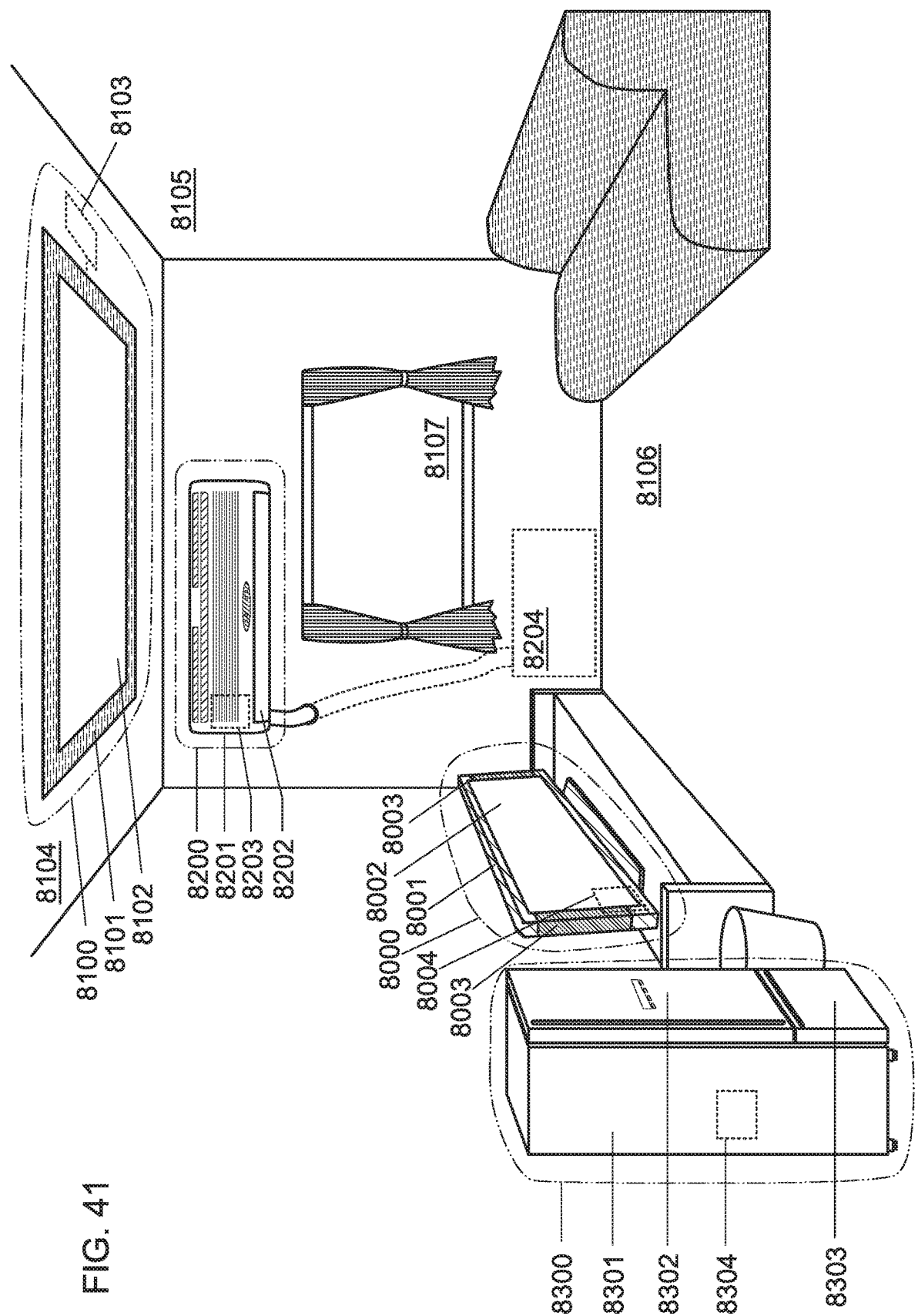
FIG. 41 illustrates examples of electronic devices.

FIG. 41 illustrates other examples of electronic devices. In FIG. 41, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 41, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 41 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 41 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 41, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 41 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 41 as an example, the power storage device of one embodiment of the present invention can be used in an air conditioner in which the functions of an indoor unit and an outdoor unit are integrated in one housing.

In FIG. 41, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 41. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in appropriate combination with any of the other embodiments.

Embodiment 7

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 42A:
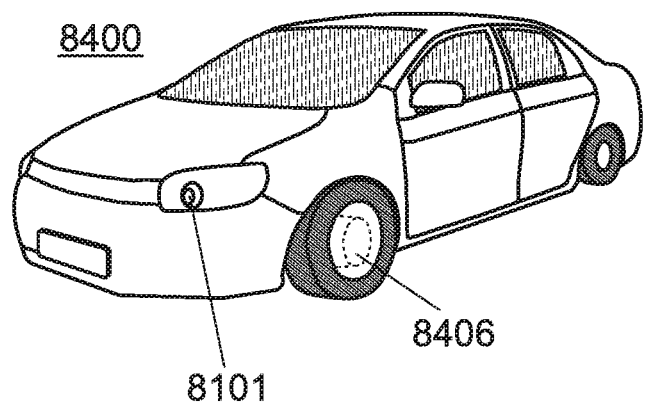
FIGS. 42A and 42B illustrate examples of electronic devices.
Figure 42B:
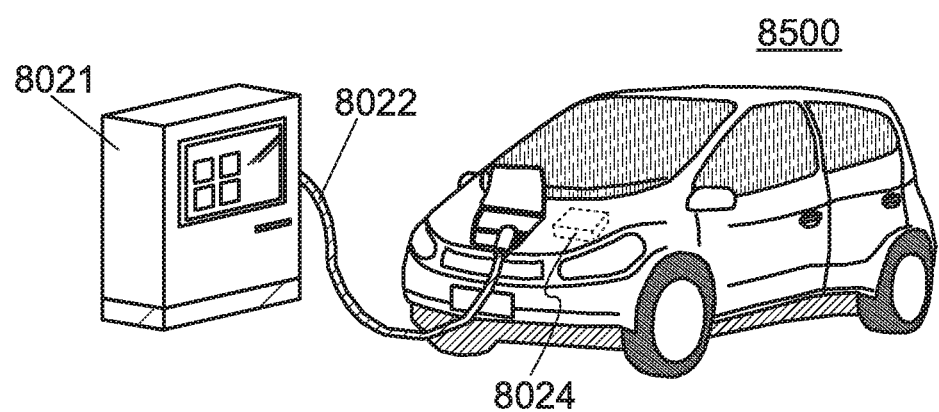

FIGS. 42A and 42B each illustrate an example of a vehicle using one embodiment of the present invention. An automobile 8400 illustrated in FIG. 42A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 42B illustrates an automobile 8500 including the power storage device. The automobile 8500 can be charged when the power storage device is supplied with electric power through external charging equipment by a plug-in system, a contactless power feeding system, or the like. In FIG. 42B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 8

A battery management unit (BMU) that can be used in combination with battery cells each including the materials described in the above embodiment and transistors that are suitable for a circuit included in the battery management unit will be described with reference to FIG. 43, FIGS. 44A to 44C, FIG. 45, FIG. 46, FIGS. 47A to 47C, FIG. 48, and FIG. 49. In this embodiment, in particular, a battery management unit of a power storage device including battery cells connected in series will be described.

When the plurality of battery cells connected in series are repeatedly charged and discharged, there occur variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1$/$y_1$ is preferably greater than or equal to ⅓ and less than or equal to 6, more preferably greater than or equal to 1 and less than or equal to 6, and $z_1$/$y_1$ is preferably greater than or equal to ⅓ and less than or equal to 6, more preferably greater than or equal to 1 and less than or equal to 6. Note that when $z_1$/$y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS film including an $InGaZnO_4$ crystal is analyzed by an out-of-plane method using an X-ray diffraction (XRD) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film including an $InGaZnO_4$ crystal by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor film has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 43:
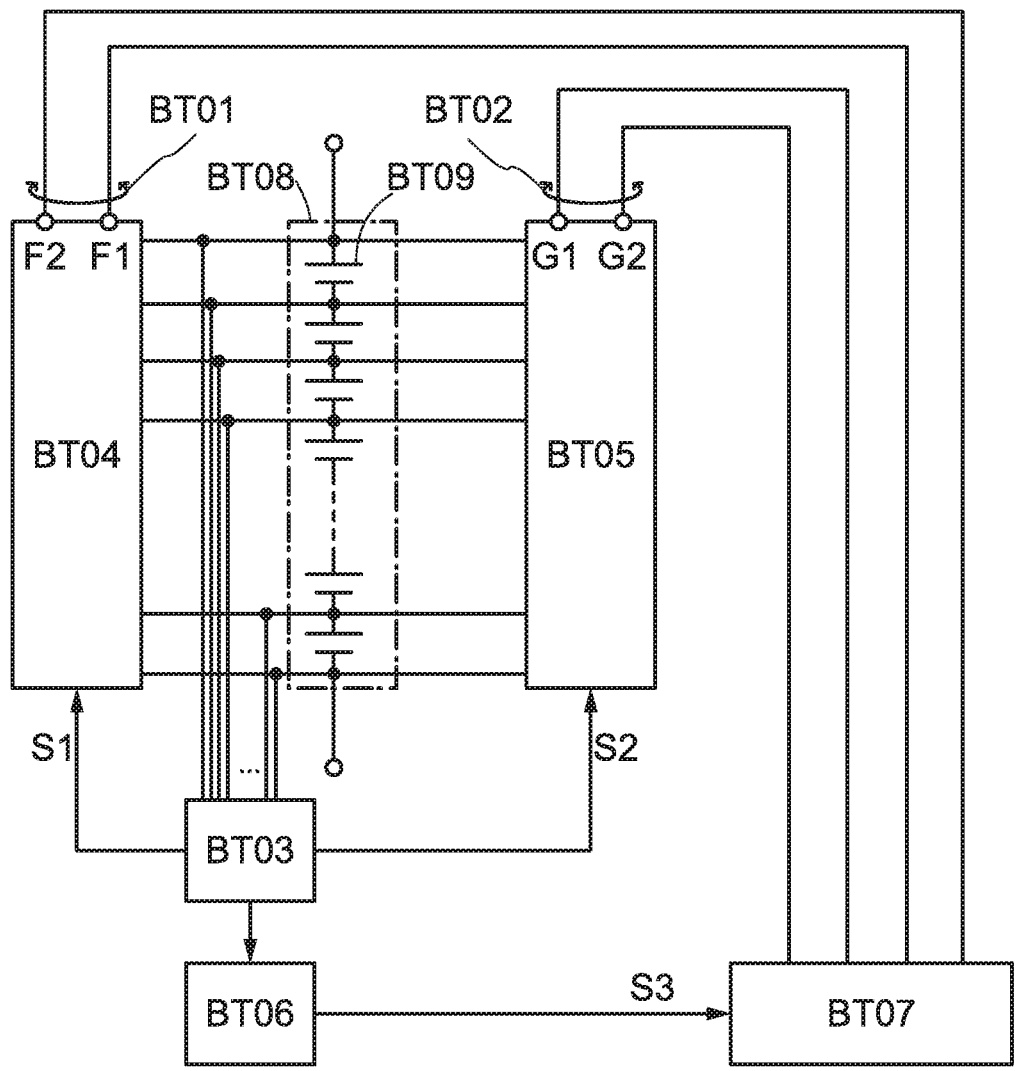
FIG. 43 is a block diagram illustrating one embodiment of the present invention.

FIG. 43 is an example of a block diagram of the power storage device. A power storage device BT00 illustrated in FIG. 43 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 43, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than or equal to a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or overdischarged as the discharge battery cell group or the charge battery cell group.

Figure 44A:
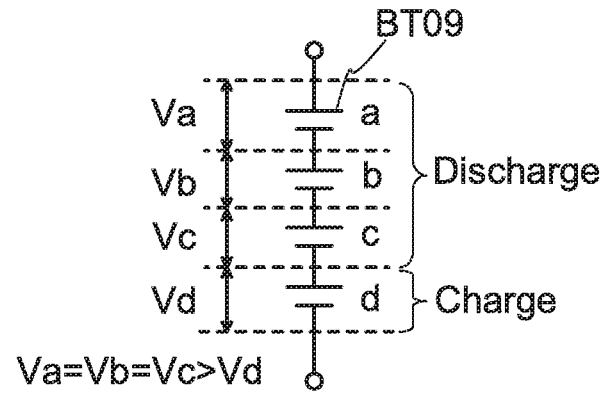
FIGS. 44A to 44C are schematic views each illustrating one embodiment of the present invention.
Figure 44B:
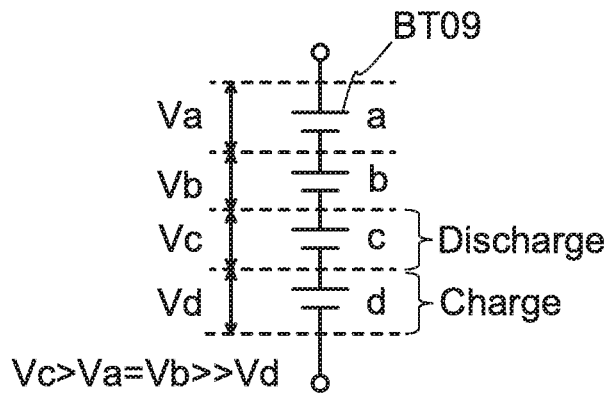
Figure 44C:
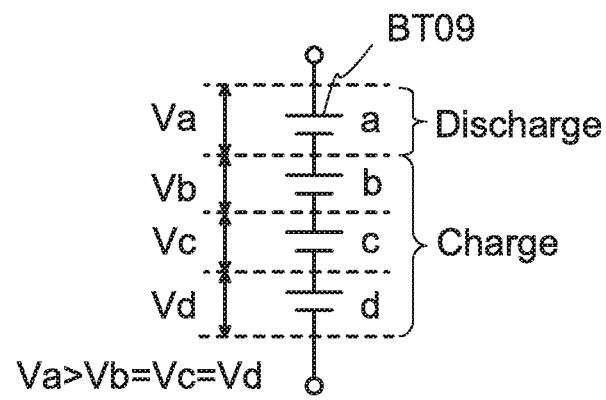

Here, operation examples of the switching control circuit BT03 in this embodiment will be described with reference to FIGS. 44A to 44C. FIGS. 44A to 44C illustrate the operation examples of the switching control circuit BT03. Note that FIGS. 44A to 44C each illustrate the case where four battery cells BT09 are connected in series as an example for convenience of explanation.

FIG. 44A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 44B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 44C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 44A to 44C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals F1 and F2. The switching circuit BT04 connects one of the pair of terminals F1 and F2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals G1 and G2. The switching circuit BT05 sets the connection destination of the terminal pair BT02 by connecting one of the pair of terminals G1 and G2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 45:
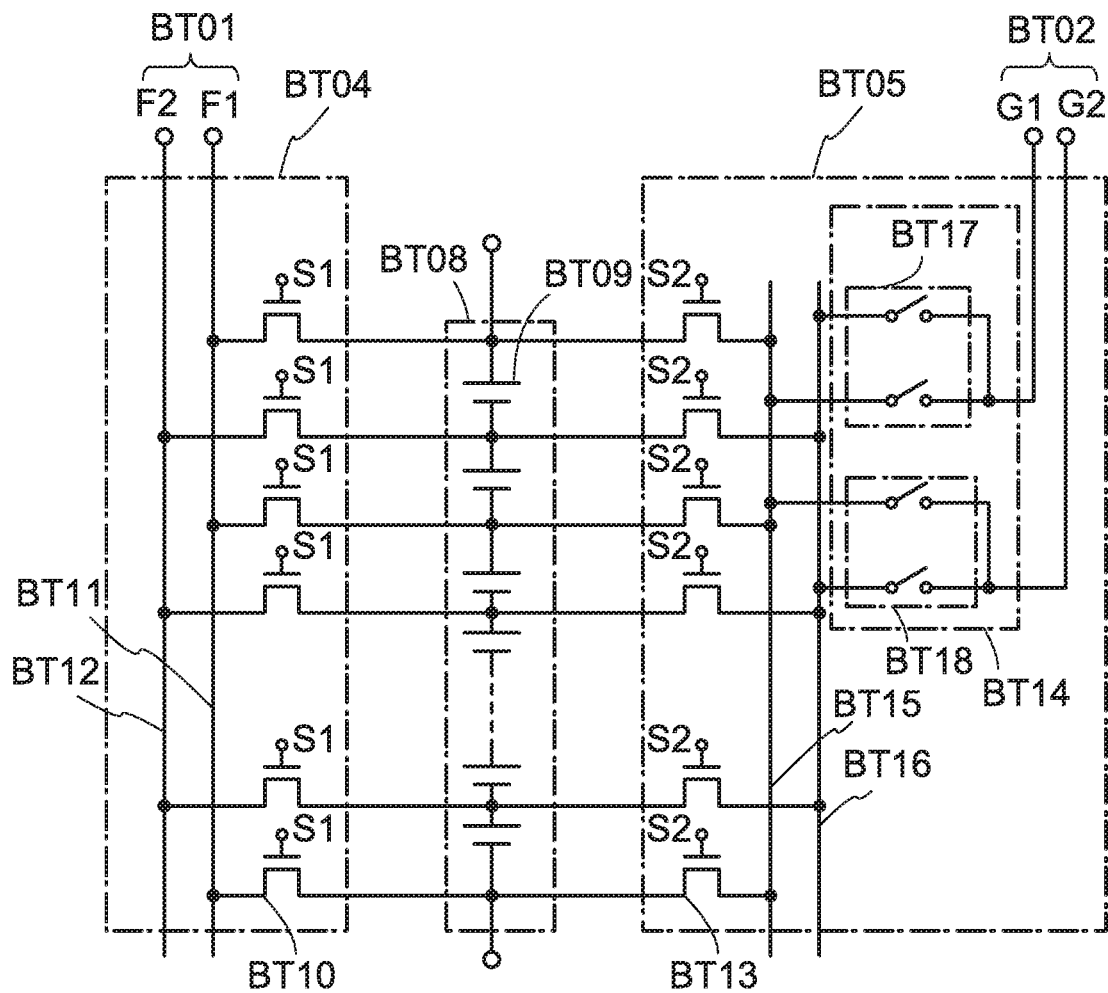
FIG. 45 is a circuit diagram illustrating one embodiment of the present invention.
Figure 46:
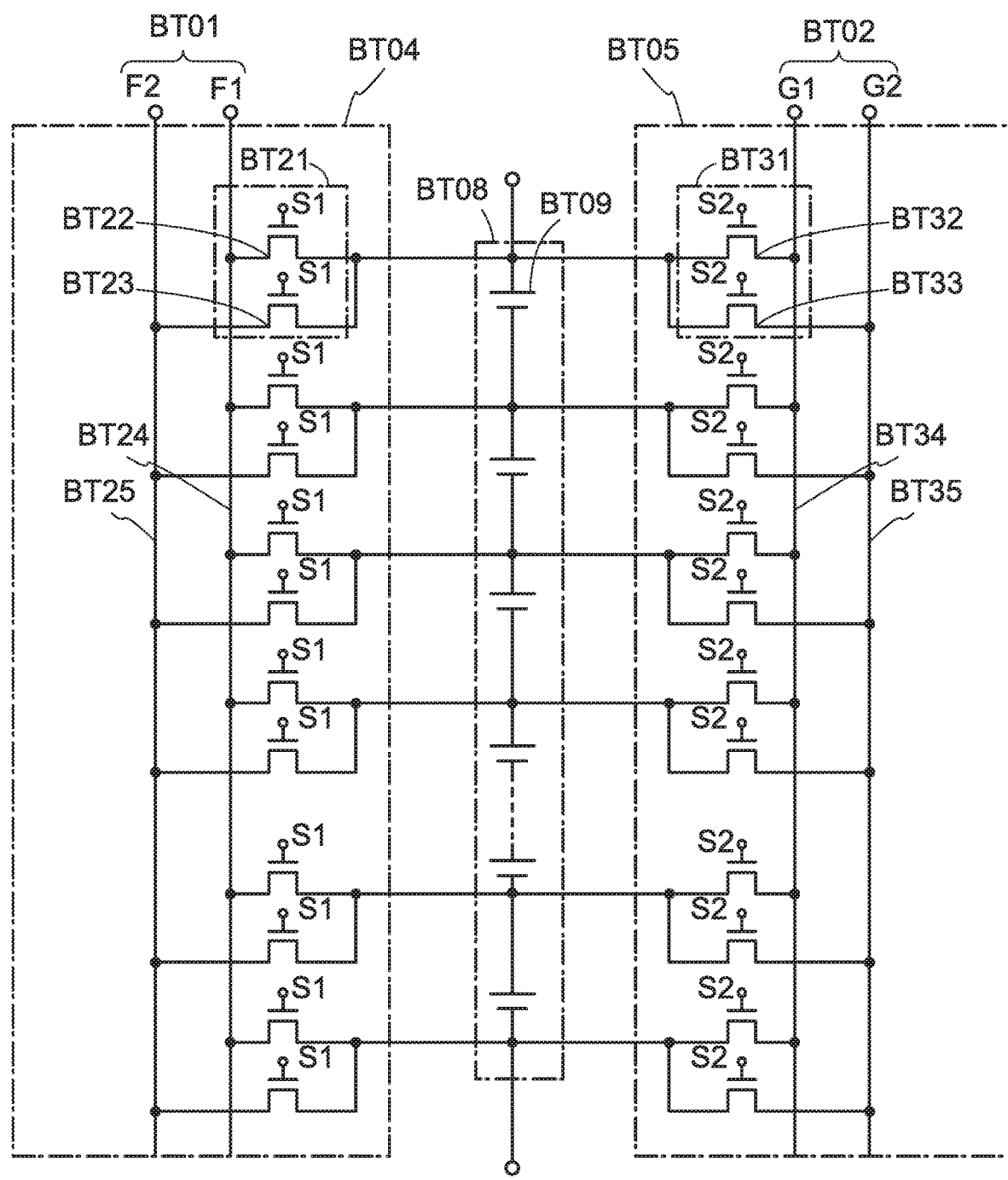
FIG. 46 is a circuit diagram illustrating one embodiment of the present invention.

FIG. 45 and FIG. 46 are circuit diagrams showing configuration examples of the switching circuits BT04 and BT05.

In FIG. 45, the switching circuit BT04 includes a plurality of transistors BT10, a bus BT11, and a bus BT12. The bus BT11 is connected to the terminal F1. The bus BT12 is connected to the terminal F2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals F1 and F2. In addition, the negative electrode terminal of the battery cell BT09 on the most downstream side of the discharge battery cell group is connected to the other of the pair of terminals F1 and F2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 45, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or a drain of the transistor BT13 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal G1. Terminals on the other end of the switch pair BT17 branch off from two switches. One switch is connected to the bus BT15, and the other switch is connected to the bus BT16. Terminals on one end of the switch pair BT18 are connected to the terminal G2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal G1 a positive electrode and the terminal G2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14.

FIG. 46 is a circuit diagram illustrating configuration examples of the switching circuit BT04 and the switching circuit BT05 which are different from those of FIG. 45.

In FIG. 46, the switching circuit BT04 includes a plurality of transistor pairs BT21, a bus BT24, and a bus BT25. The bus BT24 is connected to the terminal F1. The bus BT25 is connected to the terminal F2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs BT21 are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal F1 and the terminal F2 by turning on or off the transistors BT22 and BT23 in response to the control signal S1. Specifically, when the transistor BT22 is turned on, the transistor BT23 is turned off, so that the connection destination of the transistor pair BT21 is the terminal F1. On the other hand, when the transistor BT23 is turned on, the transistor BT22 is turned off, so that the connection destination of the transistor pair BT21 is the terminal F2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal F1 and the other is the terminal F2.

The switching circuit BT05 includes a plurality of transistor pairs BT31, a bus BT34, and a bus BT35. The bus BT34 is connected to the terminal G1. The bus BT35 is connected to the terminal G2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal G1 and the terminal G2 by turning on or off the transistors BT32 and BT33 in response to the control signal S2. Specifically, when the transistor BT32 is turned on, the transistor BT33 is turned off, so that the connection destination of the transistor pair BT31 is the terminal G1. On the other hand, when the transistor BT33 is turned on, the transistor BT32 is turned off, so that the connection destination of the transistor pair BT31 is the terminal G2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal G1 and the other is the terminal G2.

The connection destinations of the two transistor pairs BT31 are determined by the polarities of the voltages applied to the terminal pair BT02. Specifically, in the case where voltages which make the terminal G1 a positive electrode and the terminal G2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal G1 a negative electrode and the terminal G2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than the number of those included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to the number of those included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 47A:
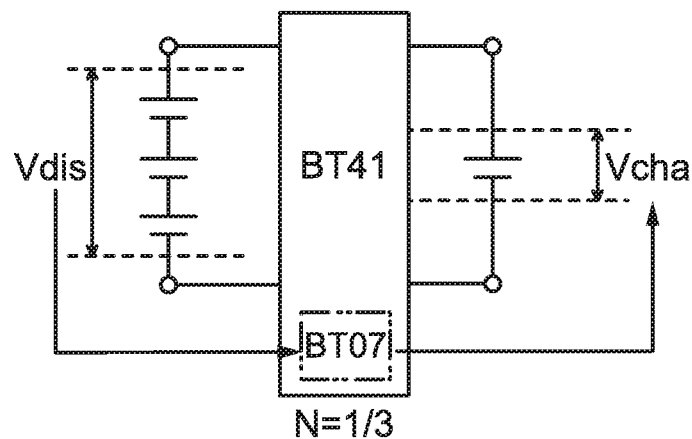
FIGS. 47A to 47C are schematic views each illustrating one embodiment of the present invention.
Figure 47B:
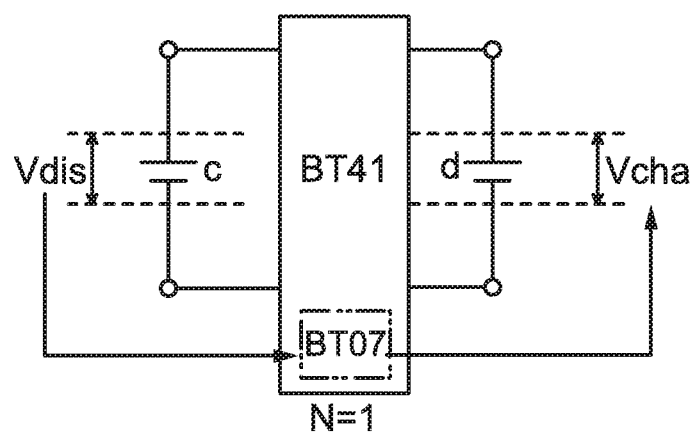
Figure 47C:
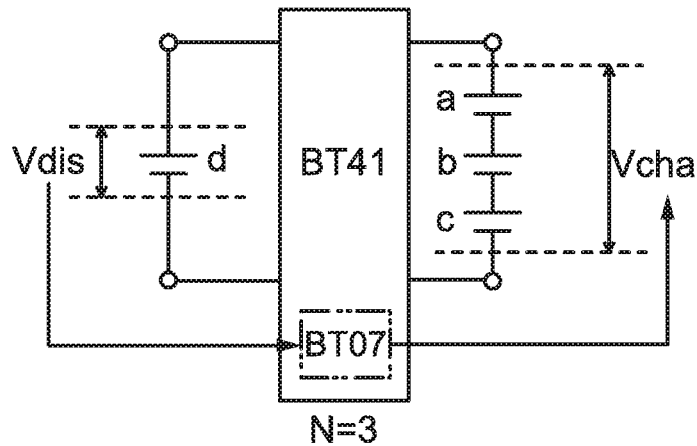

Here, operation examples of the voltage transformation control circuit BT06 in this embodiment will be described with reference to FIGS. 47A to 47C. FIGS. 47A to 47C are conceptual diagrams for explaining the operation examples of the voltage transformation control circuits BT06 for the discharge battery cell groups and the charge battery cell groups described in FIGS. 44A to 44C. FIGS. 47A to 47C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 47A, the series of three high-voltage cells a to c and one low-voltage cell d are connected in series as described in FIG. 44A. In this case, as described using FIG. 44A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than the number of those included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 47A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 47A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 47B and 47C, the conversion ratio N is calculated in a manner similar to that of FIG. 47A. In each of the examples illustrated in FIGS. 47B and 47C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 48:
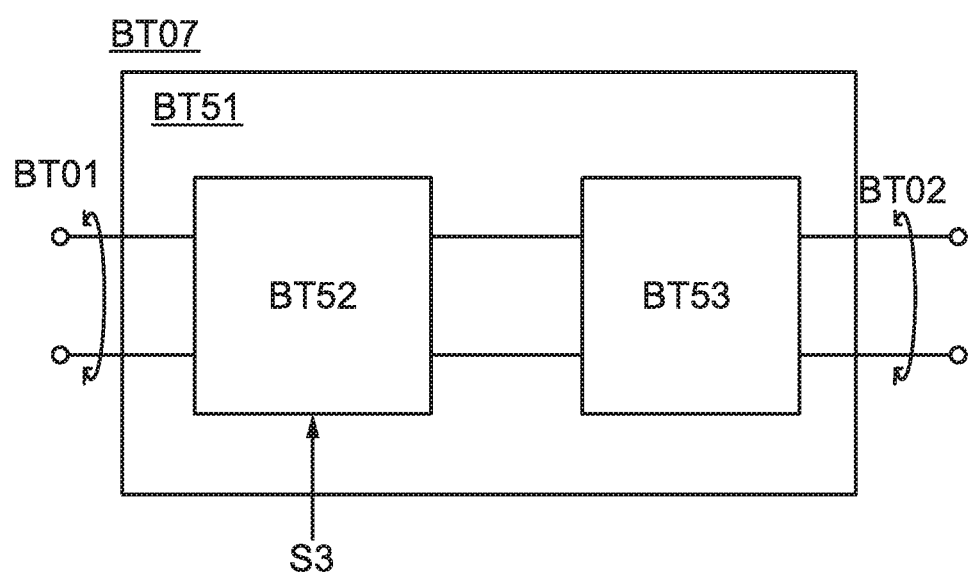
FIG. 48 is a block diagram illustrating one embodiment of the present invention.

The configuration of the voltage transformer circuit BT07 including the insulated DC-DC converter is illustrated in FIG. 48. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 49:
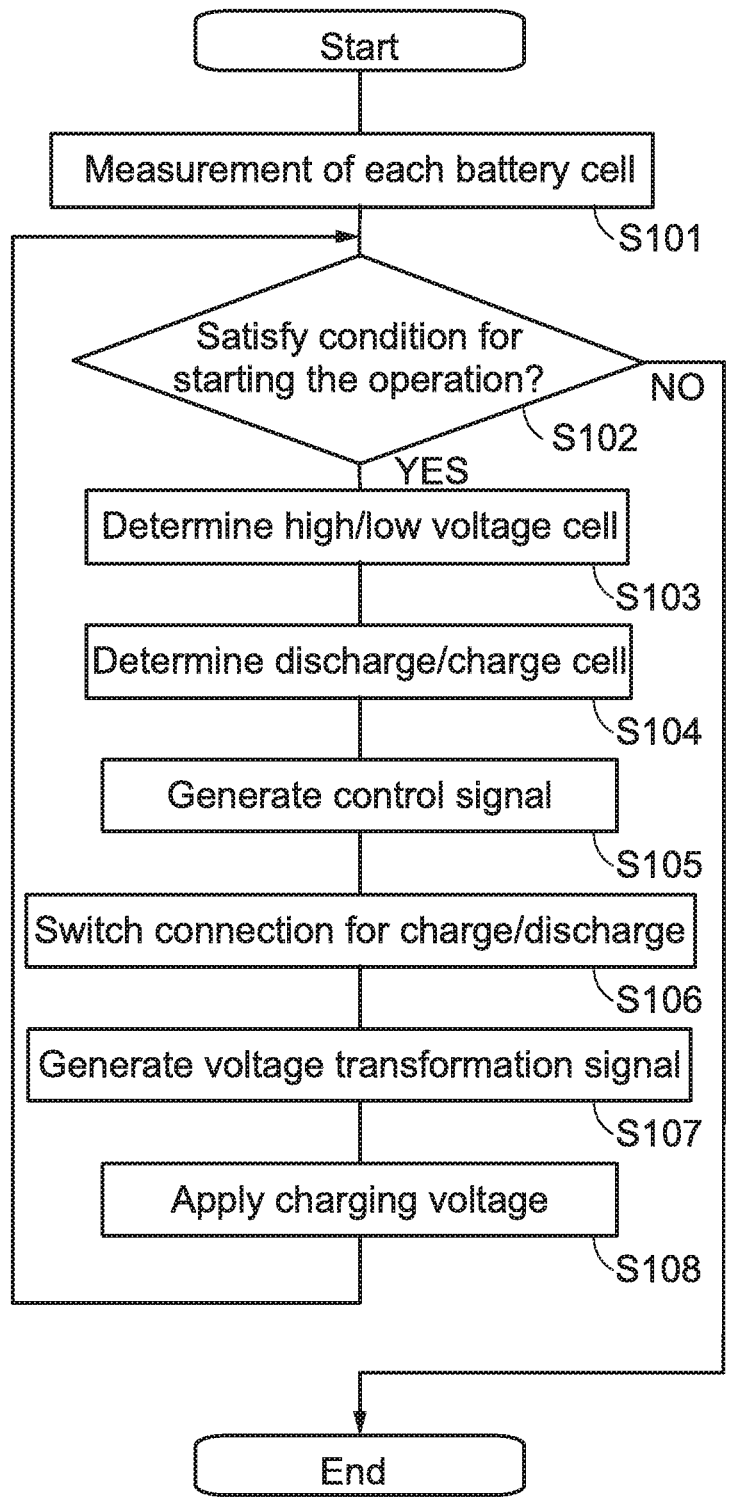
FIG. 49 is a flow chart showing one embodiment of the present invention.

A flow of operations of the power storage device BT00 in this embodiment will be described with reference to FIG. 49. FIG. 49 is a flow chart showing the flow of the operations of the power storage device BT00.

First, the power storage device BT00 obtains a voltage measured for each of the plurality of battery cells BT09 (step S101). Then, the power storage device BT00 determines whether or not the condition for starting the operation of reducing variations in voltage of the plurality of battery cells BT09 is satisfied (step S102). For example, the condition that the difference between the maximum value and the minimum value of the voltage measured for each of the plurality of battery cells BT09 is higher than or equal to the predetermined threshold value can be used. In the case where the condition is not satisfied (step S102: NO), the power storage device BT00 does not perform the following operation because voltages of the battery cells BT09 are well balanced. In contrast, in the case where the condition is satisfied (step S102: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of the battery cells BT09 included in the discharge battery cell group and the number of the battery cells BT09 included in the charge battery cell group (step S107). Then, the power storage device BT00 converts, in response to the voltage transformation signal S3, the discharging voltage applied to the terminal pair BT01 into a charging voltage and applies the charging voltage to the terminal pair BT02 (step S108). In this way, charge of the discharge battery cell group is transferred to the charge battery cell group.

Although the plurality of steps are shown in order in the flow chart of FIG. 49, the order of performing the steps is not limited to the order.

According to this embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in appropriate combination with any of the other embodiments.

Example 1

In this example, the results of measuring the amount of moisture in exterior bodies of power storage devices that were repeatedly bent will be described.

The four kinds of films shown in Table 1 in Embodiment 1 were used as exterior bodies. As the power storage devices, the thin storage batteries described in Embodiment 2 were fabricated. Here, three power storage devices were fabricated using each exterior body.

A positive electrode was formed in such a manner that an 80-μm-thick positive electrode active material layer was formed over one surface of a 20-μm-thick aluminum current collector. A negative electrode was formed in such a manner that an 82-μm-thick negative electrode active material layer was formed over one or both surfaces of an 18-μm-thick copper current collector. As separators, 25-μm-thick polypropylene was used. Lithium cobaltate and graphite were used as the positive electrode active material and the negative electrode active material, respectively.

A stack in which positive electrodes and negative electrodes are alternately stacked and separated by separators was fabricated. Six pairs of the positive electrode active material layers and the negative electrode active material layers face each other with the separators positioned therebetween.

Next, a tab region of the stacked positive electrode and a tab region of the stacked negative electrode were welded to a positive electrode lead and a negative electrode lead, respectively, by ultrasonic welding. After that, the stack in which the positive electrodes and the negative electrodes are alternately stacked and separated by separators was sandwiched by the film serving as the exterior body, two sides of which were sealed by heat.

Then, 1800 μL of PC was injected and the remaining side was sealed. Through the above steps, the power storage device was fabricated. In this example, the power storage device does not function because an electrolyte such as a lithium salt was not added; however, if an electrolytic solution is injected instead of PC, the power storage device can be charged and discharged.

Next, the power storage devices were subjected to a bending test. A tester for bending has a cylindrical support body with a radius of curvature of 40 mm that extends in depth. The center of the power storage device was located directly above the support body. The tester also includes an arm extending in the right direction and an arm extending in the left direction. End portions of the arms are mechanically connected to holding plates. By moving the end portions of the arms up or down, the holding plates can be bent along the supporting body. The bending test of the power storage device was performed with the power storage device sandwiched between the two holding plates. Thus, moving the end portions of the arms up or down allows the power storage device to be bent along the cylindrical supporting body. Specifically, lowering the end portions of the arms permits the power storage device to be bent with a radius of curvature of 40 mm. Since the power storage device is bent while being sandwiched between the two holding plates, force except bending force can be prevented from being applied to the power storage device. Furthermore, bending force can be uniformly applied to the whole power storage device.

In the bending test, bending was performed 10000 times at intervals of 10 seconds in the range of radius of curvature from 40 mm to 150 mm.

A visual inspection after the bending test showed that the comparative sample C1 had many wrinkles in the vicinity (e.g., a region corresponding to the region 561 in FIGS. 24A, 24B1, and 24B2) of a sealing portion of the exterior body (e.g., a region corresponding to the region 509b in FIGS. 20A and 20B). In contrast, wrinkles were more prevented in the sample A2, for example, than in the comparative sample C1.

Next, a preservation test was performed on the power storage devices subjected to the bending test. Specifically, each power storage device was held at 130° C. for 24 hours together with water in a container having a pressure regulation mechanism.

Then, each of the power storage devices subjected to the preservation test was opened by cutting a side thereof, and 1800 μL of PC was injected. After that, the added PC was spread throughout the inside of the exterior body, and then the solvent was squeezed out of the exterior body to be collected.

Figure 50:
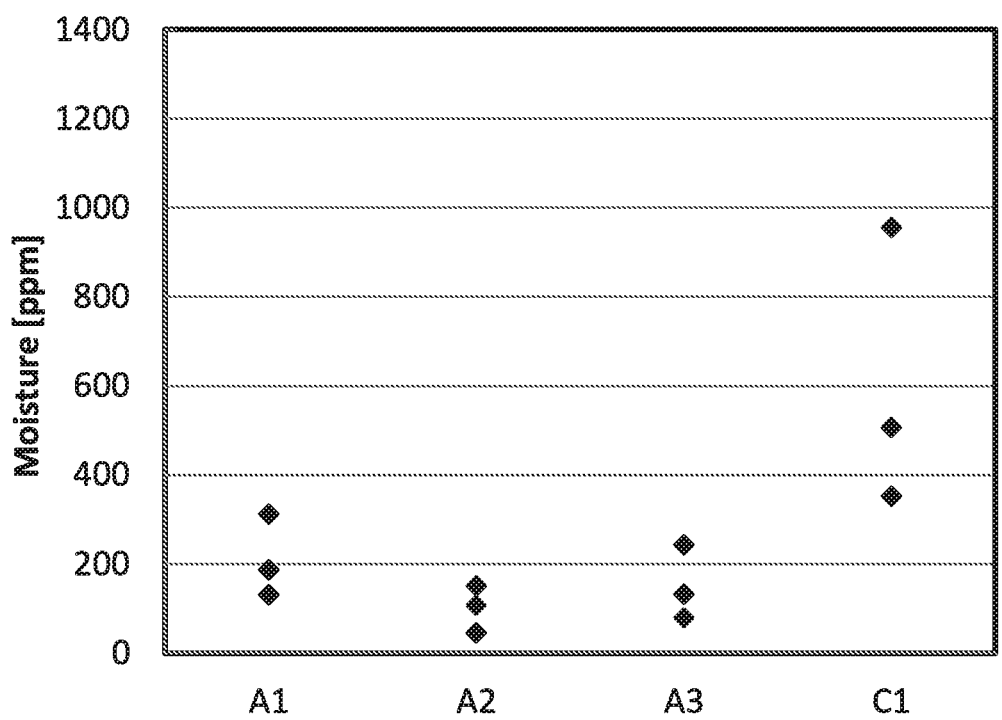
FIG. 50 is a graph showing measured values of amount of moisture.

Then, the amount of moisture in the collected solvent was measured with a coulometric Karl Fischer moisture titrator MKC-610-DT (produced by Kyoto Electronics Manufacturing Co., Ltd.). The results are shown in FIG. 50.

The concentration of moisture was larger than 350 ppm in the power storage devices using the comparative sample C1 not embossed, and was even larger than 900 ppm in some of them. Repeated bending probably caused a crack or the like on the exterior bodies of the power storage devices and lowered the airtightness, allowing moisture to enter the exterior bodies. In contrast, the concentration of moisture was lower than or equal to 300 ppm in most of the power storage devices using the embossed samples A1 to A3. It can be considered that the rigidity was reduced by embossing and thus, a crack on the exterior bodies due to repeated bending, for example, was inhibited.

In comparing the power storage devices using the samples A1 to A3 with one another, the amount of moisture is the lowest in the case of using the sample A2. As shown in Table 2, the distortion at the point of rupture is larger in the samples A1 and A2 than in the sample A3, so that the samples A1 and A2 are less likely to rupture than the sample A3. The sample A2 produced the best results probably because it had lower rigidity than the sample A1 and was less likely to rupture than the sample A3.

Example 2

In this example, the rigidity of embossed films was examined.

As a sample B1, a 51-μm-thick stainless steel film (here, SUS304 was used) the both surfaces of which were coated with a resin layer was used. The sample B1 had a thickness of 113 μm. A sample B2 is different from the sample B1 in that it was embossed. The difference between the maximum height and the minimum height of the surface of the embossed film was 0.5 mm.

The samples B1 and B2 were subjected to a tension test to determine their rigidity k, modulus of rigidity G, and parameter G'. Table 3 shows the test results as well as the distortion $\varepsilon$ and force P at the point of rupture.

TABLE 3

|    | k [N/m]   | G [N/m$^2$] | G' [N/m]  | $\varepsilon$ | P [N] |
|----|-----------|-------------|-----------|-------|-----|
| B1 | 1.24E+06  | 3.67E+10    | 4.15E+06  | 0.210 | 577 |
| B2 | 6.49E+05  | 1.92E+10    | 2.16E+06  | 0.220 | 587 |

Because the sample B2 was embossed, its rigidity k, modulus of rigidity G, and parameter G' were 53% of those of the sample B1. In addition, the distortion $\varepsilon$ at the point of rupture was larger in the sample B2 than in the sample B1. The sample B2 exhibited smaller distortion $\varepsilon$ at the point of rupture and a higher modulus of rigidity G than the films used in Example 1. If a metal with a lower Young's modulus is used as a metal material for a film, larger distortion $\varepsilon$ at the point of rupture and a lower modulus of rigidity G might be achieved.

Next, as power storage devices, three thin storage batteries as described in Embodiment 2 were fabricated using the sample B2 as their exterior bodies. The components and the fabrication conditions of the storage batteries are described in Example 1.

When the power storage devices were subjected to a bending test, leakage of a solvent was observed in two out of the three power storage devices. The sample B2 that was used as the exterior bodies in this example has higher rigidity than the films that were used as the exterior bodies in Example 1, which probably allowed a crack on the exterior bodies.

This application is based on Japanese Patent Application serial No. 2015-152444 filed with Japan Patent Office on Jul. 31, 2015, the entire contents of which are hereby incorporated by reference.

What is claimed is:
1. A power storage device comprising:
a film;
a positive electrode; and
a negative electrode,
wherein the film includes embossed projections,
wherein each of the embossed projections has a cross shape in a plan view,
wherein a difference between a maximum height and a minimum height of the embossed projections is greater than or equal to 0.15 mm and less than 0.8 mm,
wherein a modulus of rigidity of the film is less than 6 5×10$^9$ N/m$^2$,
wherein the film comprises a metal layer,
wherein a thickness of the metal layer is greater than or equal to 5 μm and less than or equal to 200 μm, and
wherein the positive electrode and the negative electrode are surrounded by the film.
2. The power storage device according to claim 1, wherein distortion at a point of rupture of the film is greater than 0.6 and less than or equal to 2.
3. The power storage device according to claim 1, wherein the metal layer comprises aluminum.
4. A battery management unit comprising the power storage device according to claim 1.
5. An electronic device comprising the power storage device according to claim 1.

* * * * *